US012334729B2

(12) United States Patent
Protzman et al.

(10) Patent No.: US 12,334,729 B2
(45) Date of Patent: Jun. 17, 2025

(54) OPTIMIZATION OF LOAD CONTROL ENVIRONMENTS

(71) Applicant: Lutron Technology Company LLC, Coopersburg, PA (US)

(72) Inventors: Brent Protzman, Easton, PA (US); Rangasayee Sapthasayee, Plymouth Meeting, PA (US); Craig A. Casey, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 427 days.

(21) Appl. No.: 17/787,520

(22) PCT Filed: Dec. 18, 2020

(86) PCT No.: PCT/US2020/065886
§ 371 (c)(1),
(2) Date: Jun. 20, 2022

(87) PCT Pub. No.: WO2021/127355
PCT Pub. Date: Jun. 24, 2021

(65) Prior Publication Data
US 2022/0385063 A1 Dec. 1, 2022

Related U.S. Application Data

(60) Provisional application No. 62/949,541, filed on Dec. 18, 2019.

(51) Int. Cl.
*H02J 3/00* (2006.01)
*H05B 47/105* (2020.01)
(Continued)

(52) U.S. Cl.
CPC .............. *H02J 3/00* (2013.01); *H05B 47/105* (2020.01); *H02J 2310/12* (2020.01); *H02J 2310/62* (2020.01)

(58) Field of Classification Search
CPC ...... H02J 3/00; H02J 2310/12; H02J 2310/62; H05B 47/105; H05B 47/11; H05B 47/115
(Continued)

(56) References Cited

U.S. PATENT DOCUMENTS

| 5,248,919 A | 9/1993 | Hanna et al. |
| 6,528,957 B1 | 3/2003 | Luchaco |

(Continued)

FOREIGN PATENT DOCUMENTS

| WO | 9709869 A1 | 3/1997 |
| WO | 2019176546 A1 | 9/2019 |

*Primary Examiner* — Michael J Brown
(74) *Attorney, Agent, or Firm* — Michael S. Czarnecki; Glen R. Farbanish; Philip N. Smith

(57) ABSTRACT

A load control environment may be controlled by adjusting load control devices, such as a lighting intensity level, a level of the covering material for a motorized window treatment, and/or a temperature level to reduce and/or optimize the consumption of power. The optimization of power may include reducing the total cost and consumption of power, while maintaining a target or minimum level of comfort for occupants and/or a net monetary gain. The optimization of power consumption may be performed by adaptively controlling the load control devices to reduce the total power consumption of the load control environment, while maintaining a minimum level for comfort metrics indicating a level of occupant comfort and/or the net monetary gain associated with the comfort metrics.

38 Claims, 23 Drawing Sheets

(51) Int. Cl.
*H05B 47/11* (2020.01)
*H05B 47/115* (2020.01)

(58) Field of Classification Search
USPC .......................................................... 700/295
See application file for complete search history.

(56) References Cited

U.S. PATENT DOCUMENTS

| | | |
|---|---|---|
| 7,391,297 B2 | 6/2008 | Cash et al. |
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,288,981 B2 | 10/2012 | Zaharchuk et al. |
| 8,410,706 B2 | 4/2013 | Steiner et al. |
| 8,451,116 B2 | 5/2013 | Steiner et al. |
| 8,723,466 B2 | 5/2014 | Chambers et al. |
| 8,866,343 B2 | 10/2014 | Abraham et al. |
| 8,901,769 B2 | 12/2014 | Altonen et al. |
| 8,946,924 B2 | 2/2015 | Pessina |
| 8,975,778 B2 | 3/2015 | Altonen et al. |
| 9,124,130 B2 | 9/2015 | Altonen et al. |
| 9,553,451 B2 | 1/2017 | Zacharchuk et al. |
| 2008/0092075 A1 | 4/2008 | Jacob et al. |
| 2009/0206983 A1 | 8/2009 | Knode et al. |
| 2013/0030589 A1 | 1/2013 | Pessina et al. |
| 2013/0110295 A1* | 5/2013 | Zheng ................. H04L 41/0833 700/286 |
| 2014/0026205 A1 | 1/2014 | Guo et al. |
| 2014/0132475 A1 | 5/2014 | Bhutani et al. |
| 2014/0177469 A1 | 6/2014 | Neyhart et al. |
| 2014/0265568 A1 | 9/2014 | Crafts et al. |
| 2015/0036896 A1 | 2/2015 | Zhou et al. |
| 2016/0004047 A1 | 1/2016 | Iwasaki et al. |
| 2016/0004716 A1 | 1/2016 | Akirav et al. |
| 2016/0005402 A1 | 1/2016 | Schubert et al. |
| 2016/0007426 A1 | 1/2016 | Ashdown et al. |
| 2016/0061472 A1* | 3/2016 | Lee .......................... F24F 11/64 700/276 |
| 2017/0010598 A1 | 1/2017 | Huang et al. |

\* cited by examiner

OPTIMIZATION OF LOAD CONTROL ENVIRONMENTS

CROSS-REFERENCE TO RELATED APPLICATIONS

This application is the 371 National Stage of International Application No. PCT/US20/65886, filed Dec. 18, 2020, which claims the benefit of U.S. Provisional Patent Application No. 62/949,541, filed Dec. 18, 2019, the entire disclosures of each of which are hereby incorporated by reference herein.

BACKGROUND

A load control system may be installed in a building to regulate the power consumption of electrical loads in the building, such as a lighting system, a heating and cooling system, and/or a motorized window treatment system. In a building, there may be many factors that affect the consumption of power. For example, sunlight shining through a window in a room may allow the load control system to lower the intensities of lighting loads so that the lighting loads use less power. The sunlight, however, provides heat power into the room and may increase the amount of power consumed by cooling the temperature of the room causing the load control system to consume more power from heating and cooling.

Historically, load control systems have focused on reducing power consumption by reducing the amount of power consumed by lighting, heating and cooling, or window treatments. For example, some load control systems have offered a "load shedding" capability, wherein the power consumed by electrical loads is reduced, for example, by lowering the intensities of lighting loads by a fixed amount or percentage in response to an input provided to the system. Other load control systems have provided for control of both electrical lighting loads to control the amount of artificial light in a load control environment and motorized window treatments to control the amount of daylight entering the space. Such load control systems have operated to achieve a desired lighting intensity in the load control environment while maximizing the contribution of daylight provided in the space. And, other load control systems have provided for control of electrical lighting loads, heating and cooling systems, and motorized window treatments to produce power savings in response to demand response commands. In demand response programs, consumers of electricity agree to shed loads during peak demand periods in exchange for incentives, such as a reduced billing rate or power savings.

Such load control systems attempt to reduce the amount of power consumed by the entire load control system by independently adjusting the power consumed by individual components of the load control system, without considering the impact of such adjustments on the other components of the load control system or the impact on the comfort of the occupants. This may cause greater consumption of power through tangential effects. For example, adjusting the power consumed by a single component of the load control system may cause the load control system to consume power from other sources, and thereby increase the total amount of power consumed. In addition, adjustments to the load control system in attempts to consume less power may result in discomfort to occupants of a building due to the effect of the adjustment on other components. This may cause the occupants to manually adjust the load control system, which may result increased power consumption of the load control system.

SUMMARY

As described herein, a system controller for a load control environment (e.g., a room, space, or building) having load control devices, such as a lighting control system, a heating and cooling system, and/or a motorized window treatment system, may be configured to control the load control devices by adjusting the lighting intensity level, a level of the covering material for a motorized window treatment, and/or a temperature level to reduce and/or optimize the consumption of power. The optimization of power may include reducing the total cost and consumption of power, while maintaining a target or minimum level of performance for a plurality of comfort metrics. The optimization of power consumption may include the system controller predictively and/or adaptively controlling the lighting intensities of lighting loads, the positions of the covering material for the motorized window treatments, and/or the temperature of the load control environment using data, to reduce the total power consumption of the load control environment, while maintaining a minimum level for comfort metrics and power metrics. The data may be predefined, real-time, historic, and/or collected data. The minimum level of performance for comfort metrics may be achieved by balancing the temperature level, the window treatment level, and/or the lighting level in the load control environment. By balancing the temperature level, the window treatment level, and/or the lighting level in the load control environment, the least amount of power may be consumed in total, while maintaining a minimum or target level of comfort.

A system controller or a consumer of power, such as a building manager or occupant of a load control environment, may utilize one or more comfort metrics for the load control environment to reduce and/or optimize power consumption in a load control environment. The comfort metrics may indicate a comfort level based on a plurality of comfort variables in a load control environment. The comfort metrics may include a thermal comfort level, a daylight glare level, and/or a lighting level (e.g., a desired lighting level). The comfort variables may include parameters that may be measured or calculated and upon which the comfort metrics may be calculated. For example, the comfort variables may include occupancy parameters, levels of direct daylight, indoor temperature, outside temperature, a lighting intensity level, an amount of daylight being received, a total light level, a level of the covering material for a motorized window treatment, and/or the like in a load control environment. The system controller may set a threshold for the comfort metrics. The threshold for the comfort metrics may be a minimum level based on one or more comfort variables in the load control environment or a target comfort level based on one or more comfort variables in the load control environment.

A system controller or a consumer of power, such as a building manager or occupant of a load control environment, may utilize one or more power metrics for the load control environment to reduce and/or optimize power in a load control environment. The power metrics may indicate a power level based on a plurality of power parameters in the load control environment. The power metrics may include conductive heat gain, conductive heat loss, radiative heat gain, radiative heat loss, occupant heat to a space, light heat to a space, electric plug-in load heat to a space, appliance heat to a space, and/or light power. Conductive heat may be based on the inside temperature of a space, the outside temperature of a load control environment and a constant that is a function of shade fabric position and electrochromic glass state of the windows in the space. The conductive heat constant may be estimated from properties of the load control environment and/or glass, or the conductive heat constant may be learned by modifying the shade positions and glass properties and monitoring the associated sensor responses. Radiant heat may be based on an illuminance sensor and a constant that is a function of shade fabric position and electrochromic glass state of the windows in the space. The radiant heat constant may be estimated from properties of the load control environment and/or glass, or the radiant heat constant may be learned by modifying the shade positions and glass properties and monitoring the associated sensor responses. The occupant heat may be based on the activity of an occupant and a constant. The activity of an occupant may be measured by an occupant activity sensor. For example, an occupant activity sensor may measure activity ranging from whether an occupant is in a load control environment to quantifying all detected movement in a space.

The light heat may be based on the light power and a constant that is based on the efficiency of lighting heat exiting a fixture and occurring in a space. The light heat constant may be estimated and/or learned by modifying light power and monitoring the associated sensor responses. The light power may be measured or estimated based on light levels in a space. The plug and/or appliance heat may be based on the occupancy of a load control environment and two constants. The first plug and appliance constant may be measured or learned and may be based on the additional heat generated from plugs, appliances, and/or devices when a load control environment is occupied. The second plug and appliance constant may be measured or learned and may be a baseline level of heat generated from plugs, appliances, and/or devices when a load control environment is empty. Lighting power may be based on the level of light in a load control environment and a constant. The lighting power constant may be a function of shade fabric position and electrochromic glass state of the windows in the space. The system controller may set a range for the power metrics. The range for the power metrics may be a maximum level of power in a load control environment or a targeted level of power in a load control environment.

The system controller may be configured to monitor the plurality of comfort variables and the plurality of power parameters. The system controller may be configured to monitor information that may be associated with comfort metrics and/or power metric. The monitored information may be sensed information or measured information. The sensed information may be obtained from a carbon dioxide sensor, an occupancy sensor, a photo sensing device (e.g., one or more of a daylight sensor, a window sensor, a window photocell, or an interior photocell), a visible light sensor (e.g., an imaging sensor having a camera), a thermostat, and/or an exterior temperature sensor. The measured information may include the light level (e.g., electric light level and/or daylight level), light color (e.g., color temperature), and/or shade position. The sensed information and measured information may be real-time information, historic information, or predicted information related to the inputs into the system controller. The system controller may determine the appropriate lighting intensity level, window treatment fabric position level and temperature level to produce the target level of comfort for a load control environment. The system controller may be configured to determine which comfort variable is to be adjusted by an adjustment amount while monitoring the plurality of comfort variables and the plurality of power parameters. The system controller may command the load control devices, such as the lighting control system to adjust the lighting intensity, the motorized window treatment system to adjust the fabric level, or the temperature control device to adjust the temperature level to prevent the comfort metric from falling below the threshold for the comfort metric, while maintaining the power level within the defined range for the power metric.

The system controller may be configured compute one or more comfort metrics based on the monitored plurality of comfort variables. The system controller may be configured to compute one or more power metrics based on the monitored plurality of power parameters. The system controller may be configured to control one or more load control devices in the load control environment to prevent the comfort metric from falling below the defined threshold for the comfort metric while maintaining the power level within the defined range for the power metric.

The system controller may be configured to estimate (e.g., compute) the comfort metrics and/or the power metrics. The system controller may be configured to compute the comfort metrics and/or the power metrics, for example, based on the initial common relationships between the predicted comfort metrics and/or building metrics (e.g., space-area attributes including room conduction, room size, room shape, number of windows, etc.). The system controller may be configured to modify the predicted comfort metrics and/or the predicted power metrics based on real-time information or occupant overrides. For example, the system controller may be configured to modify temperature constants to match true thermal changes. The system controller may be configured to verify that a minimum level of comfort is met by the monitored parameters. If a minimum level of comfort is not being met by the monitored parameters, the system controller may adjust the lighting intensity level, window treatment level, and/or temperature level to effectuate the minimum level of comfort. The system controller may be configured to optimize the consumption of power within a comfort range. For example, the comfort range may be the minimum levels set for the comfort variables to achieve the target levels set for the comfort variables. The comfort range may be a set range surrounding the target levels for the comfort variables.

The system controller may be configured to calculate a power cost and a comfort cost by combining the estimated power metrics or comfort metrics. The system controller may be configured to estimate a change of a power cost and a change of a comfort cost that may result from an adjustment of a comfort variable. The change of the power cost may indicate an increase of power consumption or a reduction of power consumption. The change of the comfort cost may indicate a comfort loss or a comfort gain. The system controller may adjust the comfort variable if the comfort gain outweighs the increase of power consumption or the reduction of power consumption outweighs the comfort loss. The system controller may continue to adjust the comfort variable as long as the power consumption stays within an acceptable power consumption range.

The system controller may be configured to receive user inputs to control the one or more load control devices. The system controller may be configured to adjust the threshold for the comfort metric based on the user inputs. The system controller may also adapt to a change in environment. For example, a storm may change the level of light received from the sun. As a result of this change in sunlight, the system controller may determine that less cooling power is needed in a load control environment if the fabric level and the lighting level are adjusted. The system controller may thereby command the lighting control system to adjust the lighting intensity, the motorized window treatment system to adjust the fabric level, or the temperature control device to adjust the temperature level to achieve this target level of performance and optimize power consumption.

A user of the load control system with the system controller may access the system controller via a workstation, such as a desktop computer, laptop computer or smart phone, to input and configure settings and monitored parameters for the system controller and load control devices, such as the lighting control device, the motorized window treatment system, and the heating and cooling system. For example, the user may configure or adjust settings related to the minimum, maximum and target levels of performance desired. Though users may be able to access and configure settings for controlling load control devices in the load control system, the users may be unaware of the adjustments to be made. For example, the load control device may adaptively and predictively adjust to maintain the desired level of performance.

DETAILED DESCRIPTION

Figure 1:
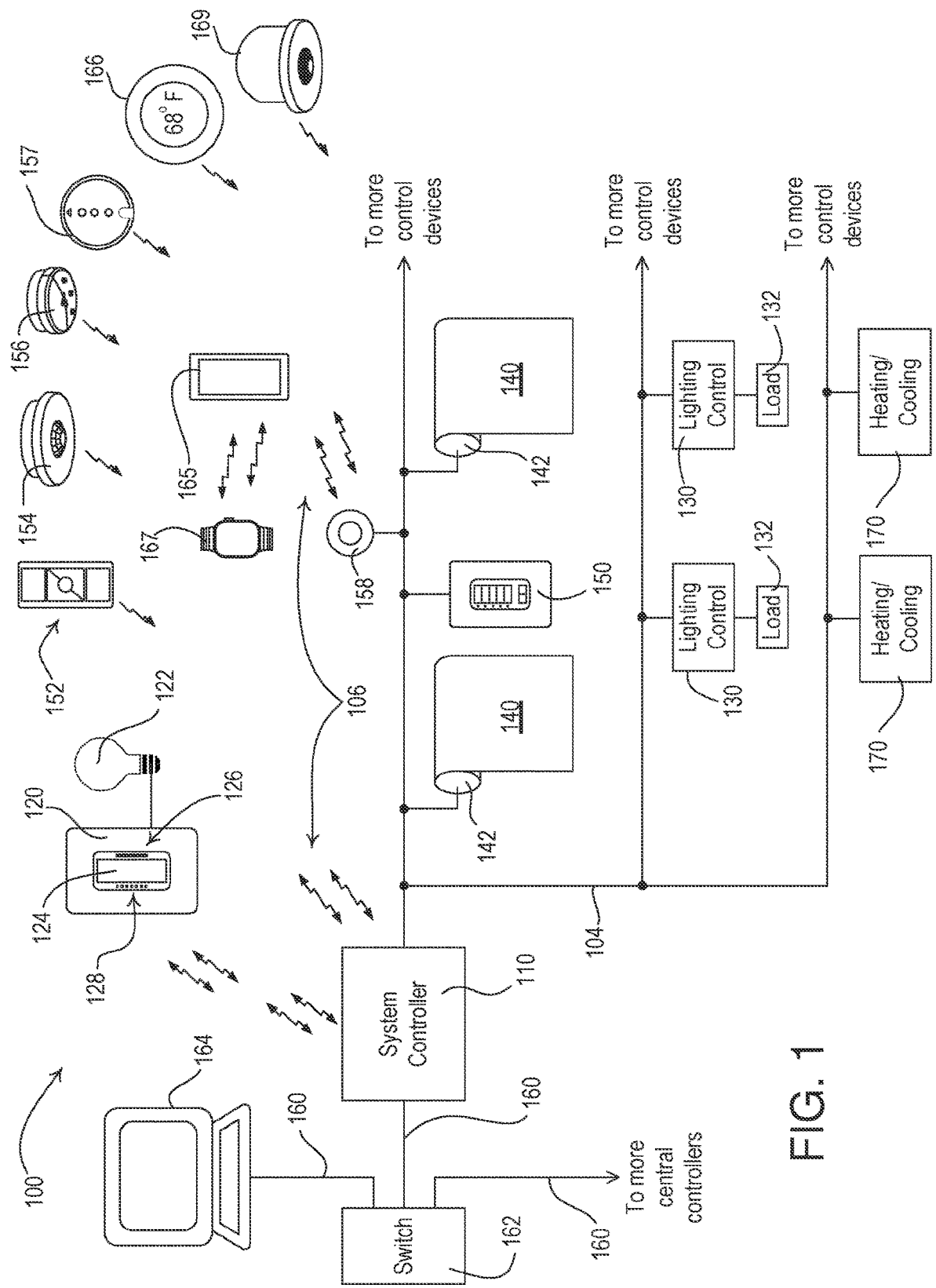
FIG. 1 is a diagram of an example load control environment in which a load control system may control the amount of power delivered from an alternating-current (AC) power source to one or more electrical loads.

FIG. 1 is a diagram of an example load control environment in which a load control system 100 may control the amount of power delivered from an alternating-current (AC) power source (not shown) to one or more electrical loads. The load control environment 100 may include a system controller 110 (e.g., a system controller or load controller) configured to transmit and receive digital messages via both wired and/or wireless communication links. For example, the system controller 110 may be coupled to one or more wired control devices via a wired digital communication link 104. The system controller 110 may be configured to transmit and/or receive wireless signals, e.g., radio-frequency (RF) signals 106, to communicate with one or more wireless control devices. The load control environment 100 may include a number of control-source devices and a number of control-target devices. The control-source devices may include, for example, input devices configured to transmit digital messages in response to user inputs, occupancy/vacancy conditions, changes in measured light intensity, and/or other input information. The control-target devices may include, for example, load control devices configured to receive digital messages and/or control respective electrical loads in response to the received digital messages. A single control device of the load control environment 100 may operate as both a control-source and a control-target device. The system controller 110 may be configured to receive digital messages from the control-source devices and may transmit digital messages to the control-target devices in response to the digital messages received, for example, from the control-source devices.

The load control environment 100 may include a load control device, such as a dimmer switch 120, for controlling a lighting load 122. The dimmer switch 120 may be adapted to be wall-mounted in a standard electrical wallbox. The dimmer switch 120 may include a tabletop or plug-in load control device. The dimmer switch 120 may include a toggle actuator 124 (e.g., a button) and/or an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and thus may increase or decrease the intensity of the lighting load from a minimum intensity (e.g., approximately 1%) to a maximum intensity (e.g., approximately 100%). The dimmer switch 120 may include a plurality of visual indicators 128, e.g., light-emitting diodes (LEDs). The visual indicators 128 may be arranged in a linear array and may be illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to receive digital messages from the system controller 110 via the RF signals 106. The dimmer switch 120 may be configured to control the lighting load 122 in response to the received digital messages. Examples of dimmer switches configured to transmit and receive digital messages is described in greater detail in U.S. Patent Application Publication No. 2009/0206983, published Aug. 20, 2009, entitled COMMUNICATION SYSTEM FOR A RADIO-FREQUENCY LOAD CONTROL SYSTEM, the entire disclosure of which is hereby incorporated by reference. The dimmer switch 120 may also, or alternatively, be coupled to the wired digital communication link 104.

The load control environment 100 may include one or more remotely-located load control devices. The load control devices may include lighting control devices 130 for controlling lighting loads 132. The lighting control devices 130 may be light-emitting diode (LED) drivers for driving respective LED light sources (e.g., LED light engines). The lighting control devices 130 may be located remotely, for example, in the lighting fixtures of the respective light sources that include the lighting loads 132. The lighting control devices 130 may be configured to receive digital messages from the system controller 110 via the digital communication link 104. The lighting control devices 130 may be configured to control the respective lighting loads 132 in response to the received digital messages. The lighting control devices 130 may be coupled to a separate digital communication link, such as an Ecosystem® or digital addressable lighting interface (DALI) communication link.

The load control environment 100 may include a digital lighting controller coupled between the digital communication link 104 and the separate communication link. The lighting control devices 130 may include internal RF communication circuits or be coupled to external RF communication circuits (e.g., mounted external to the lighting fixtures, such as to a ceiling) for transmitting and/or receiving the RF signals 106. The load control environment 100 may further include other types of remotely-located lighting control devices, such as, for example, electronic dimming ballasts for driving fluorescent lamps.

The load control environment 100 may include a plurality of daylight control devices, e.g., motorized window treatments 140, such as motorized roller shades. The load control environment 100 may utilize the plurality of daylight control devices to control the amount of daylight entering the building in which the load control environment 100 is installed. Each motorized window treatment 140 may include an electronic drive unit 142. The electronic drive unit 142 may be located inside a motorized window treatment 140, such as inside a roller tube of the motorized roller shade. The electronic drive units 142 may be coupled to the digital communication link 104, for example, to transmit and/or receive digital messages. The electronic drive units 142 may be configured to adjust the position of a covering material, such as a window treatment fabric, in response to digital messages received from the system controller 110 via the digital communication link. Each of the electronic drive units 142 may include an internal RF communication circuit or be coupled to an external RF communication circuit (e.g., located outside of the roller tube), for example, to transmit and/or receive the RF signals 106. The load control environment 100 may include other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device.

The load control environment 100 may include one or more heating/cooling devices, such as heating/cooling devices 170. The heating/cooling devices 170 may be utilized to control the temperature of the building in which the load control environment 100 is installed. Each heating/cooling device 170 may include an electronic switch for heating/cooling the building. The heating/cooling devices 170 may include a heating, ventilating, and air conditioning (HVAC) system, an air conditioner, or other device capable of heating and/or cooling a space via an electrical load. The heating/cooling devices 170 may be coupled to the digital communication link 104, for example, to transmit and/or receive digital messages. The heating/cooling devices 170 may be configured to adjust the temperature of the space in a building in response to digital messages received from the system controller 110 via the digital communication link 104. Each heating/cooling device 170 may include an RF communication circuit or be coupled to an external RF communication circuit, for example, to transmit and/or receive the RF signals 106.

The load control environment 100 may include one or more other types of load control devices, such as a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative power controller.

The load control devices may provide feedback to the system controller 110. The motorized window treatments 140 may provide feedback indicating a relative level of the covering material. The lighting control devices 130 may provide feedback indicating the lighting intensity level (e.g., dimming level) of the lighting control devices 130. The heating/cooling devices 170 may provide feedback indicating when the devices are on. The system controller 110 may determine a status of the load control devices based on the feedback. The system controller 110 may also, or alternatively, determine the status of the load control devices from the inputs received from input devices.

The load control environment 100 may include one or more input devices, e.g., such as a wired keypad device 150, a battery-powered remote control device 152, an occupancy sensor 154, a daylight sensor 156, a radio window sensor 157, a temperature control device 166, a wearable wireless device 167, a network device 165, and/or a photo sensing device 169. The wired keypad device 150 may be configured to transmit digital messages to the system controller 110 via the digital communication link 104 in response to an actuation of one or more buttons of the wired keypad device. The battery-powered remote control device 152, the occupancy sensor 154, the daylight sensor 156, the radio window sensor 157, the temperature control device 166, and/or the photo sensing device 169 may be wireless control devices (e.g., RF transmitters, receivers, or transceivers) configured to transmit and/or receive digital messages. The digital messages may be communicated directly between devices or via the system controller 110 via the RF signals 106 (e.g., directly to the system controller 110).

The battery-powered remote control device 152 may be configured to transmit digital messages to the system controller 110 via the RF signals 106 in response to an actuation of one or more buttons of the battery-powered remote control device. The system controller 110 may be configured to transmit one or more digital messages to the load control devices (e.g., the dimmer switch 120, the lighting control devices 130, and/or the motorized window treatments 140) in response to the digital messages received from the wired keypad device 150, the battery-powered remote control device 152, the occupancy sensor 154, the daylight sensor 156, and/or the radio window sensor 157.

The temperature control device 166 may be a thermostat or a temperature sensor configured to identify an interior temperature. The temperature control device 166 may be a temperature sensor configured to identify an exterior temperature. Though the control environment 100 includes a single temperature control device 166, the load control environment may include a thermostat or a temperature sensor configured to identify an interior temperature and a temperature sensor configured to identify an exterior temperature. The thermostat may identify a setpoint temperature and transmit digital messages for controlling the heating/cooling devices 170 to reach the setpoint temperature in a space in a building. The temperature sensors may identify an internal or external temperature and transmit the temperature to the system controller 110.

The input devices may include a network device 165 and/or a wearable wireless device 167. The wearable wireless device 167 may be a control device capable of transmitting digital messages for controlling one or more characteristics of the load control environment 100. The wearable wireless device 167 may be a device capable of being worn by a user and may act as a control-source device for communicating digital messages for controlling one or more electrical loads of the load control environment 100. As shown in FIG. 1, the wearable wireless device 167 may be an armband (e.g., a smart watch or other device capable of being worn on the arm of a user). The wearable wireless device 167 may alternatively include a ring, glasses, a headset, clothing (e.g., shirts, gloves, etc.), or other wearable control device capable of performing as described herein.

The wearable wireless device 167 may communicate directly with the system controller 110, or may send digital messages to and/or receive digital messages from one or more intermediate devices capable of communicating with the wearable wireless device 167. For example, the wearable wireless device 167 may communicate with network device 165. The network device 165 may be a cellular phone, a tablet, a laptop, or other computing device capable of performing communications on a wireless network. The network device 165 may be a control device capable of receiving digital messages from the wearable wireless device 167 and transmitting digital messages to the system controller 110 and/or one or more control-target devices for controlling an electrical load.

The network device 165 may include one or more communication circuits capable of communicating with the system controller 110 and/or the wearable wireless device 167. The communication circuits may be capable of communicating via different wireless frequencies and/or communication protocols. For example, the network device 165 may be capable of communicating with the system controller 110 and the wearable wireless device 167 via different wireless signals (e.g., RF signals). Different communication circuits may enable the network device 165 to communicate with the wearable wireless device 167 via a one protocol or frequency, and with the system controller 110 or control-target devices via another protocol or frequency. Though input devices may be shown as being capable of wired or wireless communications (e.g., via RF signals), each input device may be wired and/or wireless.

The load control environment 100 may further include a wireless adapter device 158 coupled to the digital communication link 104. The wireless adapter device 158 may be configured to transmit and/or receive the RF signals 106. The wireless adapter device 158 may be configured to transmit a digital message to the system controller 110 via the digital communication link 104 in response to a digital message received from one of the wireless control devices via the RF signals 106. For example, the wireless adapter device 158 may re-transmit the digital messages received from the wireless control devices on the digital communication link 104.

The occupancy sensor 154 may be configured to detect occupancy and/or vacancy conditions in the space in which the load control system is installed. The occupancy sensor 154 may transmit digital messages to the system controller 110 via the RF signals 106 in response to detecting the occupancy or vacancy conditions. The system controller 110 may be configured to turn one or more of the lighting load 122 and/or the LED light sources 132 on and off in response to receiving an occupied command and a vacant command, respectively. The occupancy sensor 154 may operate as a vacancy sensor, such that the lighting loads are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system is installed. The daylight sensor 156 may transmit digital messages including the measured light intensity to the system controller 110 via the RF signals 106 for controlling the intensities of one or more of the lighting load 122 and/or the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The radio window sensor 157 may be configured to measure an exterior light intensity coming from outside the space in which the load control system is installed. The radio window sensor 157 may be mounted on a façade of a building, such as the exterior or interior of a window, to measure the exterior natural light intensity depending upon the location of the sun in sky. The radio window sensor 157 may detect when direct sunlight is directly shining into the radio window sensor 157, is reflected onto the radio window sensor 157, or is blocked by external means, such as clouds or a building, and may send digital messages indicating the measured light intensity. The radio window sensor 157 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132, the temperature of the heating/cooling devices 170) via one or more control load control devices (e.g., the dimmer switch 120, the electronic drive unit 142, the LED driver 130). The radio window sensor 157 may also be referred to as a shadow sensor, a cloudy-day sensor, a sun sensor, or another sensor that may measure an external light intensity coming from outside of a space.

The photo sensing device 169 may be configured to measure an interior light intensity within the space in which the load control system is installed. The photo sensing device 169 may be mounted within a room in a building to measure the total illuminance detected in the load control environment 100. The photo sensing device 169 may transmit digital messages including the measured light intensity to the system controller 110 via the RF signals 106. The digital messages may be used to control an electrical load (e.g., the intensity of lighting load 122, the motorized window treatments 140 for controlling the position of the covering material, the intensity of the LED light sources 132, the temperature of the heating/cooling devices 170) via one or more control load control devices (e.g., the dimmer switch 120, the electronic drive unit 142, the LED driver 130).

The load control environment 100 may include other types of input devices, such as, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, timeclocks, audio-visual controls, safety devices, power monitoring devices (e.g., power meters, power meters, utility submeters, utility rate meters, etc.), central control transmitters, residential controllers, commercial controllers, industrial controllers, or any combination of input devices.

The system controller 110 may be configured to be coupled to a network, such as a wireless or wired local area network (LAN) via a network communication bus 160 (e.g., an Ethernet communication link), for example, for access to the Internet. The system controller 110 may be connected to a router or other switching device 162 (e.g., Ethernet switch) via the network communication bus 160 for allowing the system controller 110 to communicate with additional system controllers for controlling additional electrical loads. The system controller 110 may be wirelessly connected to the network. The system controller 110 may be configured to communicate via the network with one or more network devices, such as network device 164. The network device 164 may be a smart phone, a personal computer 164, a laptop, a tablet device, (e.g., a hand-held computing device), a wireless-communication-capable television, and/or any other suitable Internet-Protocol-enabled device. The network device may be configured to transmit digital messages to the system controller 110 in one or more Internet Protocol packets. Examples of load control systems configured to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control environment 100 may be programmed and/or configured using the network device 164 or other network device. The network device 164 may execute a graphical user interface (GUI) configuration software for allowing a user to program how the load control environment 100 may operate. The configuration software may generate a load control database or other dataset that defines the operation of the load control environment 100. For example, the load control database or dataset may include information regarding the operational settings of different load control devices of the load control system (e.g., the dimmer switch 120, the lighting control devices 130, and/or the motorized window treatments 140). The load control database or dataset may include information regarding associations between the load control devices and the input devices, and information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The system controller 110 may be configured to select a preset (e.g., a scene) for controlling one or more of the electrical loads of the load control environment 100. A preset may be a predefined setting that may be defined at the time of commissioning of the load control environment 100. For example, one of the actuators of the wired keypad device 150 and/or the battery-powered remote control device 152 may allow for the selection of a lighting preset and/or a motorized window treatment preset. The preset configuration may be included in preset data. The preset data may include, for example, a level, a fade time, and/or a delay time, for one or more load control devices. The preset level may be a lighting intensity level, a window treatment level (e.g., level of the bottom of the window shade), or another preset level to which a load control device may control an electrical load. The fade time may be the length of time over which the lighting intensity level may be changed, the length of time over which the window treatment level may be changed, or another length of time over which a load control device may control an electrical load to change to the preset level. The fade time may be indicated by a fade rate, which may be the speed at which the preset level may be changed. The delay time may be the period of time that a device may delay before the preset is implemented.

The lighting preset may be characterized by a target light intensity for one or more of the lighting loads 122 and the LED light engines 132. The motorized window treatment preset may be characterized by a target position for one or more of the motorized window treatments 140. The lighting preset and/or the motorized window treatment preset may be characterized by one or more fade times (e.g., the length of the time period over which the lighting loads 122, 132 are adjusted from the present intensity to the target intensity or over which the position of the motorized window treatments 140 are adjusted). The fade time may be the same or different for each controlled electrical load of the lighting preset and/or the motorized window treatment preset. The lighting preset and/or the motorized window treatment preset may be characterized by a delay time (e.g., the length of the time period from when the preset selection is made until the controlled loads begin to adjust the light intensity or motorized window treatment position).

The load control devices may each store a device dataset (e.g., a partial load control dataset and/or database). The device dataset may predefine the operation of that load control device in response to one or more presets. The device dataset may store operation information of the load control devices. For example, the device dataset may store commands, preset data, and/or multi-output commands. The device dataset may include preset data for each preset. The preset data may include the preset configuration, such as the level (e.g., lighting intensity level, window treatment level, etc.), the fade time, and/or the delay time, for one or more load control devices. The system controller 110 may be configured to assign each load control device a unique address for load control and may transmit the respective device datasets to the associated load control devices. The system controller 110 may assign each load control device and/or transmit the device datasets during a commissioning procedure of the load control environment 100. During the commissioning procedure, the system controller 110 and/or the load control devices may be in a commissioning mode (e.g., setup mode) for configuring one or more devices in the load control environment 100.

The device dataset may be transmitted to one or more load control devices of the load control environment 100. The load control devices of the load control environment 100 may download the device dataset and store the device dataset in memory. The load control devices may download the device dataset during commissioning and/or upon user request or command. The device dataset may include the preset data, which may be referenced by the load control devices upon receipt of a preset command.

The system controller 110 may be configured to transmit (e.g., broadcast) a preset command to the load control devices of the load control environment 100. The transmission of the preset command may be in response to the selection of a preset. The preset command may be transmitted in a single digital message. The preset command may describe the selected preset or operation of the load control devices according to the selected preset. For example, the preset command may include a preset identifier (e.g., a preset name or number). The preset command may include a load control device identifier with the preset identifier. The load control device may access the device dataset and lookup the preset identified in the preset command to determine how to operate according to a preset identified in a preset command received from the system controller 110.

The load control environment 100 may be implemented to optimize power consumption when one or more electrical loads are controlled. For example, the system controller 110 may send digital messages to lighting control devices 130, motorized window treatments 140, heating/cooling devices 170, and/or other load control devices for controlling the electrical loads controlled by the load control devices.

The load control devices may be controlled in a manner based on occupant comfort. For example, the system controller 110 may manage occupant comfort by managing one or more comfort metrics that may be calculated from comfort variables that may be monitored for controlling electrical loads in the load control environment. The comfort metrics may indicate aspects of occupant comfort in a load control environment, such as a thermal comfort level, a daylight glare level, and/or a lighting level within the load control environment. The comfort variables may include parameters that may be measured or calculated and upon which the comfort metrics may be calculated. For example, the comfort variables may include occupancy parameters, levels of direct daylight, indoor temperature, outside temperature, a lighting intensity level, an amount of daylight being received, a total light level, a level of the covering material for a motorized window treatment, and/or the like in the load control environment 100.

The system controller 110 may set a threshold for the comfort metrics. The threshold for the comfort metrics may be a minimum level of comfort for one or more occupants based on one or more comfort variables in the load control environment. The system controller 110 may control one or more load control devices to prevent the load control environment 100 from going below a threshold comfort level, or the system controller 110 may control the one or more load control devices once the threshold comfort level has been reached. For example, the system controller 110 may control one or more load control devices (e.g., lighting control devices 130, motorized window treatments 140, etc.) to prevent the load control environment 100 from going below a threshold lighting level, or once the lighting level has reached the threshold level. The system controller 110 may control one or more load control devices (e.g., motorized window treatments 140) to prevent the load control environment 100 from going above a threshold level of daylight glare probability, or once the level of daylight glare probability has reached the threshold level. The system controller 110 may control one or more load control devices (e.g., motorized window treatments 140, heating/cooling devices 170, etc.) to prevent the load control environment 100 from going below a threshold level of thermal comfort, or once the level of thermal comfort has reached the threshold level.

The threshold for the comfort metrics may be a target comfort level for one or more occupants based on one or more comfort variables in the load control environment. The system controller 110 may control one or more load control devices to achieve a target comfort level for one or more occupants. For example, the system controller 110 may control one or more load control devices (e.g., lighting control devices 130, motorized window treatments 140, etc.) to achieve a target lighting level. The system controller 110 may control one or more load control devices (e.g., motorized window treatments 140) to achieve a target level of daylight glare probability and/or limit daylight glare. The system controller 110 may control one or more load control devices (e.g., motorized window treatments 140, heating/cooling devices 170, etc.) to achieve a target level of thermal comfort.

The system controller 110 may monitor one or more of a number of comfort variables for each comfort metric to determine whether the comfort threshold corresponding to the comfort metric has been reached, or whether the comfort threshold corresponding to the comfort metric is within a predefined threshold. The lighting level in the load control environment 100 may be calculated at the system controller 110 based on comfort variables, such as a lighting intensity level of one or more lighting control devices, an amount of natural light detected, and/or a total illuminance detected in the load control environment. The amount of natural light may be measured by the daylight sensor 156 and sent to the system controller 110. The lighting intensity level may be sent to the system controller 110 from the dimmer switch 120, the remote control device 152, and/or the lighting control devices 130. The total illuminance of the load control environment may be determined by the system controller 110 based on a lighting level received from a photo sensing device 169.

The thermal comfort level in the load control environment may be calculated at the system controller 110 based on comfort variables, such as an amount of direct sunlight on the load control environment, an outdoor temperature of the load control environment, an indoor temperature of the load control environment, and/or the temperature of one or more occupants. The amount of direct sunlight on the load control environment may be measured by the radio window sensor 157. The amount of direct sunlight may also, or alternatively, be calculated based on the time of day and the direction the windows in the load control environment are facing. The outdoor temperature of the load control environment may be measured by the temperature control device 166 when located outside of the load control environment 100. The indoor temperature of the load control environment may be measured by the temperature control device 166 when located inside the load control environment. The temperature of the occupants may be measured by the wearable control device 167 or other sensor capable of measuring the temperature of occupants. The temperature of occupants may be estimated based on the number of occupants identified by occupancy and/or vacancy commands. The thermal comfort level may be calculated based on conductive heat, radiant heat, occupant heat, light heat, and/or plug or appliance heat in the load control environment.

The daylight glare level in the load control environment 100 may be calculated at the system controller 110 based on comfort variables, such as an amount of direct sunlight on the load control environment and/or a distance of glare into the load control environment. As described herein, the amount of direct sunlight on the load control environment may be measured by the radio window sensor 157. The amount of direct sunlight may be calculated based on the location of the load control environment (e.g., latitude, longitude, GPS coordinates, etc.), a time of day, and/or a direction the windows in the load control environment are facing. For example, the daylight glare level may indicate that the load control environment is receiving direct sunlight when in a location that is receiving sunlight, and/or when the windows are facing the direction of the sun.

The system controller 110 may assign a value to the comfort metric based on the comfort variables corresponding to the comfort metric. For example, the value of the comfort metric may be incremented according to the value of each parameter. The comfort variables upon which the comfort metric is calculated may be weighted differently. The distance of glare into the load control environment may be calculated based on the angle of the sun and the level of the covering material on the motorized window treatments 140.

The system controller 110 may detect that the values of the comfort metrics are at a defined threshold or are within a predefined value of the threshold and may send control instructions to the load control devices to increase value of the comfort metrics. For example, the system controller 110 may improve the lighting level by sending control instructions to the lighting control devices 130 to increase lighting level and/or to the motorized window treatment 140 to raise the window treatment to increase the lighting level in the load control environment. The lighting level may be increased until the lighting level is above the defined threshold (e.g., by a predefined amount).

The system controller 110 may control one or more load control devices to prevent the load control environment from going above a threshold daylight glare probability level, or once the daylight glare probability level has reached the threshold value. For example, the system controller 110 may improve the daylight glare probability level by sending control instructions to the motorized window treatments 140 to lower the shade level of the motorized window treatments and decrease the daylight glare level from the sun in the load control environment. The daylight glare level may be decreased until the daylight glare level is below the defined threshold (e.g., by a predefined amount).

The system controller 110 may control one or more load control devices to prevent the load control environment from going below a threshold for the thermal comfort level, or once the thermal comfort level has reached the threshold value. The system controller 110 may send control instructions to the motorized window treatment 140 to raise/lower the window treatment to increase/decrease the thermal comfort level from the sun in the load control environment. The system controller 110 may send control instructions to the motorized window treatment 140 to increase/decrease the setpoint temperature of a temperature control device to increase/decrease the thermal comfort level in the load control environment.

The lighting level, the daylight glare level, and the thermal comfort level may be used independently or in any combination to calculate a total comfort metric. The total comfort metric may be expressed as a relative value (e.g., 0 to 10, 0 to 100, etc.) or as measurable values related to the type of comfort threshold (e.g., temperature values for the thermal comfort level metric, lumens for lighting level, etc.). The total comfort metric may indicates a total comfort of the occupant or occupants of the load control environment.

The power consumption in the load control environment may be optimized by reducing the total cost or consumption of power, while maintaining a target or minimum level of comfort to the occupants according to the comfort metrics. The system controller 110 may predictively and adaptively control the lighting intensity of lighting control device 130, the position of motorized window treatment control device 140, and/or the temperature of the load control environment produced by heating/cooling device 170 using data, such as predefined, real-time, and/or historic data, to reduce the total power consumption of the load control environment, while maintaining a minimum level for the comfort metrics. The minimum level of performance and comfort may be achieved by balancing the lighting level in the load control environment controlled by the lighting control devices 130, the window treatment level controlled by the motorized window treatment devices 140, and/or a temperature level of the load control environment controlled by the heating/cooling devices 170. By balancing the temperature level, the window treatment level, and/or the lighting level in the load control environment, the amount of power that may be consumed in total may be reduced, while maintaining a minimum or target level of comfort.

The system controller 110 may attempt to decrease the total amount of power being consumed in the load control environment while maintaining a comfort level allowed according to the threshold set for the occupants. The total amount of power being consumed in the load control environment may include a lighting power consumption, a power consumption by the HVAC system (e.g., the heating/cooling power), the power consumption related to a daylight glare probability level, and/or the like. The system controller 110 may attempt to decrease one or more of a lighting power consumption, a power consumption by the HVAC system, the power consumption related to a daylight glare probability level, and/or the like. The reduction in power consumption may be balanced with the change in comfort to determine how or whether to operate devices in the load control environment.

For example, the system controller 110 may attempt to decrease the heating/cooling power by increasing or decreasing the setpoint temperature of the temperature control device 166, while maintaining the thermal comfort level allowed according to the threshold set for the thermal comfort level of the occupants. The system controller 110 may raise the level of the covering material for the motorized window treatments 140 to allow external heat to enter the load control environment and further reduce the setpoint temperature of the temperature control device 166, while maintaining the thermal comfort level allowed according to the threshold set for the thermal comfort level of the occupants. The system controller 110 may lower the level of the covering material for the motorized window treatments 140 to prevent internal heat from leaving the load control environment and further reduce the setpoint temperature of the temperature control device 166, while maintaining the thermal comfort level allowed according to the threshold set for the thermal comfort level of the occupants. The level of the covering material for the motorized window treatments 140 may be limited to prevent the glare threshold of the occupants from being exceeded (e.g., when the load control environment is receiving direct sunlight.)

The power consumption in the load control environment may be associated with a power cost $P_{COST}$ (e.g., a monetary cost). A reduction/increase of the power consumption may be translated to a corresponding reduction/increase in the monetary cost. The power consumption and/or the corresponding cost may be reduced as long as the reduction of corresponding cost does not overweigh a cost associated with a comfort loss. The power consumption and/or the corresponding cost may be increased as long as the increase in the corresponding power cost does not overweigh a value (e.g., monetary value) of a comfort gain. The cost corresponding to the comfort loss and/or the value corresponding to the comfort gain may be determined by calculating comfort metrics associated with the comfort variables. The power consumption and/or the corresponding cost may be determined by calculating a power cost $P_{COST}$ associated with lighting parameters, HVAC parameters, and/or other power parameters.

The power consumption and/or the cost associated with power parameters, such as lighting and HVAC parameters, may be monitored to determine how or whether to operate devices in the load control environment. A power metric may indicate a cost associated with a power parameter. For example, a lighting power metric $P_L$ may indicate a lighting power consumption, and/or a heating/cooling power metric $P_{H/C}$ may indicate a heating/cooling power consumption. A total power metric $P_T$ (e.g., a total power cost) in the load control environment may be calculated by adding the lighting power metric $P_L$ to the heating/cooling power metric $P_{H/C}$, e.g., $$P_T = P_L + P_{H/C}. \quad \text{(Equation 1)}$$

Though the equation considers the amount of power used by heating/cooling devices 170 and lighting control devices 130, other load control devices and/or electrical loads may also be considered. For example, the amount of power used by the motorized window treatments 140 may be relatively small compared to the amount of power used by the lighting control devices 130 and/or the heating/cooling devices 170, but may be included in Equation 1.

A decrease of total power metric $P_T$ in the load control environment may reduce the comfort level. The system controller 110 may attempt to decrease the total power metric $P_T$ (e.g., the total amount of power being consumed in the load control environment) while comparing a resulting reduction of a power cost $P_{COST}$ with a resulting comfort loss. The system controller 110 may determine whether the resulting comfort loss outweighs the resulting power savings.

The system controller 110 may quantify a comfort cost $C_{COST}$ using a monetary value per unit comfort rating and a change of the comfort rating. The system controller 110 may determine a change of a comfort rating $C_R$ before making a change in the load control environment that may affect the power cost $P_{COST}$ and/or the comfort cost $C_{COST}$. For example, before making a change in the load control environment that may affect the power cost $P_{COST}$ and/or the comfort cost $C_{COST}$, a comfort rating $C_{R1}$ associated with the load control environment may be determined (e.g., as described herein). The system controller 110 may estimate a comfort rating $C_{R2}$ that may be the comfort rating if the change is made. A change of the comfort rating (e.g., a delta of $C_{R2}$ and $C_{R1}$) may be calculated by subtracting the comfort rating $C_{R1}$ from the comfort rating $C_{R2}$. The system controller 110 may calculate the comfort cost $C_{COST}$ by multiplying the change of a comfort rating $C_R$ and a monetary value per unit comfort rating $c, e.g., $$C_{COST} = (C_{R2} - C_{R1}) \cdot \$c. \quad \text{(Equation 2)}$$

The monetary value per unit comfort rating $c (e.g., $/C_R$) may be determined by an administrator of the load control environment 100 (e.g., a building manager). The administrator may adjust and/or change the monetary value per unit comfort rating $c based on data collected while managing the load control environment 100. The data collected while managing the load control environment 100 may include data regarding productivity for a load control environment, a usage of the room (e.g., a private office or a conference room), occupancy conditions, and/or the like.

The administrator may adjust and/or change the monetary value per unit comfort rating $c based on data collected while managing the load control environment 100. For example, the administrator may select an initial value for $c and/or may select a comfort rating level (e.g., high, medium, low), which may indicate the initial value for $c. A selection of the initial value and/or comfort rating level may be based on inputs by occupants and/or an occupant survey. The system controller 110 may start with the initial value for the monetary value $c and adjust the $c over time. For example, the system controller 110 may learn the monetary value per unit comfort rating $c by a process and/or a program designed to learn the monetary value $c.

The system controller 110 may quantify the power cost $P_{COST}$ using a monetary value per unit power rating and a change of the power rating $P_R$ as shown in Equation 3. The system controller 110 may determine a change of a power rating $P_R$ before making a change in the load control environment that may affect the power cost $P_{COST}$ and/or the comfort cost $C_{COST}$. For example, before making a change in the load control environment that may affect the power cost $P_{COST}$ and/or the comfort cost $C_{COST}$, a power rating $P_{R1}$ associated with the load control environment may be determined (e.g., as described herein). The system controller 110 may estimate the power rating to be $P_{R2}$ if the change is made. A change of the power rating (e.g., a delta of $P_{R2}$ and $P_{R1}$) may be calculated by subtracting the power rating $P_{R1}$ from the comfort rating $P_{R2}$. The system controller 110 may calculate the power cost $P_{COST}$ by multiplying the change of a power rating $P_R$ and a monetary value per unit power rating $p, e.g., $$P_{COST}=(P_{R2}-P_{R1})\cdot \$p. \quad \text{(Equation 3)}$$

The monetary value per unit power rating $p may be calculated based on economics of power in the form of electricity, gas, solar, wind, and/or other power resources. The economics of power may be determined based on data collected by providers of the power resources (e.g., historical data stored by a utility company). The monetary value per unit power rating $p may be received from the utility company, for example, at the time of calculation of the power cost $P_{COST}$ (e.g., the monetary value per unit power rating $p may be a real-time pricing input).

The system controller 110 may compare the comfort cost $C_{COST}$ to the power cost $P_{COST}$. The system controller 110 may determine that comfort cost $C_{COST}$ represents a comfort gain and/or power cost $P_{COST}$ represents a power loss. If the comfort gain outweighs the power loss, the system controller may determine to make a change to the system that may result the comfort gain and/or the power loss. The system controller 110 may determine that the comfort cost $C_{COST}$ represents a comfort loss and/or the power cost $P_{COST}$ represents a power saving. If the power saving outweighs comfort loss, the system controller may determine to make a change to the system that may result in the power saving. For example, the system controller may make a change to the system that may result in the power saving while ensuring that the comfort rating stays within an acceptable comfort rating range.

Figure 2A:
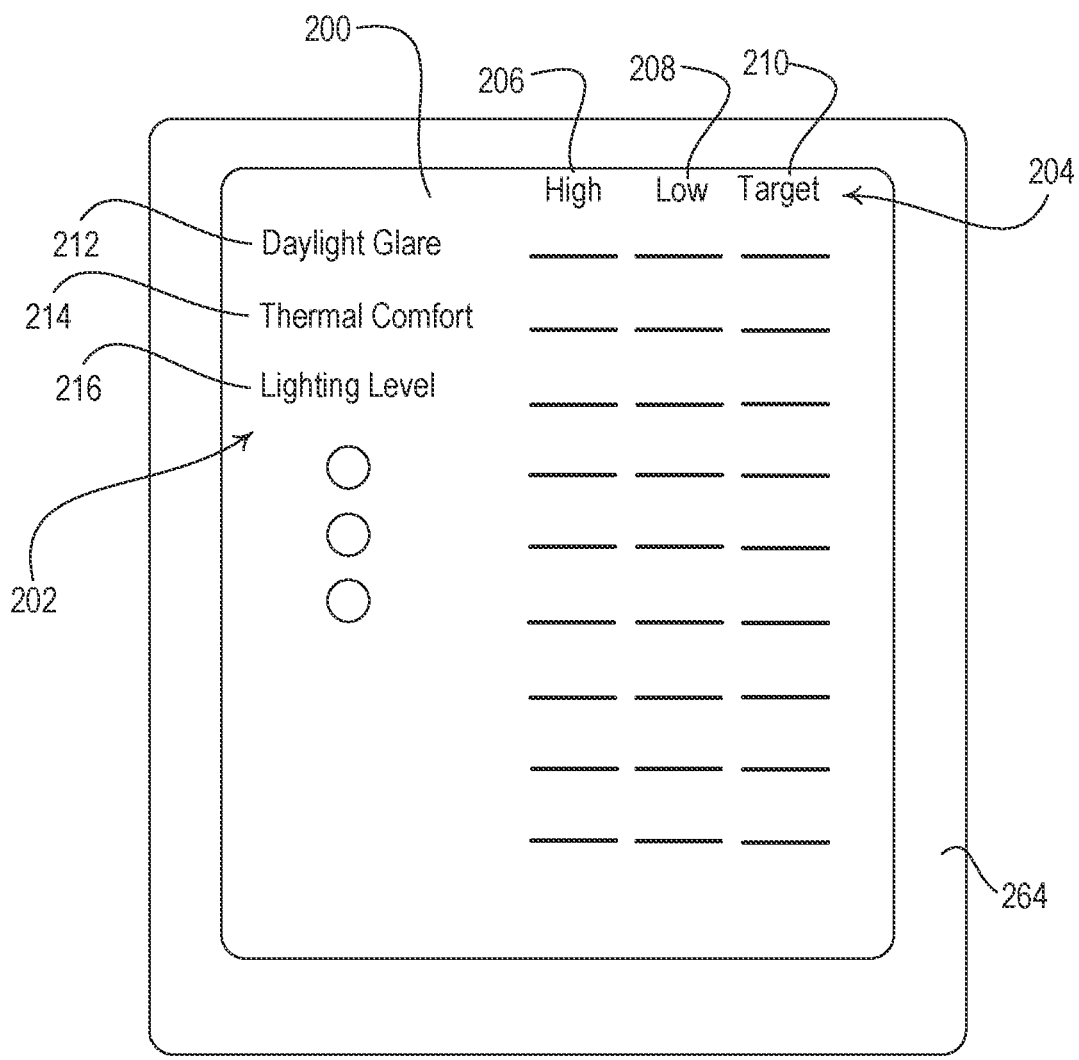
FIGS. 2A and 2B are diagrams illustrating example graphical user interfaces that may be displayed on a network device.
Figure 2B:
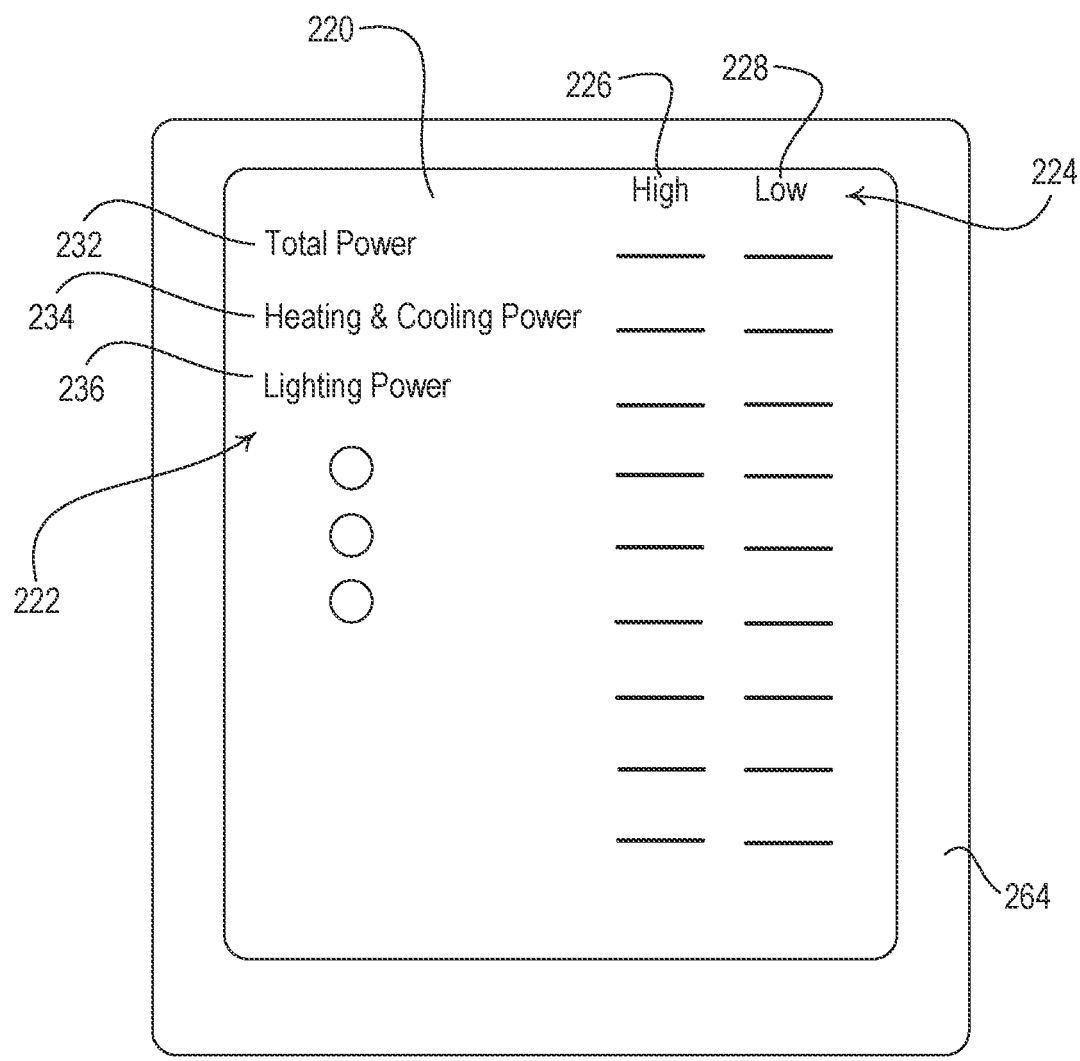

FIGS. 2A and 2B are diagrams illustrating graphical user interfaces 200, 220 that may be displayed on a network device 264 for retrieving thresholds 204, 224 for comfort metrics 202 and power metrics 222, respectively (e.g., as defined by a user of the network device). Though the thresholds 204, 224 may be illustrated as being defined on different graphical user interfaces 200, 220, the thresholds may be defined in the same interface.

As shown in FIG. 2A, a user may input comfort thresholds 204 for comfort metrics 202. In addition, the comfort thresholds 204 for the comfort metrics 202 may include daylight glare level 212, thermal comfort level 214, lighting level 216, and/or other comfort metrics. The comfort thresholds 204 may include a high threshold 206, a low threshold 208, and/or a target threshold 210. The comfort thresholds 204 may be expressed as relative values (e.g., between 0 and 10, 0 and 100, etc.) and/or as measurable values related to the type of comfort threshold (e.g., temperature values for a thermal comfort level 214, lux or foot candles for a lighting level 216, luminance meters for a daylight glare level 212, etc.). If the comfort thresholds 204 are expressed as relative values, each value may represent one or more actual values related to the different types of comfort thresholds 204. The high threshold 206 may be a maximum threshold value and the low threshold 208 may be a minimum threshold value. The target threshold 210 may be a preferred value (e.g., between the high threshold and the low threshold) at which the user may wish to operate the load control devices to ensure a level of comfort. The comfort thresholds 204 may be defined differently for different zones (e.g., rooms, floors, room types, etc.) and/or different users.

A comfort metric 202 may have a high threshold 206 or a low threshold 208, as the high threshold or the low threshold may be inapplicable to some comfort metrics. For example, the high threshold 208 may be defined for the daylight glare level 212, but a low threshold 208 may go undefined, as too little glare may not bother the occupant. The thermal comfort level 214 may have a high threshold 206 and/or a low threshold 208. The lighting level may have a low threshold 208 and/or a high threshold 206.

The network device 264 may communicate the comfort thresholds 204 for the comfort metrics 202 to a system controller, such as the system controller 110 shown in FIG. 1, to control the one or more load control devices based on the user input. The system controller may adjust the stored thresholds for comfort metrics 202 based on the user input. The system controller may operate the load control devices to keep the comfort level of the occupant below the high threshold 206, or to reduce the comfort level of the occupant once the comfort level of the occupant reaches the high threshold 206. The system controller may operate the load control devices to keep the comfort level of the occupant above the low threshold 208, or to reduce the comfort level of the occupant once the comfort level of the occupant reaches the low threshold 208. The system controller may monitor the power being used by the load control environment and may reduce the power being used, while maintaining the comfort of the occupant.

The system controller may attempt to maintain each of the comfort metrics at the target threshold 210. The load control devices may be controlled, such that the comfort metrics 202 may be varied from the target threshold 210 and the comfort metrics 202 are maintained within the high threshold 206 and/or 208. The comfort metrics 202 may be given an order of priority by the user or a preconfigured priority. The order of priority may indicate the order in which the comfort metrics 202 may be varied from the target threshold 210, and/or the order in which the comfort metrics may be allowed to reach the high threshold 206 and/or the low threshold 208.

As shown in FIG. 2B, a power consumption range 224 may be identified for the power metrics 222. The power metrics 222 may include a total power 232, a heating/cooling power 234, a lighting power 236, and/or other power metrics. The power consumption range 224 may include a high power level 226 and/or a low power level 228. The power consumption range 224 may be expressed as a relative value (e.g., 0 to 10, 0 to 100, etc.) and/or as measurable values that identify an amount of power (e.g., kilowatt-hours (kWhs), etc.). The power consumption range 224 may also, or alternatively, be expressed as a cost. If the power consumption range 224 is expressed as relative values, each value may represent one or more measurable values related to an amount of power used and/or a cost. The high power level 226 may be a maximum power level and the low power level 228 may be a minimum power level. The high power level 226 may be a targeted power level that may be exceeded by a predetermined amount and/or for a predetermined period of time.

The power consumption range 224 may be calculated for each power metric 222 based on the comfort thresholds 204 that are defined for the comfort metrics 202. The power consumption range 224 may be estimated for each power metric 222 based on historic power consumption data collected from a load control environment having the same or similar devices operating at the same or similar comfort levels. In another example, the power consumption range 224 may be set to a predefined value and updated as the load control system operates according to the comfort variables. The power consumption range 224 may be calculated by the network device 264 or a system controller. The power consumption range 224 may be user defined or modified by the user and may be updated based on changes to the defined comfort thresholds 204. The power consumption range 224 may be defined differently for different zones (e.g., rooms, floors, room types, etc.) and/or different users. A power metric 222 may be defined by a high threshold 226, while the low threshold 228 may be set to a default value (e.g., zero, null, or other default minimum value for operating the load control devices).

The power consumption range 224 for each of the power metrics 222 may be defined based on a number of load control devices and/or electrical loads in the load control environment. The power metrics 222 may identify an amount of power used by one or more load control devices, or identify a total amount of power used in the load control environment. The power consumption range 224 may increase/decrease (e.g., by a predefined amount) as electrical loads and/or load control devices increase/decrease.

The load control devices in the load control environment may be controlled to maintain the power consumption level within the defined power consumption range 224 for the power metrics 222, while preventing the comfort metrics from falling outside of a defined threshold. The load control devices may be controlled automatically by the system controller. In another example, the system controller may output comfort metrics, power metrics, comfort variables, power parameters, comfort metric thresholds, and/or power ranges to a consumer of power, such as a building manager or occupant of the load control environment, such that the consumer may utilize the information to reduce and/or optimize power in the load control environment, while maintaining the threshold values for the comfort metrics. The network device 264 may communicate the power consumption range 224 for the power metrics 222 to a system controller, such as the system controller 110 shown in FIG. 1, to control the one or more load control devices based on the user input. The system controller may adjust the stored ranges for the power metrics 222 based on the user input. The system controller may operate the load control devices to keep the power consumption of load control devices in the system below the high threshold 226, or to reduce the power level of the power consumption of load control devices in the system once the power level reaches the high threshold 226. The system controller may continue to reduce the power consumption of the load control devices, while maintaining the comfort of the occupant. The power metrics 222 may be given an order of priority by the user or a preconfigured priority. The order of priority may indicate the order in which the load control devices represented by the power metrics 222 may be increased and/or operated outside of the power consumption range 224.

Though multiple comfort metrics 202 may be described, the value of the comfort metrics 202 may be combined to identify a single total comfort metric. Though FIGS. 2A and 2B show the comfort metrics 202 and the power metrics 222 being defined by user input, the metrics may be predefined or otherwise defined by the load control system.

FIGS. 3A-3I depict a representative load control environment 300 for controlling electrical loads based on comfort metrics and/or power metrics. The load control environment 300 may be a room in a building, a portion of a room in a building, a floor in a building, or other load control environment in which one or more control devices may be installed. The control devices may include control-source devices and/or control-target devices, such as the control-source devices and/or the control-target devices described in FIG. 1. For example, the load control environment 300 shows control-target devices, such as a lighting control device 310 for controlling the amount of light provided by lighting loads 312, a motorized window treatment 320 for controlling the level of the covering material 322, a temperature control device 330 for controlling the temperature of the load control environment, and a plug-in control device 316 for controlling the amount of light provided by the lamp 318, though other control-target devices may be included in the load control environment 300. The load control environment 300 shows control-source devices, such as a remote control device 314, a radio window sensor 324, a daylight sensor 326, and an occupancy sensor 328, though other control-source devices may be included in the load control environment 300

The control devices (e.g., a control-source device and/or a control-target device) may communicate with each other and/or other devices via a wired and/or a wireless signal. For example, the control devices may communicate via a radio frequency (RF) signals 352 using a first wireless communication protocol. A control device may be both a control-target and a control-source device.

The load control environment 300 may include a system controller 350 configured to transmit and/or receive digital messages via wired and/or wireless communications. For example, the system controller 350 may be configured to transmit and/or receive the RF communication signals 352, to communicate with one or more control devices (e.g., control-source devices and/or control-target devices). The system controller 350 may be coupled to one or more wired control devices (e.g., control-source devices and/or control-target devices) via a wired digital communication link. The system controller 350 may be on-site at the load control environment 300 or at a remote location. Though the system controller 350 is shown as a single device, the load control environment 300 may include multiple system controllers and/or the functionality thereof may be distributed across multiple devices.

The system controller 350 may also, or alternatively, communicate via RF communication signals 354 using a second wireless communication protocol. The system controller 350 may communicate over the Internet 356, or other network, using RF communication signals 354. The RF communication signals 354 may be transmitted using a different protocol and/or wireless band than the RF communication signals 352.

The load control environment 300 may include a network device 358. The network device 358 may perform wired and/or wireless communications. Examples of the network device 358 may include a wireless phone, a tablet, a laptop, a personal digital assistant (PDA), a wearable device (e.g., a watch, glasses, etc.), and/or another computing device. The network device 358 may be a user device operated by a user 340. The network device 358 may communicate wirelessly by sending digital messages via the RF communication signals 354. The network device 358 may communicate digital messages in response to a user actuation of one or more buttons on the network device 358. Examples of load control systems having example network devices, such as smart phones and tablet devices, are described in greater detail in commonly-assigned U.S. Patent Application Publication No. 2013/0030589, published Jan. 31, 2013, entitled LOAD CONTROL DEVICE HAVING INTERNET CONNECTIVITY, and U.S. Patent Application Publication No. 2014/0177469, published Jun. 26, 2014, entitled NETWORK ACCESS COORDINATION OF LOAD CONTROL DEVICES, the entire disclosures of which are incorporated herein by reference.

The network device 358 may communicate with the system controller 350 using digital messages transmitted via the RF communication signals 354. The network device 358 may generate an application locally for displaying information received from the system controller 350 and/or receiving user input for communicating information to the system controller 350. The system controller 350 may be accessed from the network device 358 via a web interface (e.g., accessible via a web browser or other application at the network device 328), for example.

The system controller 350 may have stored thereon defined thresholds for comfort metrics and/or defined power consumption ranges for power metrics. The thresholds for the comfort metrics and/or the power consumption ranges for the power metrics may be defined by the user 340 via the network device 358. The comfort metrics may include a lighting level 360 represented in FIG. 3A and/or other comfort metrics described herein. The lighting level 360 may be determined by monitoring one or more comfort variables in the load control environment. For example, the lighting level 360 may be determined from messages received from the daylight sensor 326, the plug-in load control device 316, and/or the lighting control device 310 indicating a lighting level 360. The control-target devices in the load control environment 300 may be operated to maintain the lighting level 360 above, or within a predefined range of, the threshold 362. The threshold 362 may be a low threshold or a target threshold. Though not shown in FIG. 3A, the control-target devices in the load control environment 300 may be operated to maintain the lighting level 360 below, or within a predefined range of, a high threshold. For example, the system controller 350 may send digital messages to the lighting control device 310 and/or the plug-in control device 316 to adjust a lighting intensity level to maintain the lighting level 360 within the defined thresholds. The system controller 350 may also, or alternatively, send digital messages to the motorized window treatment 320 to adjust a level of the covering material to maintain the lighting level 360 within the defined thresholds.

The power metrics may include the lighting power metric $P_L$ 370 and/or other power metrics. The lighting power metric $P_L$ 370 may indicate an amount of lighting power used by one or more control devices within the load control environment 300. The control-target devices in the load control environment may be operated to maintain and/or reduce the lighting power metric $P_L$ 370 within a defined power consumption range 372. The lighting power metric $P_L$ 370 may be determined by monitoring one or more power parameters in the load control environment 300. For example, the lighting power metric $P_L$ 370 may be determined from the amount of power used to operate the plug-in load control device 316 and/or the lighting control device 310.

Figure 3A:
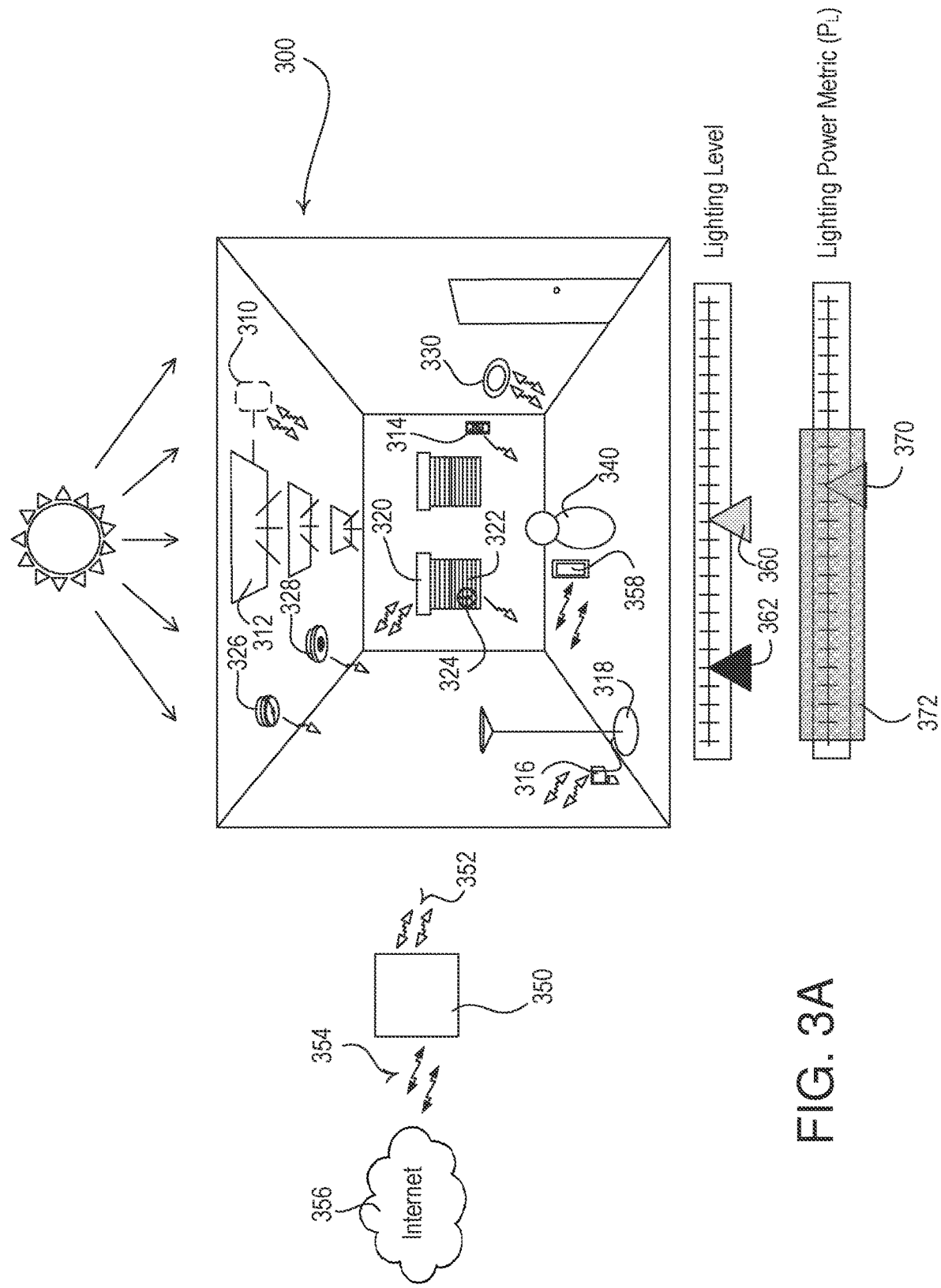
FIGS. 3A-3I depict a representative load control environment 300 for controlling electrical loads based on comfort metrics and/or power metrics.
Figure 3B:
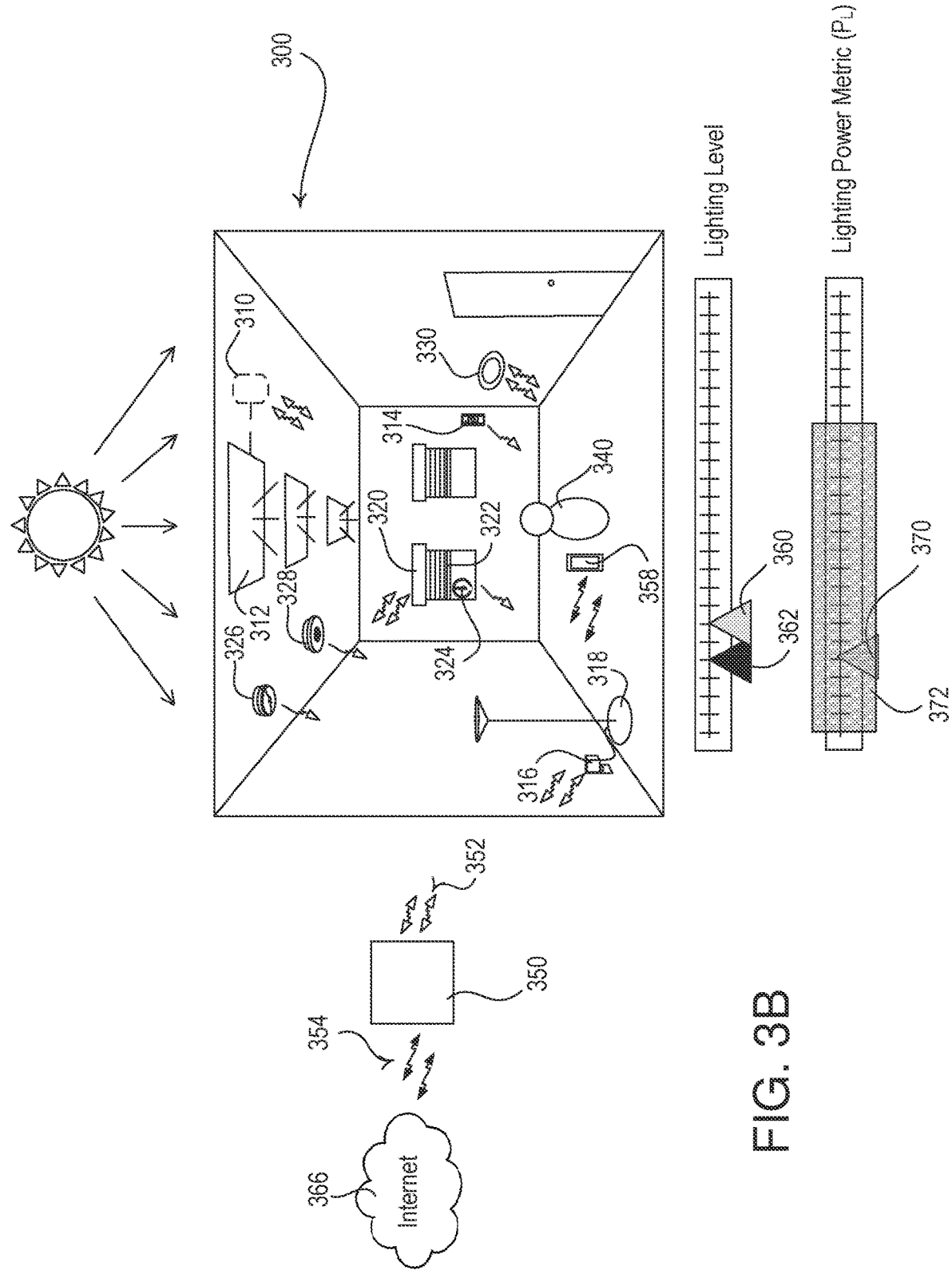

As shown in FIG. 3B, the system controller 350 may send digital messages to control-target devices to reduce the amount of power used to operate the control-target devices, while maintaining a comfort level of the user 340. For example, the system controller 350 may detect that the lighting power metric $P_L$ 370 may be reduced within the defined power consumption range 372 and may reduce the amount of power represented by the lighting power metric $P_L$ 370 within the defined power consumption range 372 by instructing the lighting control device 310 to dim the lighting loads 316 and/or instructing the plug-in control device 316 to dim the lamp 318. The lighting power metric $P_L$ 370 may be reduced to within the range 372 until the lighting level 360 is at, or within a predefined amount of, the threshold 362.

The system controller 350 may reduce the amount of power used by a control-target device by controlling other control-target devices. For example, the system controller 350 may send digital messages to the motorized window treatment 320 to control the lighting level 360. The system controller 350 may further reduce the power represented by lighting power metric $P_L$ 370, while maintaining the comfort of the user 340 (e.g., occupant), by raising the covering material 322 of the motorized window treatment 320 to allow more daylight into the load control environment 300.

Figure 3C:
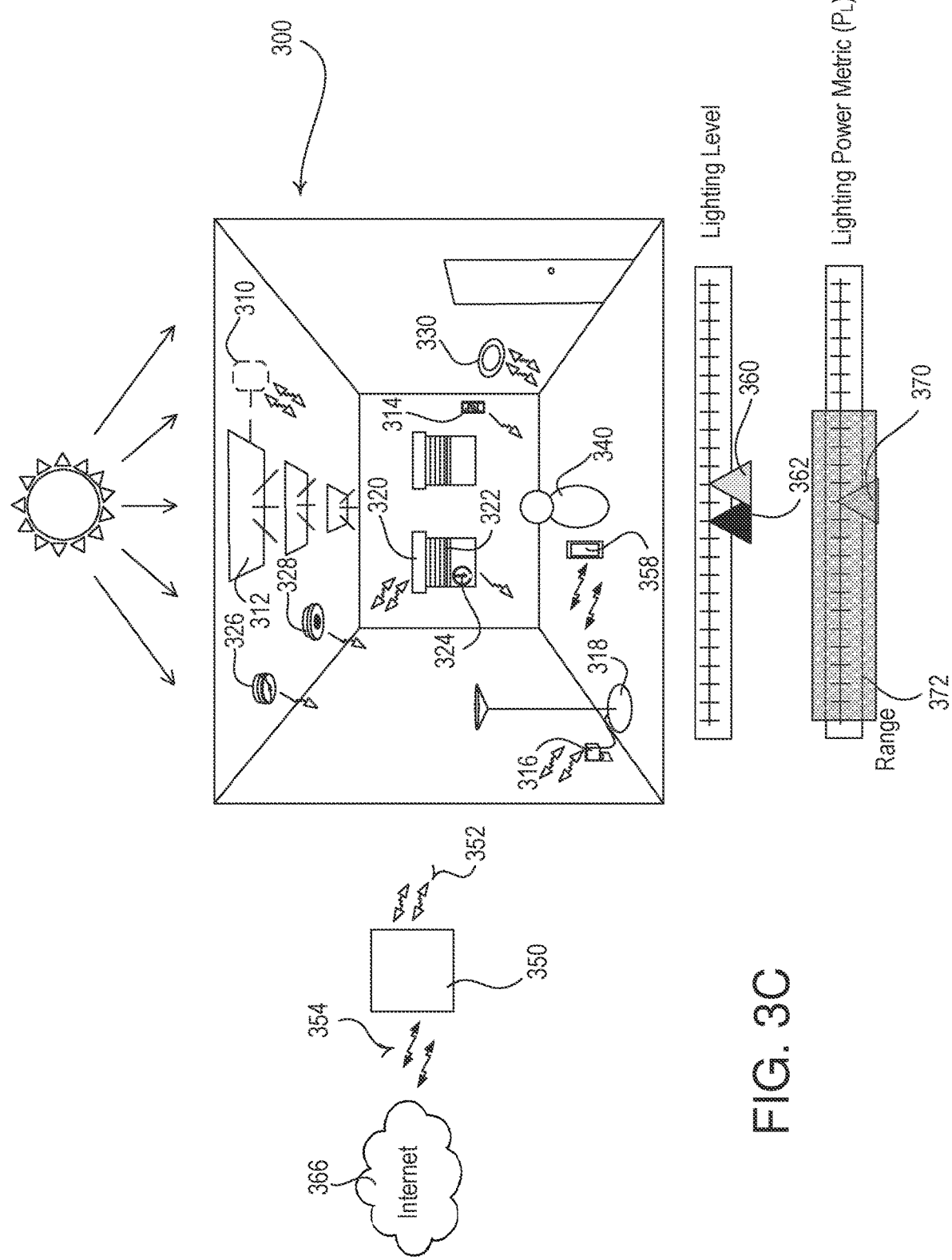

The system controller 350 may learn to adjust the comfort thresholds based on inputs received from the user 340. As shown in FIG. 3C the threshold 362 for the lighting level 360 may be increased to maintain the lighting level 360 at a higher level in the load control environment 300. The threshold 362 may be adjusted based on input received by the user 340. For example, the user 340 may adjust the lighting intensity level of the lighting control device 310 and/or the plug-in control device 316 by actuating a button on the remote control device 314. The user 340 may adjust the lighting intensity level of the lighting control device 310 and/or the plug-in control device 316 via the network device 358. The system controller 350 may detect the adjustment of the lighting intensity level and may set the threshold 362 to the lighting level 360 identified after the adjustment. The system controller 350 may adjust the threshold 362 when a change to the lighting level 360 is identified within a predefined period of time from control of a control-target device by the system controller. The adjustments to the thresholds may be implemented after identifying a predefined number of user changes (e.g., three or more), or changes by the same user. The user input may be provided in the form of feedback on network device 358. The user 340 may also, or alternatively, directly adjust the threshold 362 on the network device 358. The threshold 362, or another threshold, may be similarly decreased. Thresholds for other comfort metrics may be similarly increased and/or decreased.

Figure 3D:
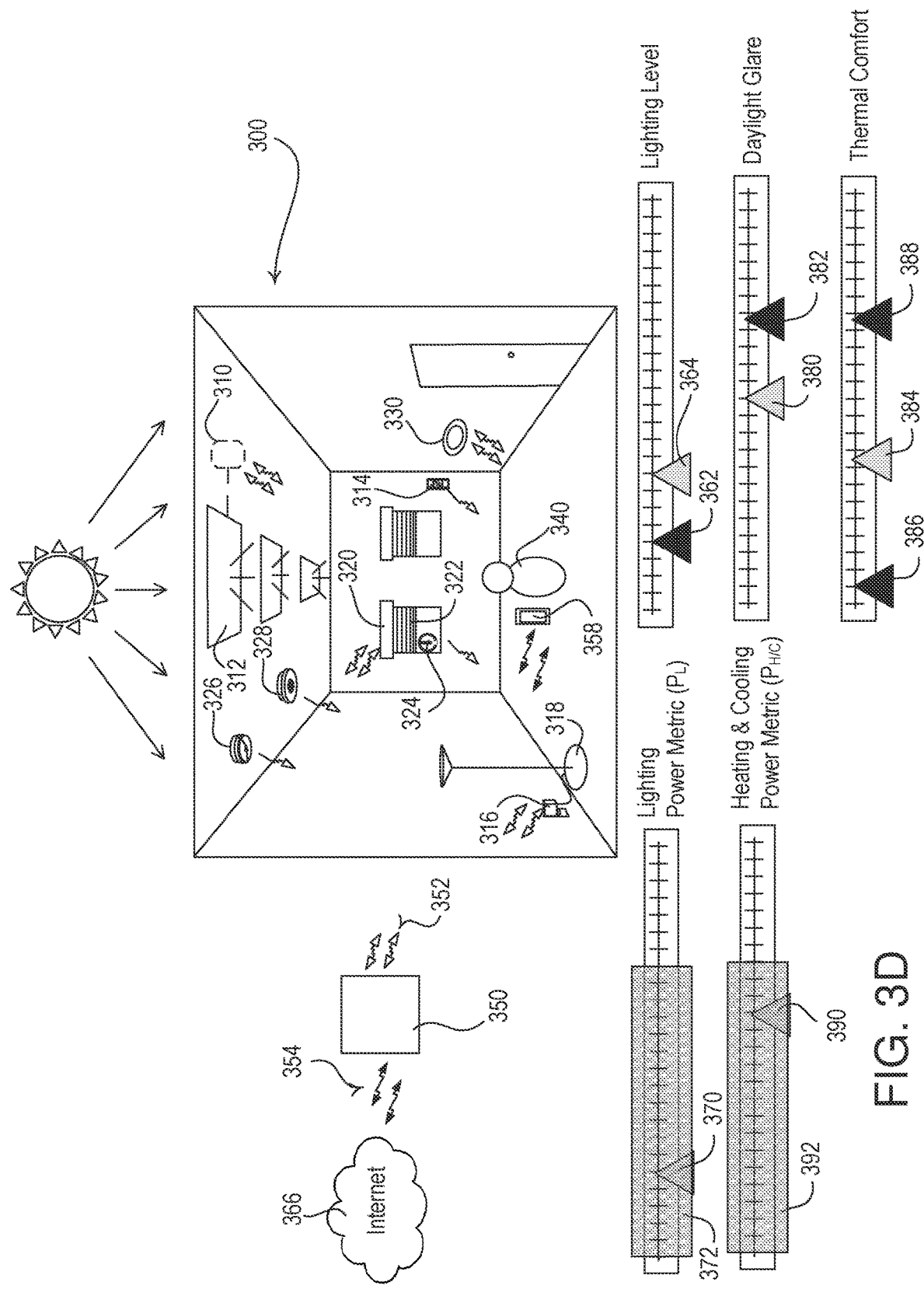

As shown in FIG. 3D, multiple comfort metrics may be considered when performing control to maintain and/or reduce the amount of power consumed by control devices in the load control environment 300. For example, the system controller 350 may detect that the increase in the level of the covering material 322 to increase the lighting level 364 may affect the daylight glare level 380. The system controller 350 may monitor the comfort variables for the daylight glare level 380 to determine when the daylight glare level 380 is at, or within a predefined range of, a threshold 382. The threshold 382 may be a high threshold or target threshold, so as to limit the daylight glare level 380 from exceeding the threshold 382. The system controller 350 may decrease the amount of power represented by the lighting power metric $P_L$ 370 by increasing the level of the covering material 322 to increase the lighting level 364 to meet the defined threshold 362, but may be prevented from decreasing the amount of power represented by the lighting power metric $P_L$ 370 to an amount allowable by the threshold 362 for the lighting level 364 due to the threshold 382 defined for the daylight glare level 380.

The system controller 350 may detect that changes in the level of the covering material 322 to increase the lighting level 364 may affect the thermal comfort level 384. The system controller 350 may monitor the comfort variables for the thermal comfort level 384 to determine when the thermal comfort level 384 is at, or within a predefined range of, a thresholds 386, 388. The threshold 386 may be a low threshold. The threshold 388 may be a high threshold.

Though a low threshold 386 and a high threshold 388 are represented in FIG. 3D, the each comfort metric may have one or more thresholds. The thresholds 386, 388 may limit the thermal comfort level 384 from exceeding the thresholds 386, 388. The system controller 350 may decrease the amount of power represented by the lighting power metric $P_L$ 370 by increasing the level of the covering material 322 to increase the lighting level 364 to meet the defined threshold 362, but may be prevented from decreasing the amount of power represented by the lighting power metric $P_L$ 370 to an amount allowable by the threshold 362 for the lighting level 364 due to the thresholds 386, 388 defined for the thermal comfort level 384.

The system controller 350 may compensate for the change in the thermal comfort level 384 by sending control instructions to maintain the thermal comfort level within the thresholds 386, 388. For example, the system controller 350 may send instructions to the temperature control device 330 to increase and/or decrease the temperature of the load control environment 300 to maintain the thermal comfort level 384 within the defined thresholds 386, 388. The temperature adjustment to the load control environment 300 may cause the heating/cooling power metric $P_{H/C}$ 390 to increase. The system controller 350 may send the instructions to the temperature control device 330 to increase and/or decrease the temperature of the load control environment 300, so long as the heating/cooling power metric $P_{H/C}$ 390 is maintained within a defined range 392.

The system controller 350 may cause the power consumption of one or more control-target devices to increase, while decreasing the total amount of power (e.g., the total power metric $P_T$) being monitored in the load control environment 300 for a period of time. For example, the system controller 350 may send control instructions to the temperature control device 330 to increase and/or decrease the heating/cooling power metric $P_{H/C}$ 390, while decreasing the lighting power metric $P_L$ 370 by at least a compensatory amount.

The system controller 350 may take the comfort of the user 340 as priority over power consumption. The system controller 350 may attempt to maintain the comfort metrics at, or within a predefined range of, a threshold, while maintaining the power metrics within a defined range. The defined range of the power metrics may be adjusted based on the comfort thresholds. For example, the power consumption range 372 may be increased if the threshold 362 for the lighting level 364 is increased to a point that causes the lighting power metric $P_L$ 370 to exceed the power consumption range 372. The power consumption range 392 may be increased if the thresholds 386, 388 are adjusted for the thermal comfort level 384 to a point that causes the heating/cooling power metric $P_{H/C}$ 390 to exceed the power consumption range 392.

Figure 3E:
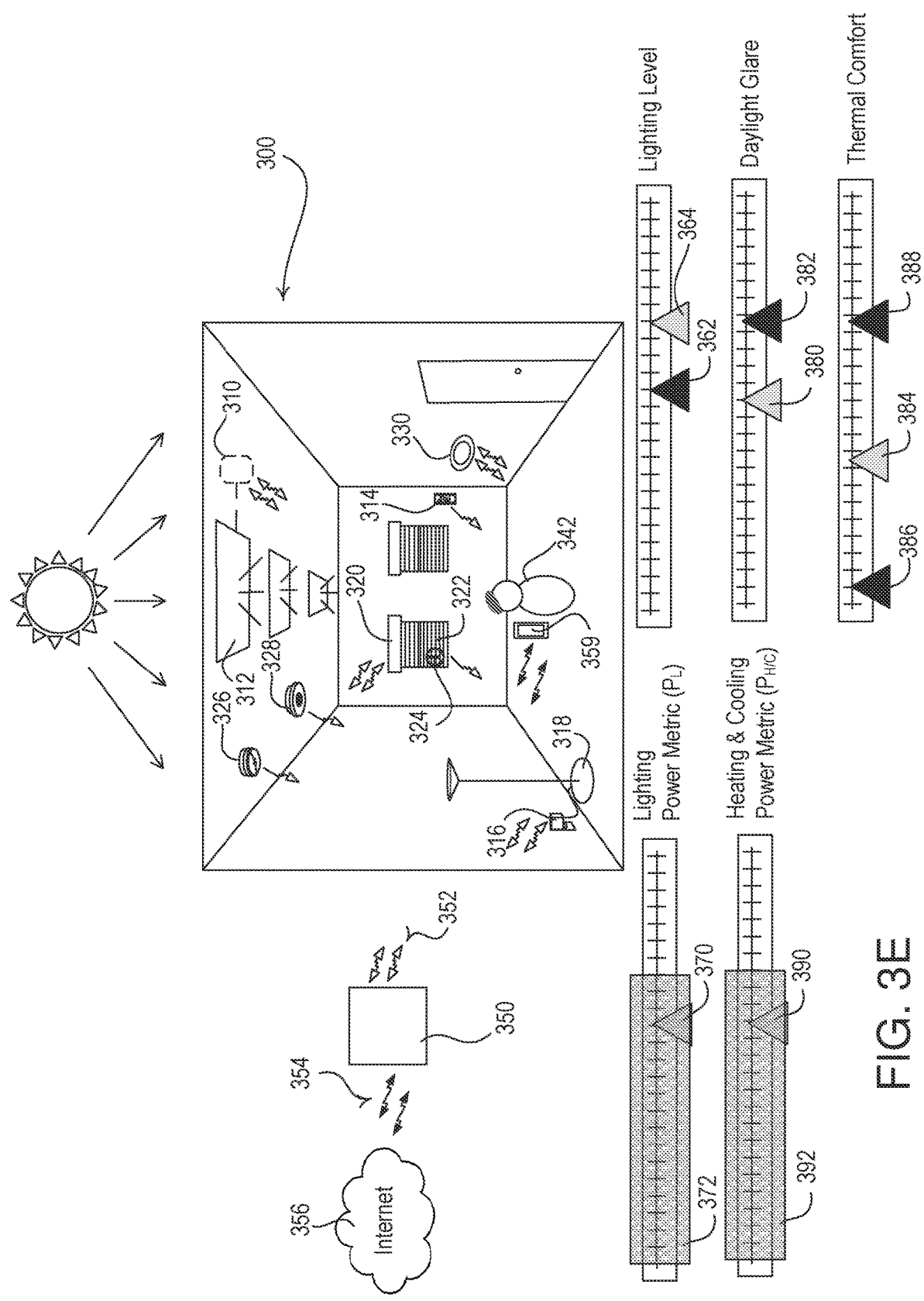

The thresholds for the comfort metrics and/or the power consumption ranges for the power metrics may be different for different users. As shown in FIGS. 3A and 3E, the load control environment 300 may have different users 340, 342 (e.g., occupants). The users 340, 342 may be identified by an identifier of respective network devices 358, 359, biometric information, and/or other user identification techniques.

The system controller 350 may control the load control environment based on the identifiers of the users in the load control environment 300. For example, the system controller 350 may store different thresholds and/or power consumption ranges for the users 340, 342. As shown in FIG. 3E, the threshold 362 for the lighting level 360 in the load control environment 300 may be higher when the user 342 is present. The power consumption range 372 for lighting power metric $P_L$ 370 is also larger for the user 342. Though the threshold 362 for the lighting level 360 and the power consumption range 372 for lighting power metric $P_L$ 370 are provided as examples in FIG. 3E, the thresholds for other comfort metrics and/or power consumption ranges for other power metrics may be adjusted based on the presence of different users.

When multiple users are in the load control environment 300 at the same time, the system controller 350 may set the thresholds and/or the power consumption ranges according to one or more of the users. For example, the system controller 350 may average the thresholds and/or the power consumption ranges of the users. The system controller 350 may also, or alternatively, give one or more of the user's priority over the other users. The priority level may be based on an order of occupancy in the load control environment 300 or a preset priority level that may be stored with each user at the system controller 350.

Figure 3F:
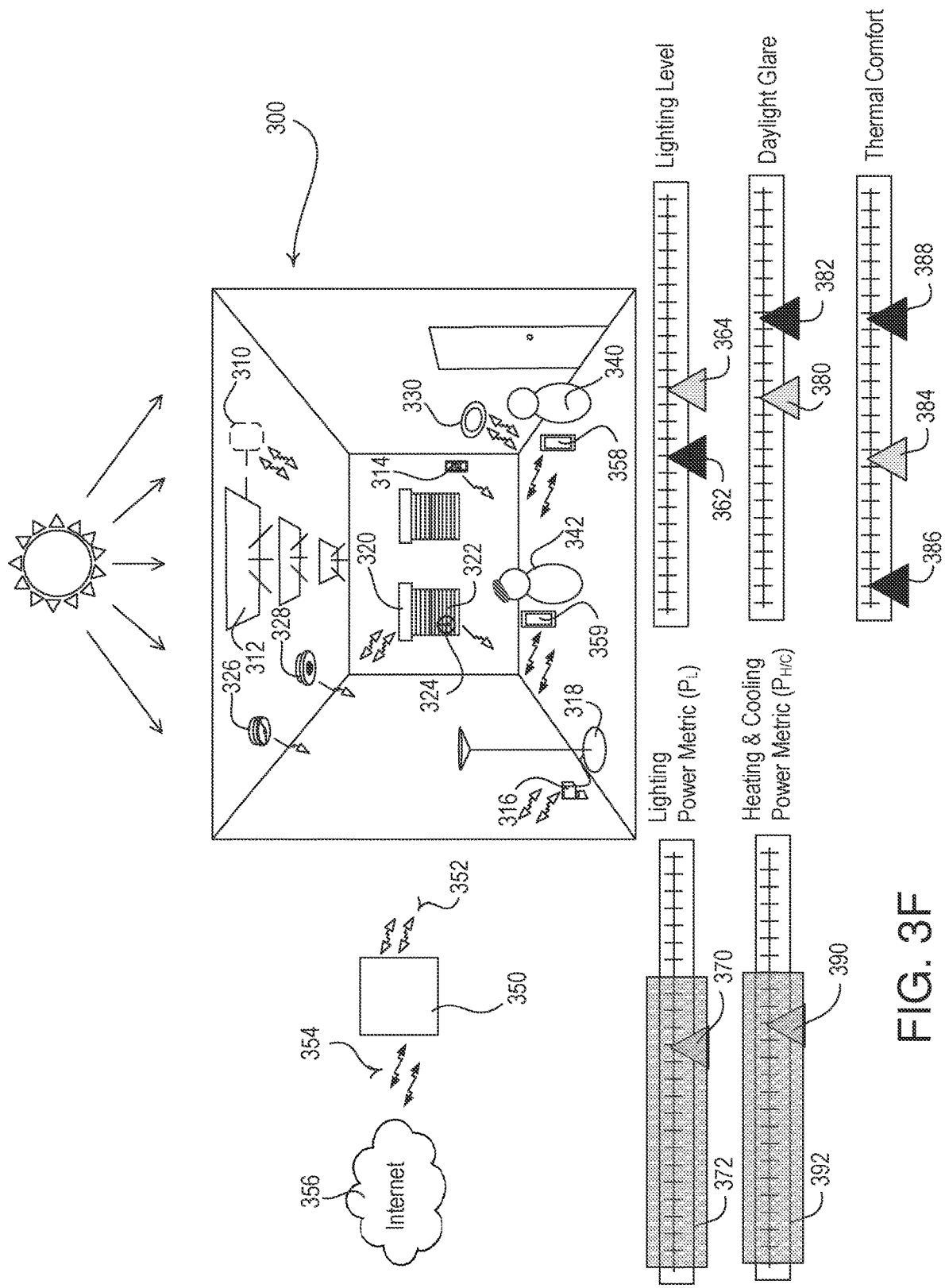

As shown in FIG. 3F, when the users 340, 342 are identified in the load control environment 300, the system controller 350 may set the threshold 362 for the lighting level 360 to an average between the threshold stored for the user 340 and the threshold stored for the user 342. The system controller 350 may set the power consumption range 372 for the lighting power metric $P_L$ 370 to an average between the power consumption range stored for the user 340 and the power consumption range stored for the user 342. Though the threshold 362 for the lighting level 360 and the power consumption range 372 for lighting power metric $P_L$ 370 are provided as examples in FIG. 3F, the thresholds for other comfort metrics and/or power consumption ranges for other power metrics may be adjusted based on the presence of multiple users.

Figure 3G:
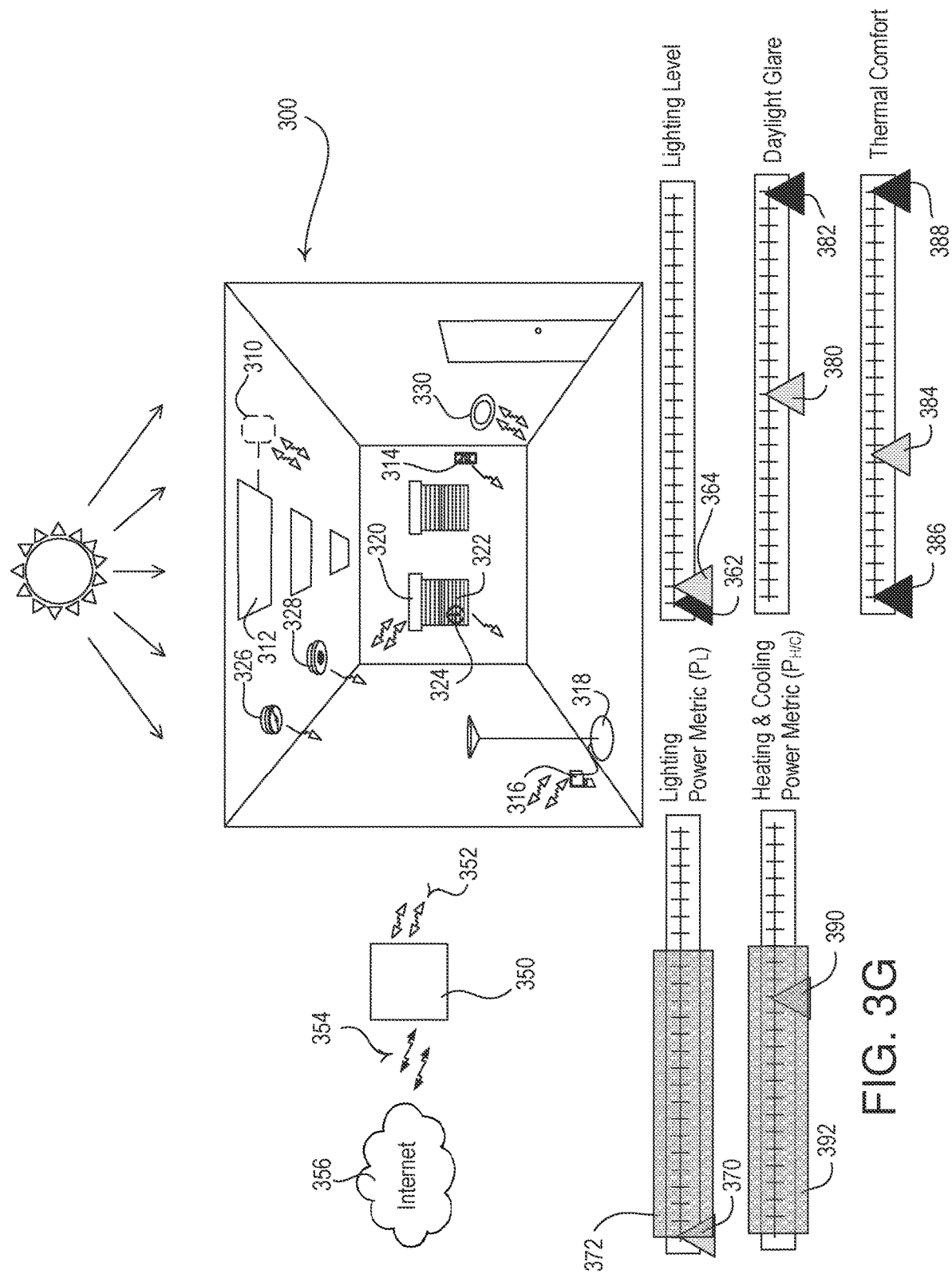

FIG. 3G illustrates an example for controlling the control-target devices in the load control environment 300 when the load control environment 300 is unoccupied. When the load control environment 300 is unoccupied, the system controller 350 may set the thresholds and/or the power consumption ranges according to a vacancy mode. The vacancy mode may act as a power savings mode that may cause the system controller 350 to reduce the total amount of power (e.g., the total power metric $P_T$) being monitored in the load control environment 300. The system controller 350 may reduce the amount of power allowed by thresholds that are defined for the vacancy mode. The defined thresholds for the vacancy mode may be based on user defined thresholds stored at the system controller 350. For example, the defined low thresholds for the vacancy mode may be set to, or a predefined distance below, the lowest user threshold stored at the system controller 350. The defined high thresholds for the vacancy mode may be set to, or a predefined distance above, the highest user threshold stored at the system controller 350. The defining of the thresholds based on user-defined thresholds may prevent the load control environment 300 from being too uncomfortable to a user when the user enters the load control environment 300. One or more thresholds may be ignored or set to a null value by the system controller 350 in the vacancy mode. For example, the daylight glare level may be ignored, as it may be assumed that a user is absent from the load control environment 300 in the vacancy mode. When a user enters the load control environment, the system controller 350 may exit the vacancy mode and control the control-target devices according to user-defined thresholds and/or power consumption ranges.

As shown in FIG. 3G, the threshold 362 for the lighting level 360 may be set to a minimum level during the vacancy mode. The threshold 362 for the lighting level 360 may allow the amount of power represented by the lighting power metric $P_L$ 370 to be reduced to a minimum level (e.g., minimum lighting intensity level) within the power consumption range 372. The low threshold 386 may be decreased and/or the high threshold 388 may be increased for the thermal comfort level 384 to allow the amount of power represented by the heating/cooling power metric $P_{H/C}$ 390 to be reduced to a minimum level (e.g., minimum amount of time for being on) within the power consumption range 392. The daylight glare threshold 382 may be set to a highest level to allow as much glare as may be needed to operate with a minimum level of power consumption in the load control environment. The daylight glare threshold 382 may be maintained or ignored, as the daylight glare level 380 may not affect an occupant in an unoccupied load control environment 300. Though not shown in FIG. 3G, the thresholds for other comfort metrics may similarly be set to allow for a reduction in power consumption during the vacancy mode.

The system controller 350 may perform active learning for adjustment of power consumption ranges according to defined comfort thresholds in order to optimize power consumption in the load control environment. The active learning may be performed by the system controller 350 when the load control environment is unoccupied, so as to avoid distractions or discomfort to occupants. The system controller 350 may set the thresholds for the comfort metrics and control the load control devices to reduce the power consumption in the load control environment 300 to learn how the reduction in power consumption affects the comfort levels.

Figure 3H:
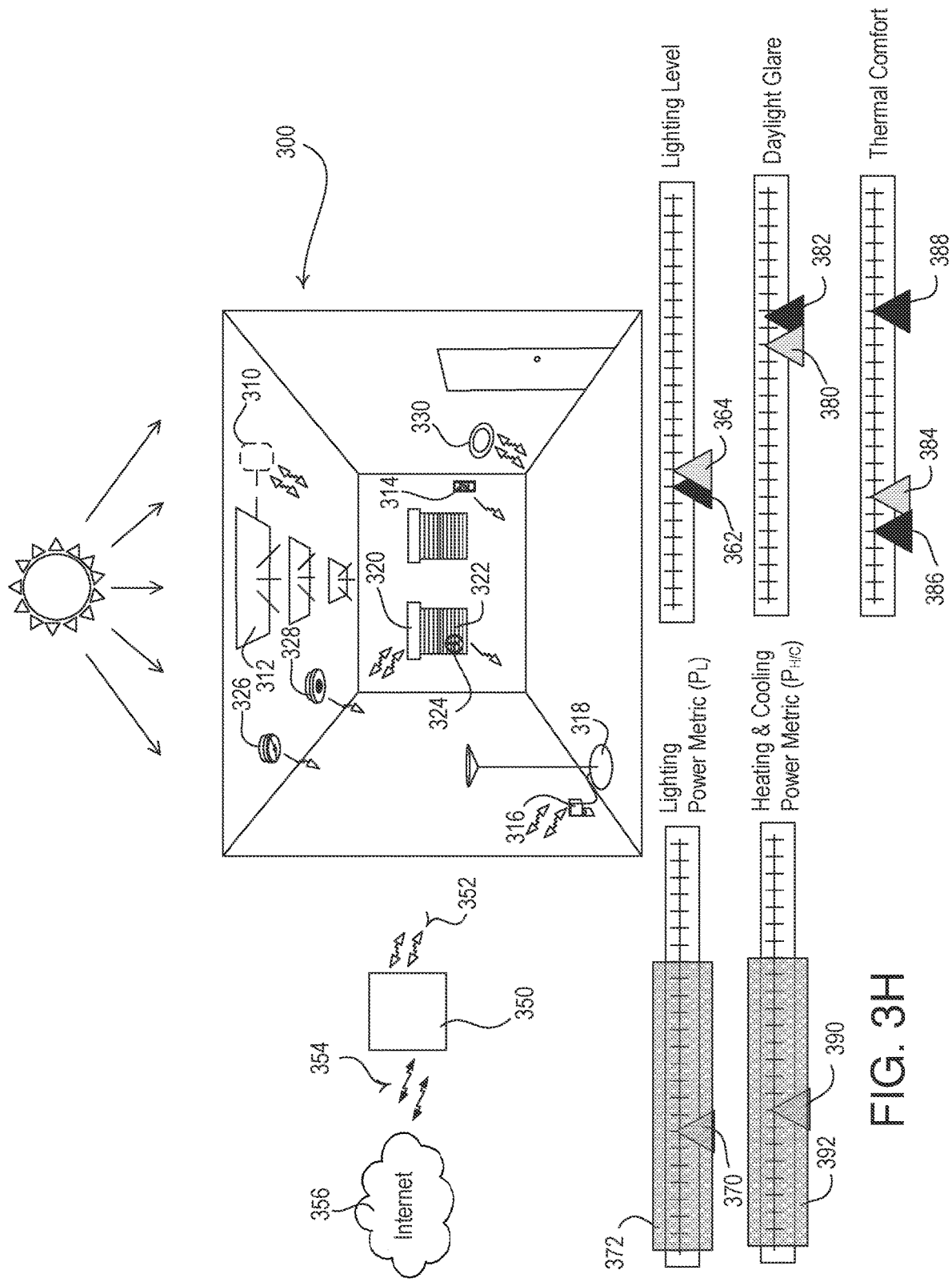

As shown in FIG. 3H, the system controller may set the threshold 362 for the lighting level 364, the threshold 382 for the daylight glare level 380, and/or the thresholds 386, 388 for the thermal comfort level and attempt to reduce the amount of power used by the control devices in the load control environment 300. The system controller 350 may continue to reduce the amount of power represented by the lighting power metric $P_L$ 370 to determine whether the lighting level 364, the daylight glare level 380, and/or the thermal comfort level 384 come within a predefined range of a corresponding threshold, reach a corresponding threshold, or exceed a corresponding threshold. For example, the system controller 350 may continue to reduce the lighting intensity level of the lighting control device 310, and thus the amount of power represented by the lighting power metric $P_L$ 370, to determine whether the lighting level 364 comes within a predefined range of the threshold 362, reaches the threshold 362, or exceeds the threshold 362. The system controller 350 may continue to reduce the setpoint temperature of the temperature control device 330, and thus the amount of power represented by the heating/cooling power metric $P_{H/C}$ 390, to determine whether the thermal comfort level 384 comes within a predefined range of the threshold 386, reaches the threshold 386, or exceeds the threshold 386. The system controller 350 may learn to operate the load control devices at a lower power level, while maintaining the comfort metrics within the corresponding thresholds.

The system controller 350 may operate the load control devices such that the comfort metrics are close (e.g., within a defined range) to the corresponding thresholds to allow for at least a minimum level of comfort, while optimizing the amount of power being used. Once a power level has been identified though the active learning process, the system controller may reduce the power consumption ranges of the power metrics (e.g., to the current amount of power represented by the power consumption metrics) to enable operation of the load control devices at this lower power level. The thresholds for each comfort metric may be set to predefined levels and/or levels associated with one or more users to optimize the power consumption when the comfort metrics are set to different values.

As shown in FIG. 3H, the system controller 350 may consider whether to heat or cool the load control environment when currently unoccupied based on weather data indicating the outside temperature within a predefined period of time and/or the amount of daylight that will be received at the load control environment. When the system controller 350 is optimized for power consumption, the system controller 350 may analyze the current outdoor temperature of the load control environment 300 and future weather data to determine that the load control environment 300 will increase in temperature by a defined amount over a period of time. The increase in temperature may be stored from past temperature changes measured in the load control environment 300 when similar changes in temperature occurred due to outdoor temperatures or may be otherwise estimated. The system controller 350 may operate close to (e.g., within a predefined range of) the thermal comfort thresholds 386 for the thermal comfort level 384 in order to conserve an amount of power represented by the heating/cooling power metric $P_{H/C}$ 390 knowing that the temperature in the load control environment will increase based on the future weather data.

Though single load control environment 300 is identified for being monitored, the system controller 350 may monitor multiple load control environments. The system controller 350 may determine the effect of a change to one load control environment on another load control environment in determining whether to control a control-target device. For example, if the control of one or more load control devices in one load control environment would cause a comfort metric to exceed a defined threshold, or a power metric to exceed a defined range, in another load control environment, the system controller 350 may not perform such control.

Figure 3I:
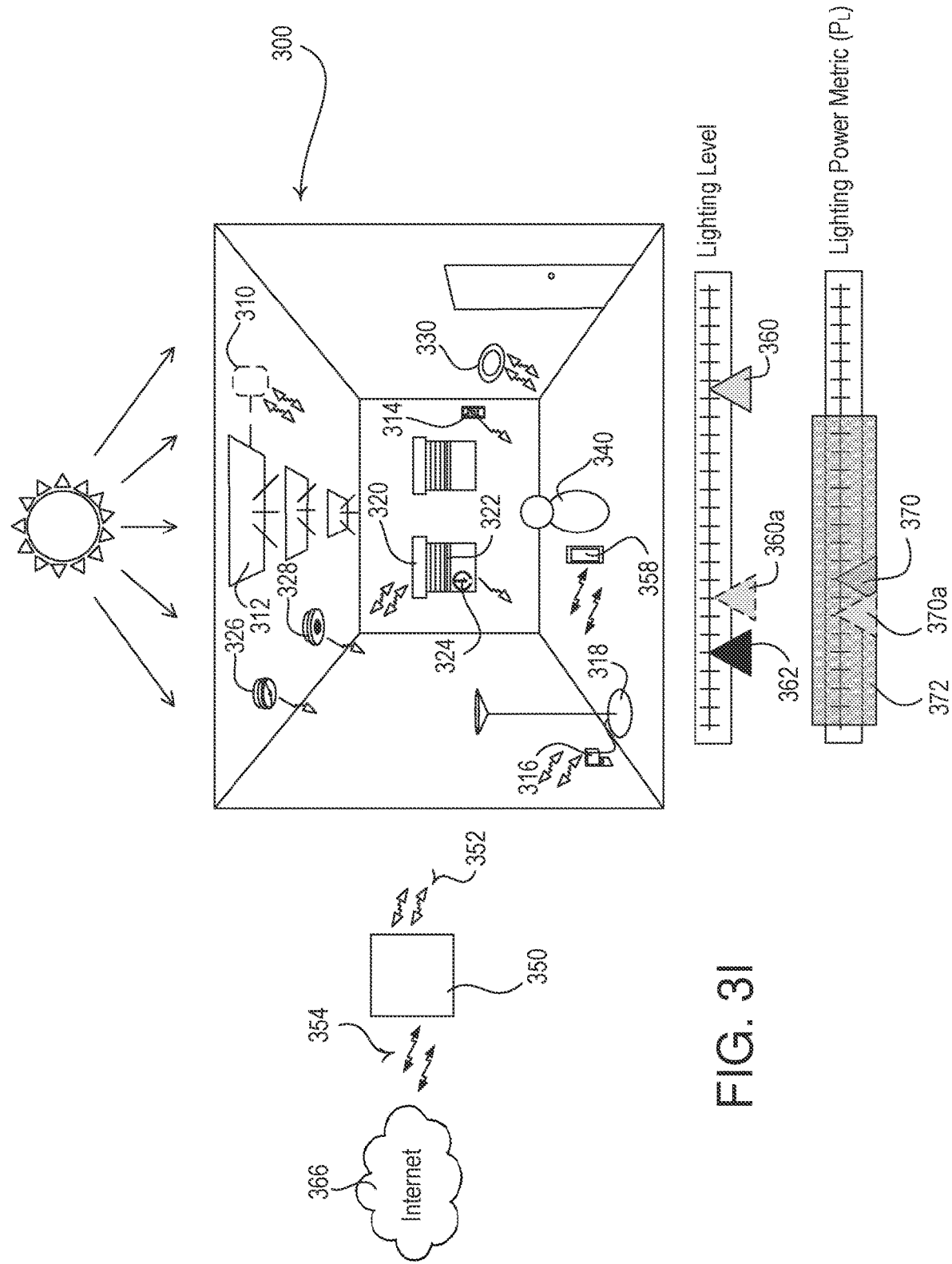

As shown in FIG. 3I, the system controller 350 may determine whether to adjust the lighting level by an adjustment amount in the load control environment by comparing an estimated change of a power cost to an estimated change of a comfort cost. The adjustment of the lighting level may result in a change of a comfort metric for the lighting level from a comfort level 360 to a comfort level 360a and thus the change of the comfort cost. The adjustment of the lighting level may result in a change of a power metric for the lighting level from a power consumption level 370 to a power consumption level 370a and thus the change of the power cost. As shown in FIG. 3I, the change of the comfort metric may be a reduction of the comfort level from 360 to 360a. The reduction of the comfort level from 360 to 360a may be translated into an increase of a monetary value indicating an increase of the comfort cost. The change of the power metric may be a reduction of the power consumption level from 370 to 370a. The reduction of the power consumption level from 370 to 370a may be translated into a decrease of a monetary value indicating a decrease of the power cost. The system controller 350 may determine that an increase of the comfort cost outweighs the decrease of the power cost and conclude that the lighting level should not be adjusted as previously determined. As shown in FIG. 3I, the reduction of the power consumption level from 370 to 370a may be much less substantial than the reduction of the comfort level from 360 to 360a, which may be translated to a greater increase of comfort cost than the decrease of the power cost. The adjustment of the lighting level as previously determined may result in a net loss. The system controller may determine not to adjust the lighting level and/or not to adjust the lighting level by the adjustment amount.

Figure 4:
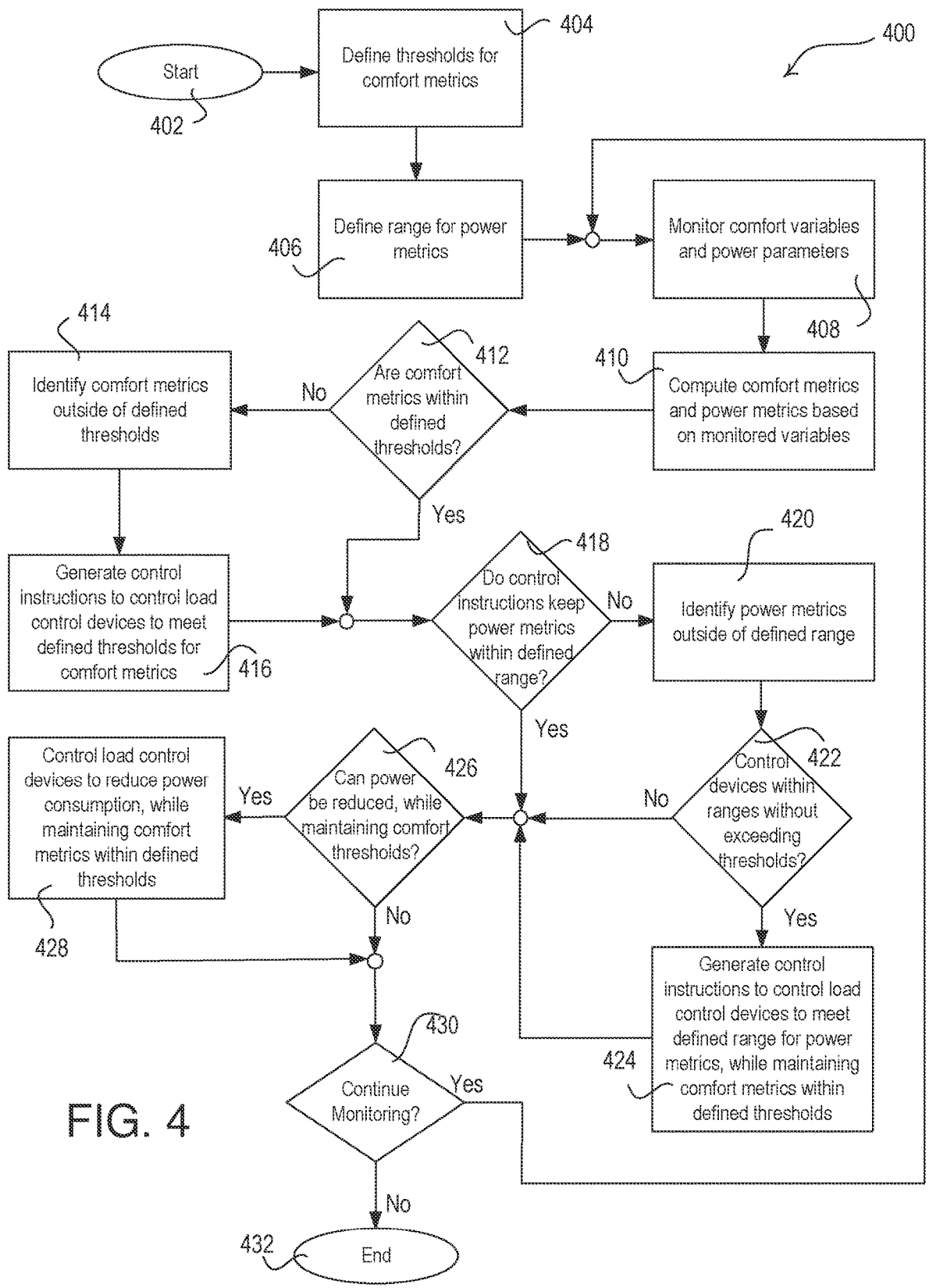
FIG. 4 is a flowchart illustrating an example method for performing control of a load control system.

FIG. 4 is a flowchart illustrating an example method 400 for system control. The method 400 may be performed at one or more devices in a load control environment, such as the load control environment 100 shown in FIG. 1 and/or the load control environment 300 shown in FIG. 3. The method 400 may be performed on a single device, or may be distributed across multiple devices. For example, the method 400, or portions thereof, may be performed at the system controller 110, 350, the network device 164, 165, 358, and/or another control device.

The method 400 may begin at 402. At 404, a threshold may be defined for one or more comfort metrics. The comfort metrics may indicate different aspects of occupant comfort in a load control environment, such as a lighting level, a daylight glare level, and/or a thermal comfort level within the load control environment. The comfort metrics may indicate levels of occupant comfort based on comfort variables monitored in the load control environment. The comfort metric threshold may be a cumulative threshold for multiple comfort metrics, or each comfort metric may have a separate threshold. The threshold for the comfort metrics may be a minimum or maximum level of comfort that may be satisfied based on the comfort variables in the load control environment. The threshold for the comfort metrics may be a target comfort level. The target comfort level may attempt to be satisfied, but may go unsatisfied for a predetermined period of time and/or by a predefined amount. The threshold for the comfort metrics may have both a target threshold and a minimum/maximum threshold.

At 406, a power consumption range may be defined for one or more power metrics. The power metrics may indicate forms of power that may be consumed based on power parameters measured or monitored in the load control environment. The power consumption range may include a maximum level of power that may be used in a load control environment and/or a targeted level of power used in a load control environment for one or more load control devices. The minimum level of the power consumption range for the power metrics may be set to zero as a default or another value for a minimum amount of power consumption. The power consumption range may be a cumulative range for multiple power metrics, or each power metric may have a separate range. The load control devices may be operated to maintain the power levels for the power metrics within the range or the power levels at which the range is set may be targets that may be exceeded, e.g., for a predetermined period of time and/or by a predetermined amount. The range for the power metrics may include both target power levels and set power levels.

The comfort variables and the power parameters may be monitored at 408. The monitored information may be sensed information and/or measured information. The sensed information may be obtained from occupancy sensors, daylight sensors, radio window sensors, temperature control devices, wearable wireless devices, and/or photo sensing devices. The measured information may include the shade position of one or more motorized window treatments, the electric light level of one or more lighting control devices, and/or another load control status information measured from a load control device. The sensed information and measured information may be real-time information, historic information, and/or predicted information related to the inputs.

The comfort metrics may be computed at 410 based on the monitored comfort variables. The comfort metrics may be recomputed after a period of time and/or after receiving feedback indicating a change in a comfort variable on which the comfort metric is calculated. The power metrics may be computed at 410 based on the monitored power parameters. The power metrics may be recomputed after a period of time and/or after receiving feedback indicating a change in an amount of power being used by the load control system. The comfort metrics and/or the power metrics may be recomputed after receiving feedback indicating a change in the status of a load control device (e.g., a load control device applicable to comfort or power metric).

The comfort metrics and/or the power metrics may be estimated values. For example, the comfort metrics may be based on the initial common relationships between a preset predicted comfort metric and building metrics that may be relevant to the comfort metric (e.g., room conduction, room size, room shape, number of windows, etc.). The power metrics may also, or alternatively, be based on the initial common relationships between a preset predicted power metric and building metrics that may be relevant to the power metric (e.g., room conduction, room size, room shape, number of windows, etc.). The predicted comfort metrics and/or the predicted power metrics may be modified based on real-time information and/or occupant overrides. For example, temperature constants may be modified to match true thermal changes in the load control environment.

At 412, a determination may be made as to whether the comfort metrics are within the defined thresholds. For example, the system controller may verify that the comfort thresholds are met for each of the comfort metrics. If a comfort metric is outside of the defined threshold, the comfort metric may be identified at 414. One or more load control devices (e.g., control-target devices) may be controlled at 416 to ensure that the defined threshold for the comfort metric is met. For example, if a minimum lighting level threshold is not met, the lighting intensity level of lighting control devices may be increased and/or a shade level of motorized window treatments may be increased to meet the minimum lighting level threshold.

If the comfort metrics are determined to be within the defined thresholds at 412, or the load control devices are controlled to meet the defined thresholds at 416, a determination may be made as to whether the power metrics are within the defined power consumption ranges, at 418. If a power metric is outside of the defined power consumption range, the power metric may be identified at 420. At 422, a determination may be made as to whether one or more load control devices may be performed within the power consumption ranges without exceeding one or more thresholds defined for the comfort metrics. If the control of the load control devices may be performed within the power consumption ranges without exceeding one or more thresholds defined for the comfort metrics, the control of the load control devices may be performed within the power consumption ranges. One or more load control devices (e.g., control-target devices) may be controlled at 424 to ensure that the power metrics are within the defined power consumption ranges. For example, if a lighting power metric $P_L$ is above a defined power consumption range for the lighting power metric $P_L$, the lighting intensity level of one or more lighting control devices may be reduced such that the lighting power metric $P_L$ is within the defined range.

At 426, a determination may be made as to whether the power metrics may be reduced, while maintaining the comfort thresholds within the defined thresholds. If the power metrics may be reduced at 426, while maintaining the comfort thresholds within the defined thresholds, the load control devices may be controlled to reduce the power consumption at 428. For example, a lighting power metric $P_L$ may be reduced at 428 within a defined power consumption range by reducing the lighting intensity level of one or more lighting control devices.

At 430, the method 400 may determine whether to continue monitoring the comfort variables and the power parameters. If the comfort variables and the power parameters are to continue to be monitored, the method 400 may return to 408. If the comfort variables and the power parameters are no longer monitored, the method 400 may end at 432.

Figure 5:
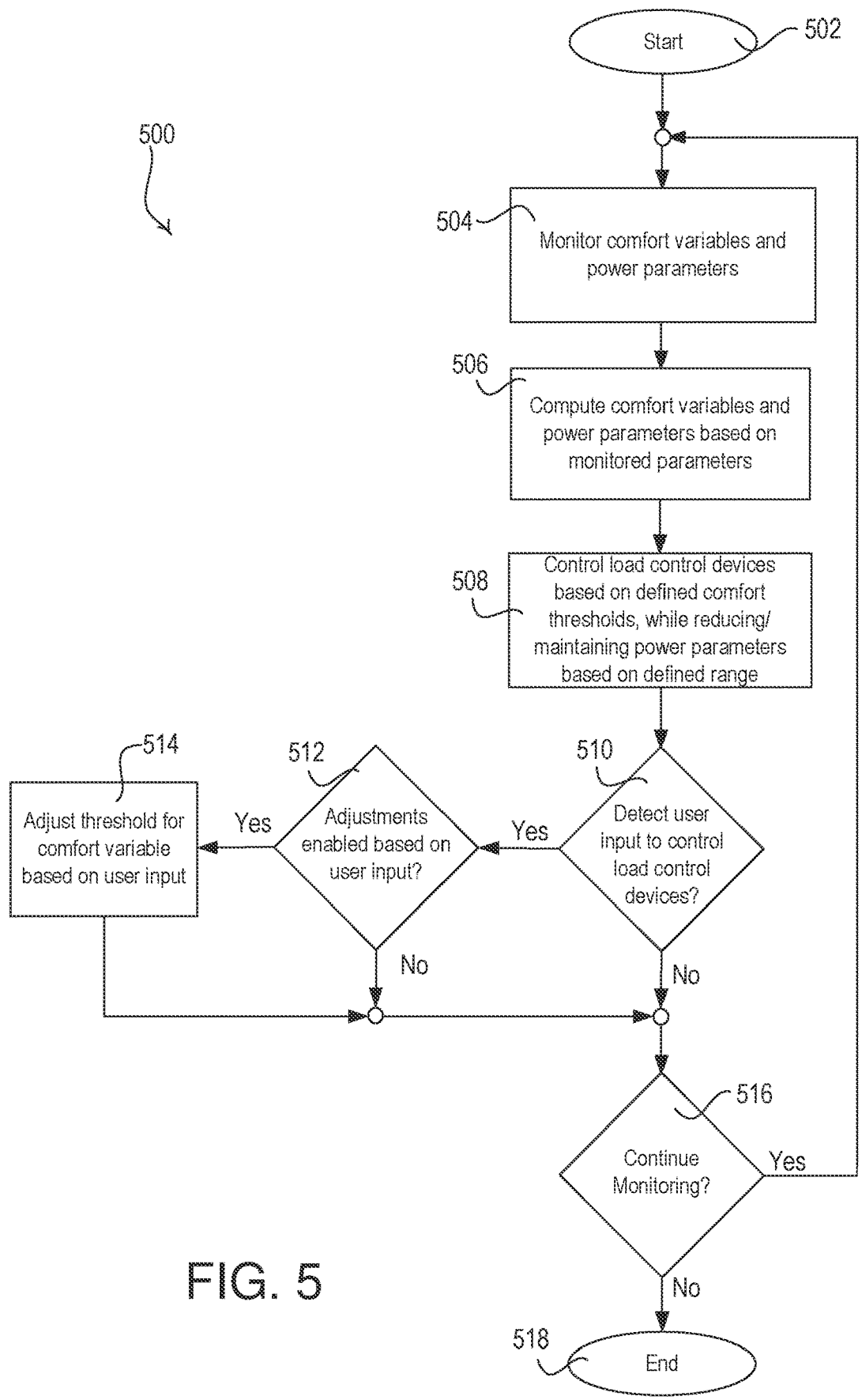
FIG. 5 is a flowchart illustrating an example method for passive learning and adjusting of thresholds for comfort metrics.

FIG. 5 is a flowchart illustrating an example method 500 for passive learning and adjusting of thresholds for comfort metrics. The method 500 may be performed at one or more devices in a load control environment, such as the load control environment 100 shown in FIG. 1 and/or the load control environment 300 shown in FIG. 3. The method 500 may be performed on a single device, or may be distributed across multiple devices. For example, the method 500, or portions thereof, may be performed at the system controller 110, 350, the network device 164, 165, 358, and/or another control device.

The method 500 may begin at 502. At 504, the comfort variables and the power parameters may be monitored. The comfort metrics may be computed, at 506, based on the monitored comfort variables. The power metrics may also, or alternatively, be computed, at 506, based on the monitored power parameters. At 508, load control devices may be controlled based on the defined comfort thresholds, while reducing or maintaining the power metrics based on the defined power consumption range for the power metrics. A determination may be made, at 510, as to whether a user input is received to control the load control devices. The determination may be made at 510 within a predefined period of time from the control of the load control devices at 508 to identify that the user is adjusting an electrical load in response to the control performed at 508. User inputs may be received from various control devices, such as a network device or a control-source device, to adjust the automatic control of the control-target devices. If a user input is not detected at 510, the method 500 may proceed to 516 to determine whether to continue monitoring comfort variables and power parameters.

At 512, a determination may be made as to whether adjustments are enabled to the comfort variables based on a user input. The adjustments may be enabled based on user preferences stored at the system controller. The user preferences may be set by the user at the network device. If user adjustments are disabled, the method 500 may proceed to 516 to determine whether to continue monitoring comfort variables and power parameters. If user adjustments are enabled, at 512, one or more thresholds may be adjusted, at 514, for comfort metrics based on the user input received. For example, a user may adjust the covering material of the motorized window treatment to reduce the daylight glare level in the load control environment in response to an automatic control of the motorized window treatment and the threshold for the daylight glare level may be adjusted according to the user input. The user may adjust a lighting intensity level of a lighting control device in response to an automatic control of the lighting intensity level and the threshold for the lighting level may be adjusted according to the user input. The user may adjust a setpoint temperature of a temperature control device to increase or decrease the temperature in the load control environment, and the threshold for the thermal comfort level may be adjusted according to the user input. A user may adjust a covering material of a motorized window treatment to allow more or less daylight into a load control environment and the threshold for the lighting level may be adjusted according to the user input.

The method 500 may proceed to 516 to determine whether to continue monitoring comfort variables and power parameters. If a determination is made to continue monitoring the comfort variables and power parameters, the method 500 may return to 504. If a determination is made to discontinue monitoring the comfort variables and power parameters, the method may end at 518.

Figure 6:
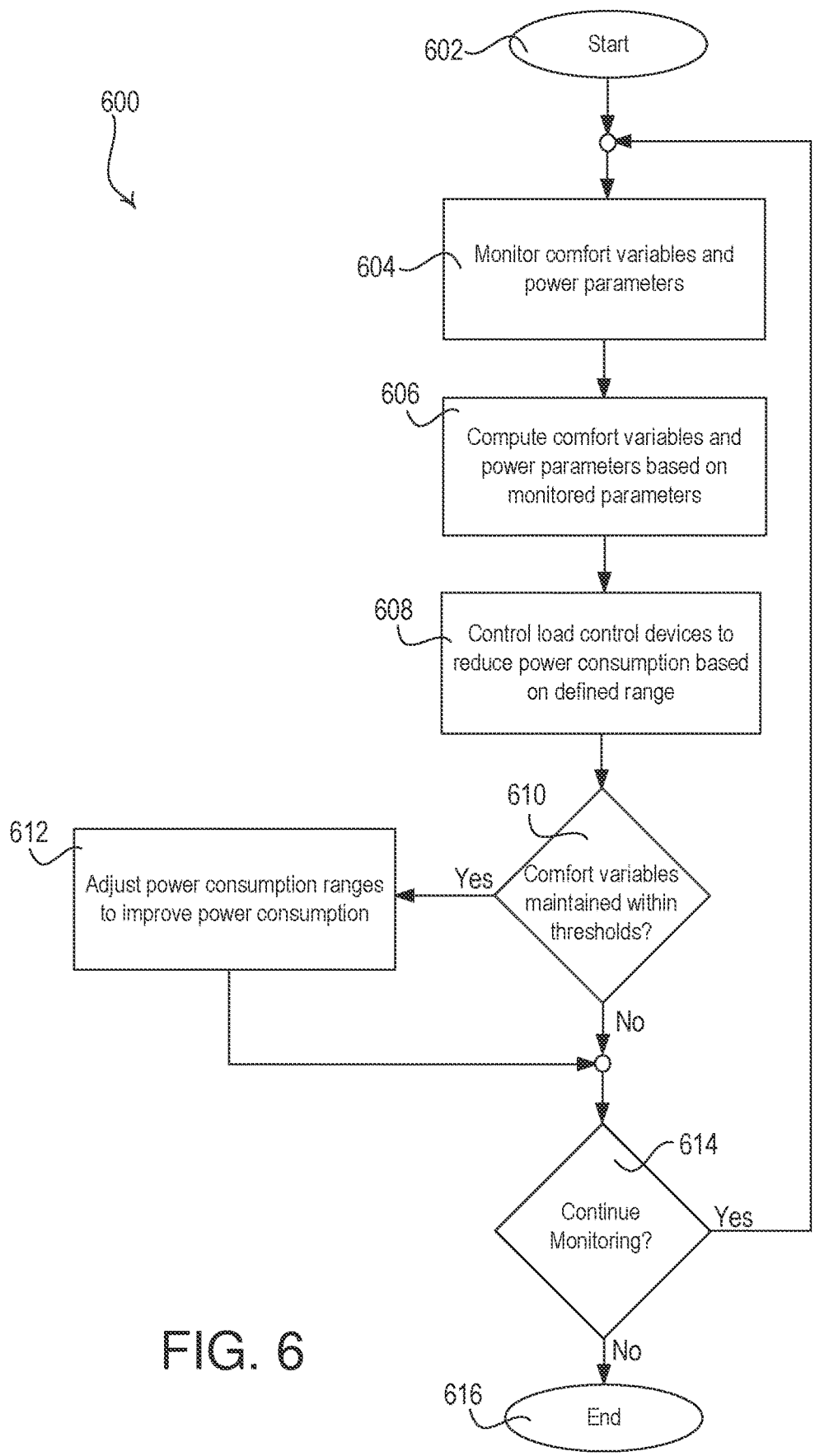
FIG. 6 is a flowchart illustrating an example method for active learning and adjusting of power consumption ranges.

FIG. 6 is a flowchart illustrating an example method 600 for active learning and adjusting of power consumption ranges. The method 600 may be performed at one or more devices in a load control environment, such as the load control environment 100 shown in FIG. 1 and/or the load control environment 300 shown in FIG. 3. The method 600 may be performed on a single device, or may be distributed across multiple devices. For example, the method 600, or portions thereof, may be performed at the system controller 110, 350, the network device 164, 165, 358, and/or another control device.

The method 600 may begin at 602. At 604, the comfort variables and the power parameters may be monitored. The comfort metrics may be computed, at 606, based on the monitored comfort variables. The power metrics may also, or alternatively, be computed, at 606, based on the monitored power parameters. At 608, load control devices may be controlled to reduce the amount of power indicated by the power metrics. For example, the lighting intensity level on the lighting control devices may be decreased and/or the setpoint temperature on a temperature control device may be increased or decreased (e.g., based on the time of year) to reduce the amount of time the heating/cooling devices are on. At 610, a determination may be made as to whether the comfort metrics are maintained within the defined thresholds after the reduction in power consumption. The system controller may monitor the comfort variables for a period of time to determine whether the reduction in power caused the comfort metrics to exceed the comfort thresholds. The method 600 may be performed when the system controller is in a vacancy mode, or the load control environment is otherwise unoccupied, to avoid discomfort to the occupant.

If the comfort metrics are maintained within the comfort thresholds, the thresholds for the power consumption ranges for the power metric $P_L$ may be decreased to allow for a lower lighting intensity level within the comfort of the user. For example, the power consumption range defined for the lighting power metric $P_L$ may be decreased to allow for a lower lighting intensity level within the comfort of the user. The method 600 may proceed to 614 to determine whether to continue monitoring comfort variables and power parameters. If a determination is made to continue monitoring the comfort variables and power parameters, the method 600 may return to 604. If a determination is made to discontinue monitoring the comfort variables and power parameters, the method may end at 616.

Figure 7A:
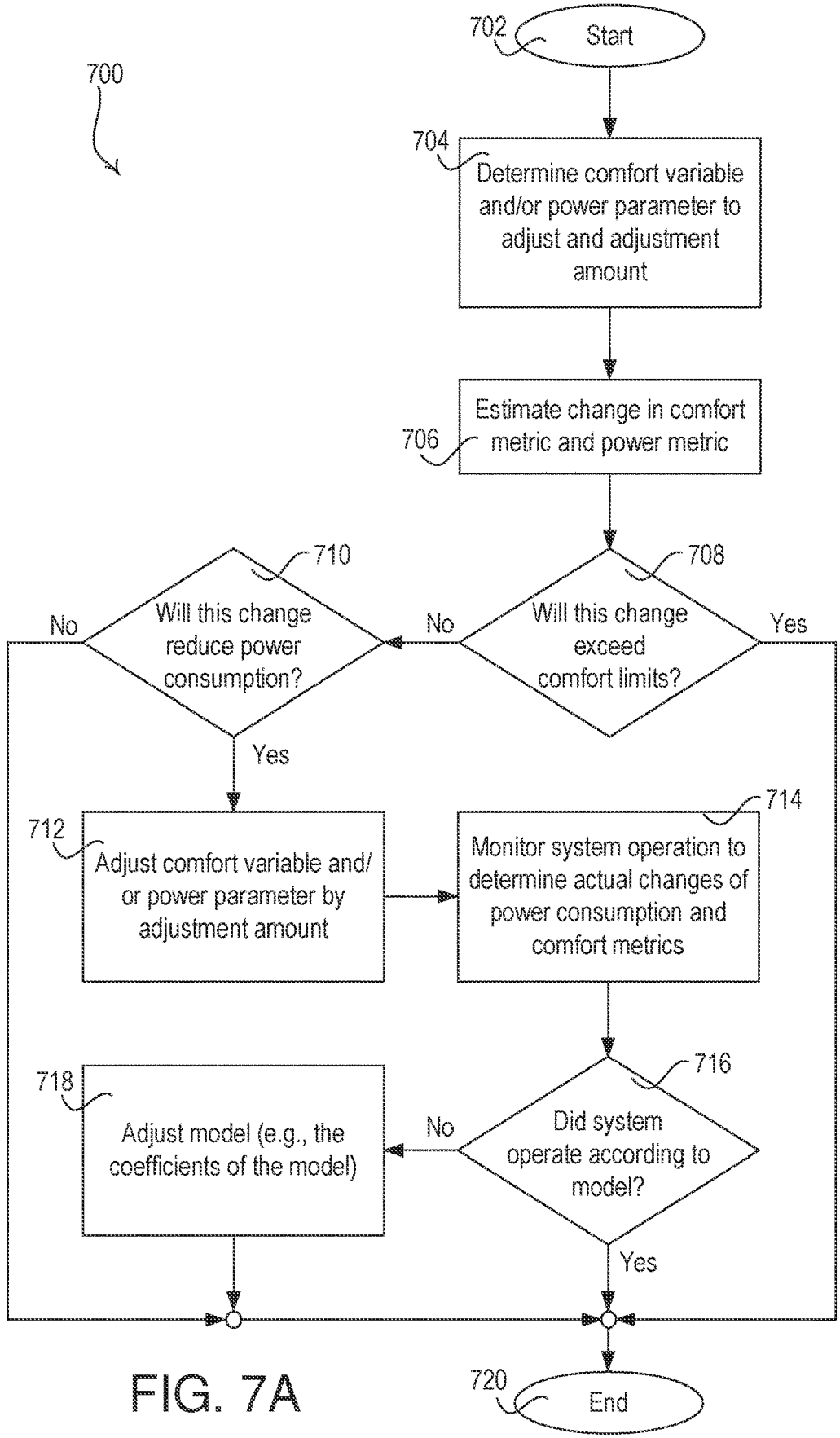
FIG. 7A is a flowchart illustrating an example method for performing control of a load control system.

FIG. 7A is a flowchart illustrating an example method 700 for performing control of a load control system. The method 700 may be used to adjust a variable by an adjustment amount to reduce power consumption while maintaining a comfort metric above a comfort limit. The method 700 may be performed at one or more devices in a load control environment, such as the load control environment 100 shown in FIG. 1 and/or the load control environment 300 shown in FIG. 3. The method 700 may be performed on a single device, or may be distributed across multiple devices. For example, the method 700, or portions thereof, may be performed at the system controller 110, 350, the network device 164, 165, 358, and/or another control device.

A building manager may monitor an operation of building and attempt to optimize a power consumption of a building while maintaining comfort of occupants in the building. The building manager may quantify a total power consumption by various load control devices in the building. The power consumption for individual load control devices may be calculated as power metrics associated with the load control devices. The building manager may quantify a level of comfort that is being experienced and/or to be experienced by occupants in the building. The level of comfort that is being experienced and/or to be experienced by occupants in the building may be calculated as comfort metrics associated with the load control devices. The building manager may use method 700A to control the operation of the load control devices to maintain the comfort level in the building above certain comfort limits. The building manager may use method 700B to control the operation of the load control devices to achieve a net monetary gain.

The method 700A may start at 702, and, at 704, a comfort variable or power parameter may be determined for being adjusted. An adjustment amount may also be determined for the comfort variable and/or power parameter. The determination may be made autonomously by monitoring the comfort variable and/or power parameter. The monitored information may be sensed information and/or measured information. The sensed information may be obtained from occupancy sensors, daylight sensors, window sensors, temperature control devices, wearable wireless devices, photo sensing devices, and/or visible light sensors. The measured information may include the shade position of one or more motorized window treatments, the electric light level of one or more lighting control devices, and/or another load control status information measured from a load control device. The sensed information and measured information may be real-time information, historic information, and/or predicted information related to the inputs.

At 706, a change of the comfort metric may be estimated for the identified comfort variable or power parameter. The comfort metrics and/or the power metrics may be computed, for example, based on a model (e.g., a building model). The model may be built based on initial common relationships between the predicted comfort/power metrics and space-area attributes (e.g., room conduction, room size, room shape, number of windows, etc.). The model may comprise one or more coefficients that are associated with the operation of the load control devices in the load control environment. The model may enable control and/or continuous modification of the operation of the one or more load control device in the load control environment (e.g., a room, a building, or an area) for optimizing power consumption and occupant comfort.

The comfort metrics and/or the power metrics may be estimated values. Correlation between the comfort metric and the comfort variable may be used to estimate the comfort metric before and/or after the adjustment. Examples of correlations between comfort metrics and comfort variables may be shown in FIGS. 7C-7E. The correlation between the comfort metric and the comfort variable may be modified. For example, constants that define the correlation may be modified to match the predicted changes of the comfort metric and the actual comfort metric changes. For example, the comfort metrics may be based on the initial common relationships between a preset predicted comfort metric and building metrics that may be relevant to the comfort metric (e.g., room conduction, room size, room shape, number of windows, etc.). Correlations between the power metric and the power parameter may be used to estimate the power metric before and/or after the adjustment. For example, the correlation between the power metric and the power parameter may be based on utility data. The correlation between the power metric and the power parameter may be modified. For example, constants that define the correlation may be modified to match the predicted changes of the power metric and the actual power metric changes. The power metrics may also, or alternatively, be based on the initial common relationships between a preset predicted power metric and building metrics that may be relevant to the power metric (e.g., room conduction, room size, room shape, number of windows, etc.). The predicted comfort metrics and/or the predicted power metrics may be modified based on real-time information and/or occupant overrides. For example, temperature constants may be modified to match true thermal changes in the load control environment.

At 708, a determination may be made as to whether the estimated change of comfort metric will cause the comfort metric to exceed comfort limits. The power consumption may be optimized while maintaining comfort (e.g., occupant comfort) within a comfort range. For example, the comfort range may be from the minimum levels of comfort metrics set for the comfort variable to the target levels of comfort metrics set for the comfort variables. The comfort range may be a set range surrounding the target levels of comfort metrics for the comfort variables. The comfort range may comprise comfort limits (e.g., predetermined comfort limits). The comfort limits may comprise a predetermined minimum level of comfort metric for the comfort variable chosen. The comfort limits may comprise a threshold that may be defined for one or more comfort metrics. The comfort limits may be a cumulative threshold for multiple comfort metrics, or each comfort metric may have a separate threshold. The threshold for the comfort metrics may be a minimum level of comfort that may be satisfied based on the comfort variables in the load control environment. The threshold for the comfort metrics may be a target comfort level or maximum level of comfort that may be satisfied based on the comfort variables in the load control environment.

The comfort limits may be set to regulate the manner in which and the extent to which the load control devices can be manipulated to optimize the power consumption of the load control environment. The system controller may adjust the lighting intensity level, window treatment level, and/or temperature level to effectuate the comfort limits. If the estimated change of comfort metric will cause the comfort metric to exceed the comfort limits, the comfort variable chosen may not be adjusted or adjusted by the adjustment amount, and the method 700 may proceed to end at 720. If the estimated change of comfort metric will not cause the comfort metric to exceed the comfort limits, the method 700 may proceed to determine whether the adjustment of the comfort variable chosen will reduce the power consumption at 710.

At 710, a determination may be made as to whether the adjustment of the power parameter will reduce a power consumption. A power consumption range may be defined for one or more power metrics. The power consumption range may include a maximum level of power consumption that may be used in a load control environment and/or a targeted level of power used in a load control environment for one or more load control devices. The power consumption range may be a cumulative range for multiple power metrics, or each power metric may have a separate range. The load control devices may be operated to maintain the target levels for the power consumption. The target level of power consumption may be exceeded, e.g., for a predetermined period of time and/or by a predetermined amount.

If the adjustment of the power parameter by the adjustment amount will reduce the power consumption, the comfort variables and/or power parameters may be adjusted by the adjustment amount at 712. The operation of the system may continue to be monitored to determine the actual changes of power consumption and/or comfort metrics at 714. The sensed information and/or measured information may be monitored to calculate the actual reduction of power consumption that resulted from the adjustment of the power parameter by the adjustment amount. The sensed information and/or measured information may be used to calculate the actual change of the comfort metric that resulted from the adjustment of the comfort variable by the adjustment amount. If the adjustment of the power parameter by the adjustment amount will not reduce the power consumption, the power parameter chosen may not be adjusted or adjusted by the adjustment amount, and method 700 may proceed to exit at 720.

At 716, a determination may be made as to whether the system operated according to the model. The determination may include whether the power consumption is actually reduced, or whether the estimated changes of power consumption occurred. The actual change of the comfort metric that resulted from the adjustment of the comfort variable by the adjustment amount may be compared to the comfort limits and verified that the actual change of the comfort metric did not exceed the comfort limits. The actual change of the comfort metric that resulted from the adjustment of the comfort variable by the adjustment amount may be compared to the estimated change of the comfort metric to determine whether the estimated changes of comfort metric occurred.

If it is determined that the system did not operate according to the model, the model (e.g., coefficients of the model) may be adjusted at 718. The determination may include one or more of the following: the power consumption is not reduced, the estimated changes of power consumption did not occur, the actual change of the comfort metric resulted from the adjustment of the variable exceeds the comfort limits, and/or the estimated changes of the comfort metric do not occur. If it is determined that the system operates according to the model, the method 700 may end at 720. For example, the determination that the system operated according to the model may include that the power consumption is reduced, and that the actual change of the comfort metric resulted from the adjustment of the variable by the adjustment does not exceed the comfort limits.

At 718, the model may be adjusted (e.g., the coefficients of the model may be adjusted). The model may be based on various coefficients and may comprise sets of equations related to power metrics and/or comfort metrics. The coefficients may be adjusted based on initial common relationships between the power metrics and power parameters. The coefficients may be adjusted based on initial common relationships between comfort metrics and comfort variables. The coefficients may be associated with a room or occupants' preference in the room. The occupants' preference in a comfort level in the room may be indicated in a weighting factor associated with the room.

A model adaptation module may be used to track the accuracy of the model and determine how the coefficients affecting the model may be adjusted. Inputs to the model adaptation module may comprise information such as comfort metrics, comfort variables, power metrics, power parameters, the number of comfort variables and/or power parameters, historical values of the coefficients of the model, space-area specific attributes of a building, and/or any factor or factors that may impact the operation of the model and/or system. A model adaptation module may receive and/or maintain a dataset (e.g., a data library) for values of comfort metrics and corresponding comfort variables. A model adaptation module may receive and/or maintain a dataset (e.g., a data library) for values of power metrics and corresponding power parameters. Based on the dataset, the model adaptation module may derive the coefficients of the model, which define correlations between the comfort metrics and corresponding comfort variables, correlations between values of power metrics and corresponding power parameters, correlations between space-area attributes of a building and the values of power metrics, and/or other correlations that may affect the model.

The derivation of the coefficients of the model may be calculated according to linear fitting or curve fitting techniques and/or other mathematical tools. An updated dataset may result in an updated set of coefficients of the model. For example, the estimated changes of power metrics at 706 may be determined based on a first set of coefficients of the model. The actual change of the power metrics that resulted from the adjustment of the power parameter by the adjustment amount at 712 may differ from the estimated changes of power metrics 706. The actual power metrics corresponding to the adjusted power parameter and the adjusted power parameter may be added to the dataset, and the dataset may be updated. In one or more embodiments, the estimated changes of the comfort metrics at 706 may be determined based on a first set of coefficients of the model. The actual change of the comfort metrics that resulted from the adjustment of the comfort variable by the adjustment amount at 712 may differ from the estimated changes of comfort metrics at 706. The actual comfort metrics corresponding to the adjusted comfort variable and the adjusted comfort variable may be added to the dataset, and the dataset may be updated. Based on the updated dataset, the model adaptation module may derive a second set of coefficients of the model. The model may be updated according to the second set of the coefficients of the model.

Various events may trigger the adjustment of the coefficients. For example, when the system controller determines that the comfort variable and/or power consumption did not realize as expected, the system controller may determine to adjust the coefficients. The adjustment of the coefficients may happen periodically (e.g., once every month) to keep the operation of the system updated according to updated events and/or space-area attributes in the load control environment. The system controller may include a machine learning system for adjusting the coefficients. The machine learning system may generate a waring when a selected number of inaccurate predictions of the comfort rating and/or power cost occur. The method 700 may end at 720.

Figure 7B:
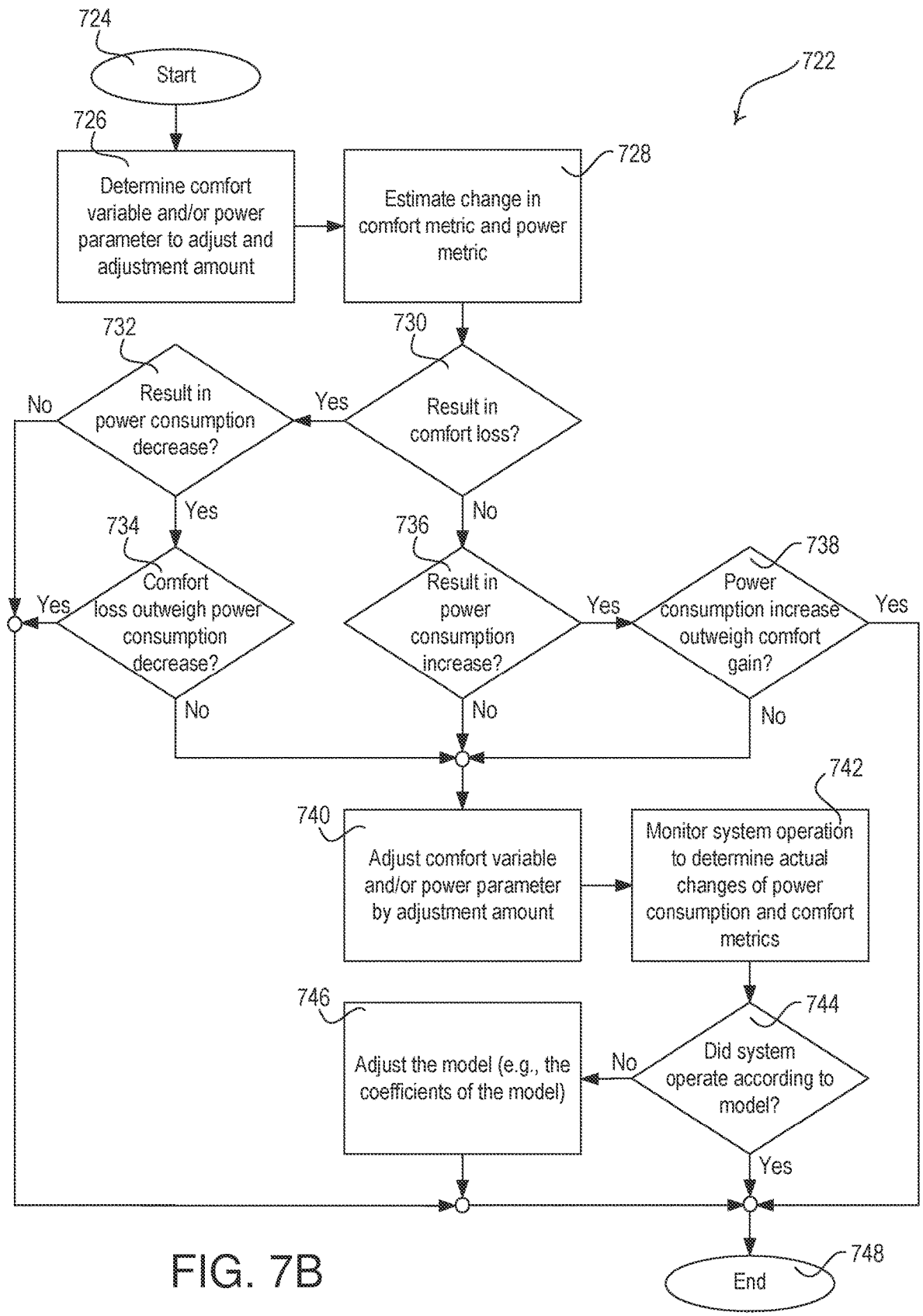
FIG. 7B is a flowchart illustrating an example method for performing control of a load control system.

FIG. 7B is a flowchart illustrating an example method 722 for performing control of a load control system. The method 722 may be used to adjust a variable by an adjustment amount by comparing a comfort cost $C_{COST}$ and a power cost $P_{COST}$. The method 722 may be performed at one or more devices in a load control environment, such as the load control environment 100 shown in FIG. 1 and/or the load control environment 300 shown in FIG. 3. The method 722 may be performed on a single device, or may be distributed across multiple devices. For example, the method 722, or portions thereof, may be performed at the system controller 110, 350, the network device 164, 165, 358, and/or another control device.

The method 722 may start at 724, and, at 726, a comfort variable or power parameter may be determined. The adjustment amount may also be determined for the comfort variable or power parameter. The determination may be made autonomously by monitoring the comfort variable or power parameter. The monitored information may be sensed information and/or measured information. The sensed information may be obtained from occupancy sensors, daylight sensors, radio window sensors, temperature control devices, wearable wireless devices, photo sensing devices, and/or visible light sensors. The measured information may include the shade position of one or more motorized window treatments, the electric light level of one or more lighting control devices, and/or another load control status information measured from a load control device. The sensed information and measured information may be real-time information, historic information, and/or predicted information related to the inputs.

An automatic determination may be triggered by an event. The event may cause sudden or gradual changes in the load control environment. For example, when the sun starts to set, and an outside light level decreases, the comfort variable of lighting level in the load control environment may be adjusted to counterbalance the decrease of the outside light level. The amount to adjust the lighting level may be determined. Another example may be an end of a well-attended meeting in a conference room. When the occupants of the conference room (e.g., attendees of the meeting) leave, the occupant heat may change abruptly. The comfort variable of heating and cooling level may be adjusted to maintain the temperature of the conference room constant comparing to the temperature before the attendees leave the meeting. The amount to adjust the comfort variable of heating and cooling level may be determined, as described herein, for example.

At 728, a change of the comfort metric for the identified comfort variable that may result from the adjustment of the comfort variable may be estimated. At 728, a change of the power metric for the identified power parameter that will result from the adjustment of the power parameter may be estimated. The comfort metrics and/or the power metrics may be computed, for example, based on a model (e.g., a building model). The model may be built based on initial common relationships between the predicted comfort/power metrics and space-area attributes (e.g., room conduction, room size, room shape, number of windows, etc.). A correlation between the power metric and the power parameter may be used to estimate the power metric before and/or after the adjustment. A correlation between the comfort metric and the comfort variable may be used to estimate the comfort metric before and/or after the adjustment. Examples of correlations between comfort metrics and comfort variables are provided in FIGS. 7C-7E. The correlation between the comfort metric and the comfort variable may be modified. For example, constants that define the correlation may be modified to match the predicted changes of the comfort metric and the actual comfort metric changes. The predicted comfort metrics and/or the predicted power metrics may be modified based on real-time information and/or occupant overrides. For example, temperature constants may be modified to match true thermal changes in the load control environment.

At 730, a determination may be made as to whether adjusting the comfort variable or power parameter may result in a comfort loss. The determination, at 730, may be based on the estimated change of the comfort metrics. The comfort loss may be indicated by a decrease of a comfort rating $C_R$. The comfort rating $C_R$ may be determined based on comfort metrics for various comfort variables. The comfort metrics may include a lighting comfort metric $C_L$, a heating/cooling comfort metric $C_{H/C}$, and a daylight glare comfort metric $C_{DGP}$. The comfort metrics may be in the same units (e.g., percentages). A comfort metric may be determined based on a predetermined relationship between a comfort metric and a comfort variable (e.g., a relationship shown in FIG. 7C, FIG. 7D, and FIG. 7E). The comfort rating $C_R$ may be calculated by taking an average of the comfort metrics, e.g., $$C_R = (C_L \cdot C_{H/C} \cdot C_{DGP}). \quad \text{(Equation 4)}$$

In addition, the comfort rating $C_R$ may be calculated by multiplying the comfort metrics, e.g., $$C_R = C_L \cdot C_{H/C} \cdot C_{DGP}. \quad \text{(Equation 5)}$$

If it is determined that adjusting the comfort variable or power parameter will result in a loss of occupant comfort, the method 722 may proceed to 732 to determine whether adjusting the comfort variable or power parameter will result in a decrease of power consumption. If it is determined that adjusting the comfort variable or power parameter will not result in a loss of occupant comfort (e.g., resulting a comfort gain or no change in comfort), the method 722 may proceed to 736 to determine whether adjusting the comfort variable or power parameter will result in a increase of power consumption.

At 732, a determination may be made as to whether adjusting the comfort variable or power parameter will result in a decrease of power consumption based on the estimated power metrics. The decrease of power consumption may be indicated by a decrease of a power rating $P_R$. The increase of power consumption may be indicated by an increase of the power rating $P_R$. The power rating $P_R$ may be determined based on power metrics for various power parameters. The power metrics may include a lighting power metric $P_L$, a heating/cooling power metric $P_{H/C}$, and a daylight glare probability power metric $P_{DGP}$ may be determined. The power metrics including the lighting power metric $P_L$, the heating/cooling power metric $P_{H/C}$, and the daylight glare probability power metric $P_{DGP}$ may be in the same units (e.g., joules). For example, the power rating $P_R$ may be calculated at 732 by adding the lighting power metric $P_L$ and the heating/cooling power metric $P_{H/C}$, e.g., $$P_R = P_L + P_{H/C}. \quad \text{(Equation 6)}$$

The daylight glare probability power metric $P_{DGP}$, and/or other power metrics with relatively low influence, may be excluded from Equation 6 since the daylight glare probability power metric $P_{DGP}$, and/or other power metrics with relatively low influence, may be relatively minimum compared to the lighting power metric $P_L$ or the heating/cooling power metric $P_{H/C}$. If it is determined that adjusting the comfort variable or power parameter will result in a decrease of power consumption, the method 722 may proceed to 734 to determine whether the comfort loss outweighs the power consumption decrease.

At 734, a determination may be made as to whether the comfort loss outweighs the power consumption decrease. The determination may be made by comparing the calculated comfort loss and calculated power consumption decrease. If it is determined that the calculated comfort loss outweighs the calculated power consumption decrease (e.g., including if the calculated comfort loss equals the determined power consumption decrease) or the comfort loss causes the comfort level to go below a comfort threshold, the method 722 may end at 748. If the calculated comfort loss does not outweigh the determined power consumption decrease, the method 722 may proceed to adjust the variable by the adjustment amount at 740.

At 736, a determination may be made as to whether adjusting the comfort variable or power parameter will result in a power consumption increase. If it is determined that adjusting the comfort variable or power parameter will result in a power consumption increase, the method 722 may proceed to 738 to determine whether the power consumption increase outweighs a comfort gain.

At 738, a determination may be made as to whether the power consumption increase outweighs the comfort gain. The determination may be made by comparing the calculated comfort gain and determined power consumption increase. If it is determined that the estimated power consumption increase outweighs the calculated comfort gain (e.g., including if the estimated power consumption increase equals the calculated comfort gain) or the estimated power consumption increase causes the power consumption go above a power threshold, the method 722 may end at 748. If it is determined that the estimated power consumption increase does not outweigh the calculated comfort gain, the method 722 may proceed to adjust the variable by the adjustment amount at 740.

At 740, the comfort variable and/or the power parameter may be adjusted by the adjustment amount. The operation of the system may continue to be monitored to determine the actual changes of power consumption and/or comfort metrics at 742. The sensed information and/or measured information may be monitored to calculate the actual reduction of power consumption resulted from the adjustment of the power parameter by the adjustment amount. The measured information may comprise user inputs indicating occupant comforts. The sensed information and/or measured information may be monitored to determine actual change of the comfort metric resulted from the adjustment of the comfort variable by the adjustment amount. The sensed information may be obtained from one or more sensors, e.g., one or more of occupancy sensors, daylight sensors, radio window sensors, temperature control devices, wearable wireless devices or photo sensing devices.

At 744, a determination may be made as to whether the system operate according to the model. A decision may be made as to whether the estimated changes of power consumption in fact occurred and/or whether the estimated changes of comfort metric in fact occurred. For example, the actual changes of power consumption may be calculated, and compared to the estimated change of the power consumption (e.g., as determined herein). The actual changes of comfort metric may be calculated and compared to the estimated change of the comfort metric (e.g., as determined herein). If it is determined that the system did not operate according to the model, the model may be adjusted (e.g., adjust coefficients of the model) at 746. The determination as to whether the system operated according to the model may include a determination that the power consumption is not actually reduced, the estimated changes of power consumption did not in fact occur, the actual change of the comfort metric resulted from the adjustment of the variable by the adjustment exceeds the comfort limits, the estimated changes of comfort metric does not in fact occur, and/or whether the actual change of the power cost complies with the estimated change of the power cost.

If it is determined that the system did not operate according to the model, the model may be adjusted (e.g., adjust coefficients of the model) at 746. The model may be based on various coefficients and comprises sets of equations related to power metrics and/or comfort metrics. The coefficients may be adjusted based on initial common relationships between the power metrics and the power parameters. The coefficients may be adjusted based on initial common relationships between the comfort metrics and the comfort variables. A model adaptation module may be used to determine how the coefficients may be adjusted (e.g., as described in FIG. 7A). If it is determined that the system operated according to the model, the method 722 may end at 748.

Figure 7C:
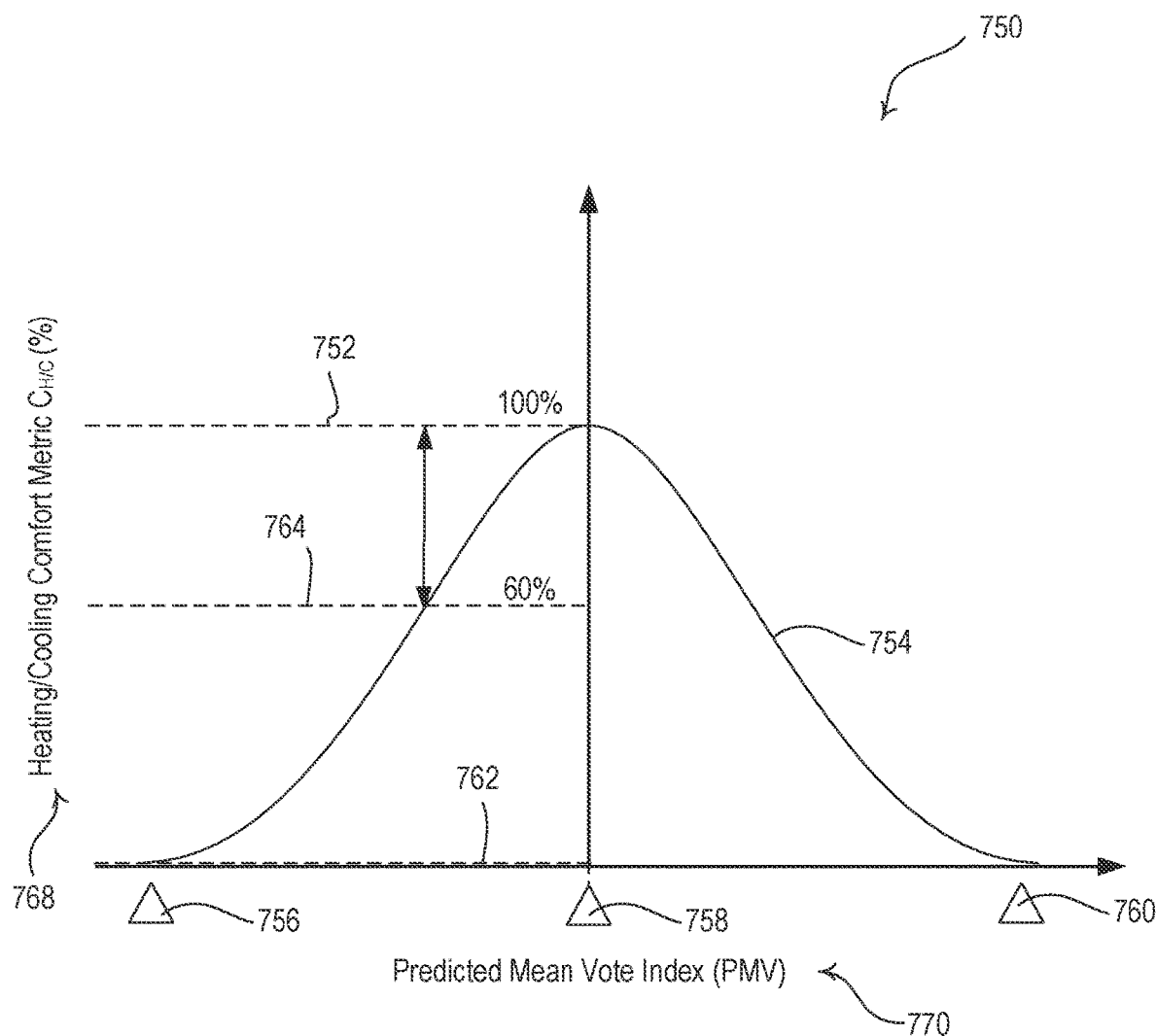
FIG. 7C is an example of a predetermined correlation of the comfort metric for heating and cooling and the predicted mean vote index (PMV).
Figure 7D:
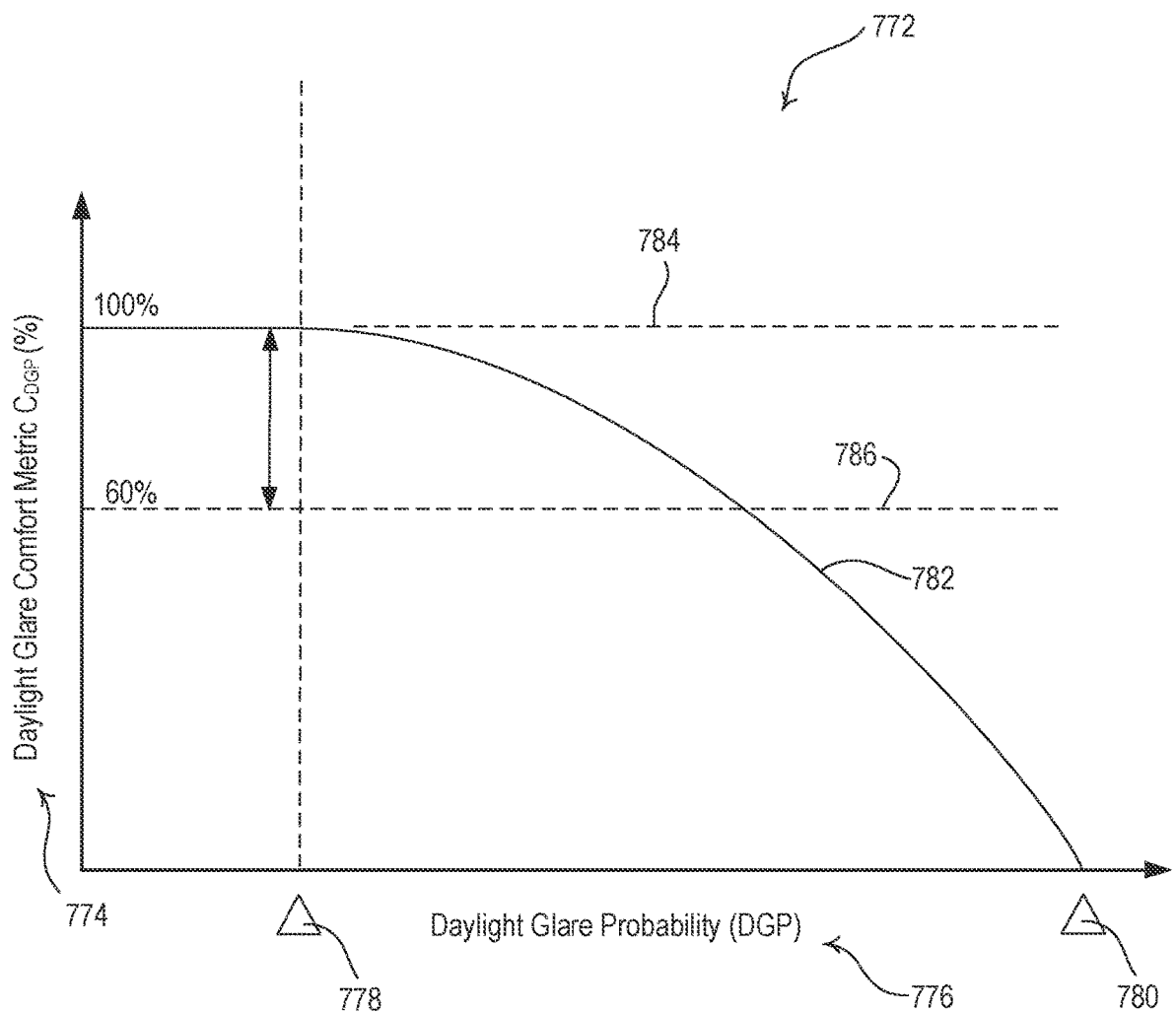
FIG. 7D is an example of a predetermined correlation of the comfort metric for daylight glare and daylight glare probability.
Figure 7E:
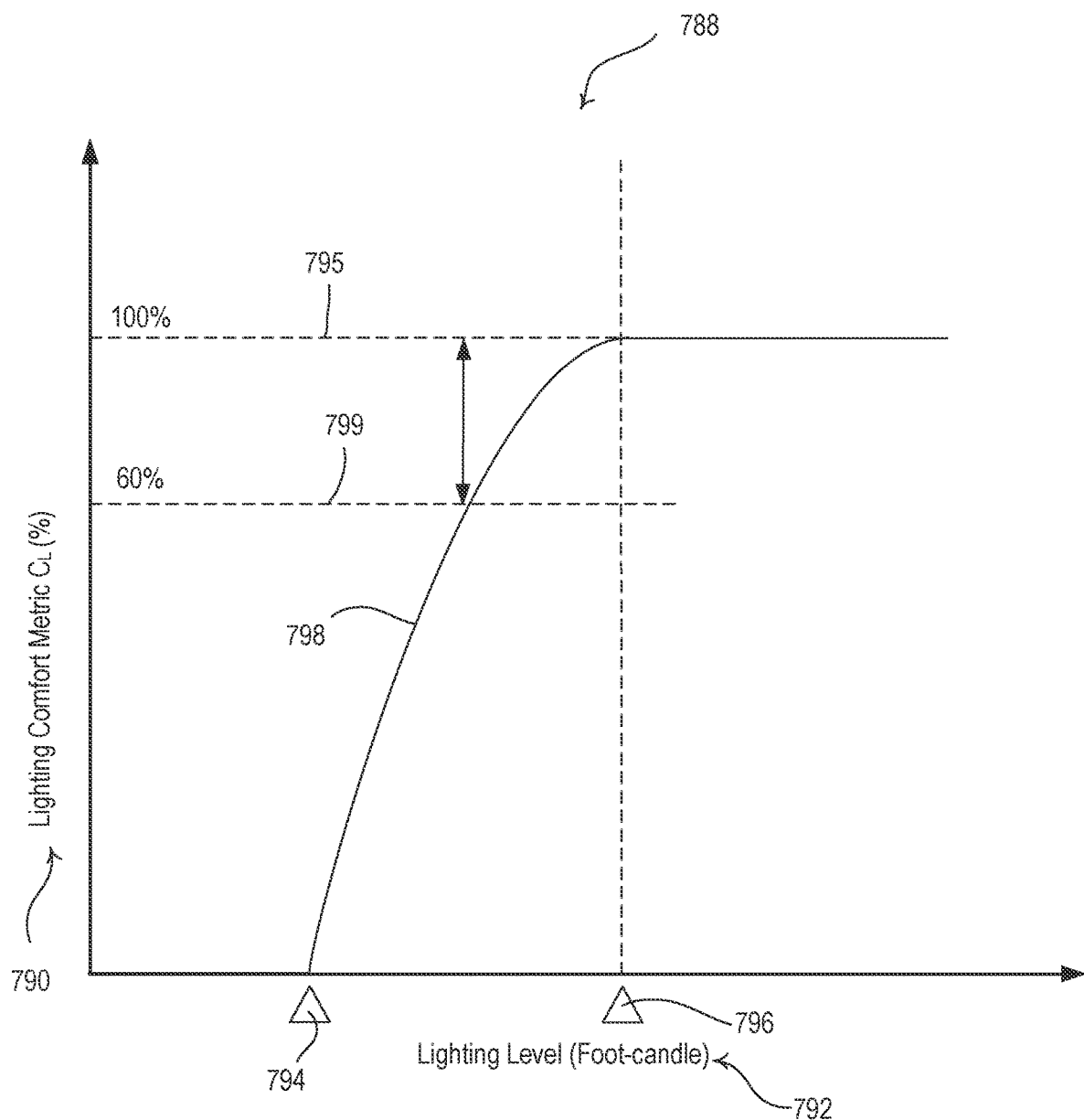
FIG. 7E is an example of a predetermined correlation of the comfort metric for lighting and lighting level.

FIG. 7C-FIG. 7E illustrate examples of correlations between comfort metrics and comfort variables. The correlations may be used to determine a value of a comfort metric at a selected value of comfort variable. The correlations may be used to determine a value of comfort variable at a selected value of comfort metric. For example, the correlations may be used to calculate a change of the comfort metric for an identified comfort variable that may result from an adjustment of the comfort variable. The correlations may represent a change in the comfort level of an occupant as the temperature of a room increases or decreases, as the lighting level increases or decreases, or as the occupant experiences a higher probability of daylight glare.

FIG. 7C is an example of a predetermined correlation 750 between a heating/cooling comfort metric $C_{H/C}$ 768 and a predicted mean vote index (PMV) 770. FIG. 7D is an example of a predetermined correlation 772 of a daylight glare comfort metric $C_{DGP}$ 774 and a daylight glare probability (DGP) 776. FIG. 7E is an example of a predetermined correlation 788 of a lighting comfort metric $C_L$ 790 and a lighting level 792.

In FIG. 7C, the predetermined correlation 750 of the heating/cooling comfort metric $C_{H/C}$ 768 and the predicted mean vote index (PMV) 770 may be represented by heating-cooling comfort curve 754. The heating-cooling comfort curve 754 may be a collection of values for the heating/cooling comfort metric $C_{H/C}$ 768 at various values of the predicted mean vote index 770. The heating/cooling comfort metric $C_{H/C}$ 768 represents the comfort level due to the temperature in the load control environment. The predicted mean vote index 770 represents the mean response of a group of people to a particular temperature in the load control environment. For example, the predicted mean vote index 770 may vary from −3 to +3, where −3 may correspond to a low temperature that causes an occupant to feel uncomfortably cold, and +3 may correspond to a high temperature that causes an occupant to feel uncomfortably hot. The midpoint, where the predicted mean vote index 770 is zero, may represent an optimal temperature that provides the occupant a maximum comfort.

Referring to FIG. 7C, the heating-cooling comfort curve 754 may be a bell-shape curve that has a minimum value 762 at a first low-comfort predicted mean vote index value 756 and a second low-comfort predicted mean vote index value 760, and has a maximum value 752 at a high-comfort predicted mean vote index value 758 (e.g., the midpoint between the low-comfort predicted mean vote index values 756 and 760). The maximum value 752 may represent the highest heating/cooling comfort metric value. For example, one or more of the occupants in the load control environment may experience the highest heating/cooling comfort level in the load control environment when the heating/cooling comfort metric $C_{H/C}$ 768 reaches the maximum value 752. When the values of the predicted mean vote index are at the low-comfort predicted mean vote index values 756 and 760, the heating/cooling comfort metric $C_{H/C}$ 768 may approach the minimum value 762. For example, one or more of the occupants in the load control environment may experience the lowest comfort level related to the heating/cooling level in the load control environment when the heating/cooling comfort metric $C_{H/C}$ 768 reaches the minimum value 762. When the values of the predicted mean vote index are between the low-comfort predicted mean vote index value 756 and the high-comfort predicted mean vote index value 758, the heating/cooling comfort metric $C_{H/C}$ 768 may vary between the minimum value 762 and the maximum value 752.

The heating/cooling comfort metric $C_{H/C}$ 768 may be a percentage value. A percentage value may facilitate the combination of the heating/cooling comfort metric $C_{H/C}$ 768 with other comfort metrics (e.g., the daylight glare comfort metric $C_{DGP}$ 774 and the lighting comfort metric $C_L$ 790) such as in Equations 4 and/or 5. In one or more of the embodiments, the percentage may represent a numerical percentage of the maximum value 752. For example, if the peak value 752 is 100%, an intermediate value 764 of the heating/cooling comfort metric $C_{H/C}$ on the heating-cooling comfort curve 754 may be 60% as shown in FIG. 7C. The intermediate value 764 of 60% for the heating/cooling comfort metric $C_{H/C}$ may represent a delta of 40% from the maximum value 752.

In FIG. 7D, the predetermined correlation 772 of the daylight glare comfort metric $C_{DGP}$ 774 and the daylight glare probability (DGP) 776 may be represented by daylight glare comfort curve 782. The daylight glare comfort curve 782 may be a collection of values for the daylight glare comfort metric $C_{DGP}$ 774 at various values of daylight glare probability 776. The daylight glare comfort metric $C_{DGP}$ 774 represents the comfort level related to daylight glare. The daylight glare probability 776 may represent a probability level that that daylight glare may cause a decrease in comfort for an occupant in the load control environment. As the value of the daylight glare probability 776 increases, a room is more prone to daylight glare, and the occupant is likely to experience more daylight glare. According to the daylight glare comfort curve 782, the occupant may experience little to no discomfort as a result of daylight glare, even as the room becomes more likely to be exposed to daylight glare until value of the daylight glare probability 776 reaches a threshold. In other words, the occupant may have a tolerance of a predefined amount of daylight glare. As the daylight glare probability 776 increase beyond the threshold, the occupant may experience an exponential decrease of comfort level due to daylight glare. For example, the daylight glare probability 776 may increase from zero to 10% without causing discomfort to the occupant. As the daylight glare probability 776 becomes greater than 10%, it is exponentially more likely that the occupant may experience discomfort caused by the increase of the daylight glare probability 776.

The daylight glare comfort curve 782 may have a maximum value 784 when the daylight glare probability 776 is between zero and an intermediate value 778. The daylight glare comfort curve 782 may decrease from the transition value 778 to a maximum value 780, where the daylight glare comfort metric $C_{DGP}$ 774 is equal to zero. The maximum value 784 may represent a highest value for the daylight glare comfort metric. For example, the daylight glare comfort metric $C_{DGP}$ 774 may be at the maximum value 784 when the occupants in the load control environment experience the least amount of daylight glare in the load control environment. When daylight glare probability 776 is above the intermediate value 778, the daylight glare comfort metric $C_{DGP}$ 774 may approach a lower limit of zero when the daylight glare probability 776 reaches the maximum value 780. For example, the daylight glare comfort metric $C_{DGP}$ 774 may be at zero when the occupants in the load control environment experience the greatest amount of daylight glare that they could tolerate in the load control environment. When the daylight glare probability 776 is between the intermediate value 778 and the maximum value 780, the daylight glare comfort metric $C_{DGP}$ 774 may be between zero and the maximum value 784.

The daylight glare comfort metric $C_{DGP}$ 774 may be in a unit of a percentage (e.g., for the same reason for the heating/cooling comfort metric $C_{H/C}$ 768). The percentage may represent a numerical percentage of the maximum value 784. For example, if the maximum value 784 is 100%, an intermediate value 786 of the daylight glare comfort metric $C_{DGP}$ on the daylight glare comfort curve 782 may be 60% as shown in FIG. 7D. The intermediate value 786 of 60% for the daylight glare comfort metric $C_{DGP}$ may represent a delta of 40% from the maximum value 784.

In FIG. 7E, the predetermined correlation 788 of the lighting comfort metric $C_L$ 790 and the lighting level 792 may be represented by the lighting comfort curve 798. The lighting comfort curve 798 may be collection of values for the lighting comfort metric $C_L$ 790 at various values of the lighting level 792. The lighting comfort metric $C_L$ 790 represents the comfort level due to the amount of light in the load control environment. The lighting level 792 may correspond to the amount of light in the load control environment. The unit of the lighting level 792 may be foot-candle.

The lighting comfort curve 798 may increase from zero to a maximum value 195 (e.g., 100%) when the lighting level is between a first lighting level 794 and a second lighting level 796. The lighting comfort curve 798 may remain at the maximum value 795 above the second lighting level 796. The lighting comfort metric $C_L$ 790 may be at the maximum value 795 when the lighting level is at the second lighting level 796. The maximum value of 795 may represent a highest value for the lighting comfort metric $C_L$. For example, the lighting comfort metric $C_L$ 790 may be at the maximum value 795 when the occupants in the load control environment experience the greatest lighting comfort in the load control environment. When lighting level is between the first value 794 and the second value 796, the lighting comfort metric $C_L$ 790 may range between a lower limit of zero and the maximum value 795. For example, the lighting comfort metric $C_L$ 790 may be zero when the occupants in the load control environment experience the least lighting comfort in the load control environment. When the lighting level is between the first value 794 and the second value 796, the lighting comfort metric $C_L$ 790 may be between zero and the maximum value 795.

The lighting comfort metric $C_L$ 790 may be in a unit of a percentage (e.g., for the same reason for the heating/cooling comfort metric $C_{H/C}$ 768 and the daylight glare comfort metric $C_{DGP}$ 774). The percentage may represent a numerical percentage of the maximum value 795. For example, if the maximum value 795 is 100%, an intermediate value 799 of the lighting comfort metric $C_L$ 790 on the lighting comfort curve 782 may be 60% $C_L$ as shown in FIG. 7E. The intermediate value 799 of 60% for the lighting comfort metric $C_L$ may represent a delta of 40% from the maximum value 795.

A comfort rating $C_R$ may be calculated based on the combination of the lighting comfort metric $C_L$ 790, the daylight glare comfort metric $C_{DGP}$ 774, and the heating/cooling comfort metric $C_{H/C}$ 768 (e.g., using Equations 4 and/or 5). The comfort rating $C_R$ may be converted to a comfort cost $C_{COST}$ and compared with the power cost $P_{COST}$. The power cost $P_{COST}$ may be converted from the power rating $P_R$, which may be calculated based on a power metric for lighting level $P_L$ and a power metric for the heating/cooling level $P_{H/C}$ (e.g., using Equation 6).

The lighting power metric $P_L$ may be determined according to the amount of power used by the lighting control devices 130 (e.g., electric light level). The amount of power used by the lighting control devices 130 may be calculated according to a lighting intensity level of the lighting control devices 130 (e.g., electric light level) and/or an amount of time during which the lighting control devices 130 provide lighting or are predicted to be providing lighting at a lighting intensity level.

Various elements in the load control environment may affect the lighting power metric $P_L$. The elements may include a level of a covering material and/or a glass state for the motorized window treatments 140 and/or a daylight glare level within the load control environment. For example, a higher level of a covering material may allow additional light to enter the load control environment and thus reduce a lighting intensity of the lighting control devices (e.g., a lighting intensity needed to maintain a certain comfort level in the load control environment).

For example, the system controller (e.g., 110) may control and/or adjust the elements within the load control environment to reduce the power consumption of the lighting control devices and thus the lighting power metric $P_L$. The system controller 110 may raise the level of the covering material for the motorized window treatments 140 and reduce the dimming level of the lighting control devices 130, while maintaining the lighting level comfort allowed according to the threshold set for the lighting level of the occupants.

The heating/cooling power metric $P_{H/C}$ may be determined according to an amount of power used, or predicted to be used, by the heating/cooling devices 170. The amount of power used by the heating/cooling devices 170 may be dependent on a heat load $H_L$. The heat load $H_L$ may be either a positive or a negative value. Equation 2 may be an example for determining the heating/cooling power metric $P_{H/C}$. The heat load $H_L$ in the load control environment 100 may include one or more of conductive heat, radiant heat, convective heat, mass transfer heat, and/or other forms of heat. The impact of the heat load $H_L$ on the amount of power used by the heating/cooling devices 170 may be captured in a heating/cooling constant $C_{H/C}$. For example, a value of the heating/cooling constant $C_{H/C}$ may depend on an extent to which the $H_L$ affects the amount of power used by the heating/cooling devices 170. The heating/cooling constant $C_{H/C}$ may change based on an operating mode (e.g., heating mode, cooling mode, and/or a mixed heating/cooling mode) of the HVAC system.

The heating/cooling constant $C_{H/C}$ may be estimated and/or learned by measuring the heating/cooling power metric $P_{H/C}$. As discussed herein, the heat load $H_L$ may be determined by calculating the conductive heat, radiative heat, light heat, plug/appliance heat, occupant heat, and/or other heat sources. The heating/cooling power metric $P_{H/C}$ may be determined according to the amount of power used, or predicted to be used, by the heating/cooling devices 170. The heating/cooling power metric $P_{H/C}$ may be calculated using the heat load $H_L$ and the heating/cooling constant $C_{H/C}$, e.g., $$P_{H/C} = C_{H/C} \cdot H_L. \quad \text{(Equation 7)}$$

The amount of power used by the heating/cooling devices 170 may be dependent upon the amount of time the heating/cooling devices are on in relation to the amount of time that the heating/cooling devices are off (e.g., the duty cycle of the heating/cooling operation of the heading/cooling devices), or may be predicted to be on. The heating/cooling constant $C_{H/C}$ may be learned based on the heating/cooling power metric $P_{H/C}$ and the heat load $H_L$ using Equation 7. For example, the operation of the heating/cooling devices 170 may be monitored, and the coefficient may be updated based on the operation of the heating/cooling devices 170. The heating/cooling constant $C_{H/C}$ may be adjusted based on a change of the load control environment 100.

The heat load $H_L$ in the load control environment 100 may include conductive heat contributed by various sources in and outside the load control environment 100. The heat load $H_L$ contributed by conduction may be via various medium. For example, the heat load $H_L$ contributed by conduction may be via one or more of air, window, wall, and/or the like. The sources that contribute to the heat load $H_L$ through conductive heat may include sources that are hotter or colder than the objects inside and/or outside the load control environment 100. For example, the load control devices inside the load control environments 100 may contribute to the heat load $H_L$ through conductive heat.

Conductive heat may be determined by a temperature difference between heat sources in and/or outside the load control environment 100. A conductive heat gain/loss $H_{COND}$ may be calculated based on an outside temperature $T_{out}$, an inside temperature $T_{in}$, and a conductive heat constant $C_c$, e.g., $$H_{COND} = C_c \cdot (T_{out} - T_{in}). \quad \text{(Equation 8)}$$

The outside temperature $T_{out}$ may be determined by an outside temperature sensor or via a weather link or database. The inside temperature $T_{in}$ may be determined by an indoor temperature sensor or a thermostat. For example, the inside temperature $T_{in}$ and/or outside temperature $T_{out}$ may be measured by the temperature control device 166. The outside temperature $T_{out}$ may also be determined from weather data received at the system controller 110 over a network. The conductive heat constant $C_c$ may be estimated from properties of the load control environment and/or glass. For example, the conductive heat constant $C_c$ may be a function of various space/area specific attributes such as a shade position, electrochromic glass state and/or the like. The conductive heat constant $C_c$ may be learned by modifying the shade positions and glass properties and monitoring the associated sensor responses. The conductive heat constant $C_c$ may be stored at the system controller 110 for determining conductive heat gain/loss.

The heat load $H_L$ in the load control environment 100 may include radiant heat contributed by various emitting heat sources in and outside the load control environment 100. For example, the emitting heat sources that contribute to the heat load $H_L$ through radiant heat may include the sun, and/or the load control devices inside the load control environments 100.

Radiant heat may be determined by measuring illumination from various emitting heat sources. For example, the illumination from the sun (e.g., the solar heat) may be determined from measurements taken from the radio window sensor 157. The solar heat may be determined from illuminance sensors (e.g., the photocell 169, the daylight sensor 156, etc.). A radiant heat gain/loss $H_{RAD}$ may be calculated based on a solar heat E and a radiant heat constant $C_r$ in the load control environment 100, e.g., $$H_{RAD}=C_r \cdot E \quad \text{(Equation 9)}$$

The solar heat E may be determined from measurements taken from the radio window sensor 157. The solar heat E may be determined from illuminance sensors (e.g., photo sensing device 169, daylight sensor 156, etc.). The radiant heat constant $C_r$ may be estimated from properties of the load control environment and/or glass, which may be stored at the system controller 110. For example, the radiant heat constant $C_r$ may be a function of various space/area specific attributes such as a shade position, electrochromic glass state and/or the like. The radiant heat constant $C_r$ may be learned by modifying the shade positions and glass properties and monitoring the associated sensor responses. The radiant heat constant $C_r$ may be stored at the system controller 110 for determining radiant heat gain/loss.

The heat load $H_L$ in the load control environment 100 may include occupant heat. The system controller 110 may count the number of occupancy commands and/or vacancy commands received within a period of time to quantify occupant heat in a space. Each occupant may be assigned a predefined amount of heat output. If a greater number of occupancy commands are received within a predefined period of time, the occupant heat may be increased by a defined amount. For example, a predefined number of occupancy commands being received within a predefined period of time may cause an increase of one degree in temperature in the load control environment.

The occupant heat may be determined based on occupant activity within the load control environment. A radiant heat gain/loss $H_{OCC}$ may be calculated based on a level of occupant activity A in the load control environment 100 and an occupant heat constant $C_o$, e.g., $$H_{OCC}=C_o \cdot A. \quad \text{(Equation 10)}$$

The level of occupant activity A may be indicated by the number of occupancy and/or vacancy messages received from the occupancy sensor 154. The greater the occupant activity, the higher the relative occupant heat. The level of the occupant activity A may be determined by an occupant activity sensor. The occupancy activity sensor may provide a binary response to occupancy conditions (e.g., vacancy or occupied). The occupancy activity sensor may include a device that quantifies all detected movement within the load control environment 100. The number of occupants may also be determined by the number of wearable control devices 167 and/or network devices 165 detected in the load control environment 100. The occupant heat may also, or alternatively, be measured by a temperature sensor on the wearable control device 167. The occupant heat constant $C_o$ may be estimated based on one or more of space type, a typical occupant activity, or loads. The occupant heat constant $C_o$ may be learned by monitoring temperature changes and reading responses on the occupant activity sensor.

The light heat may be calculated based on the light power being used by the lighting control devices 130 to light the lighting loads 132. The light heat may fluctuate with the lighting intensity level at which each lighting control device 130 is set. The light heat may be based on a light heat constant $C_{LH}$ that is based on the efficiency of lighting heat exiting a fixture and occurring in a load control environment. The light heat constant $C_{LH}$ may be estimated and/or learned by modifying light power and monitoring the associated sensor responses. For example, the light heat constant may change based on the color (e.g., color temperature) of the lighting loads 132. The light heat constant $C_{LH}$ may be stored at the system controller 110 for determining radiant heat gain/loss. The light power may be measured or estimated based on light levels in a load control environment.

The plug/appliance heat may be calculated based on the occupancy or vacancy of the load control environment 100 and the estimated use of plugs or appliances when the load control environment is occupied and vacant. The plug/appliance heat may be based on a plug/appliance constant $C_{P/A}$ The plug/appliance constant $C_{P/A}$ may be measured or learned and may be based on the additional heat generated from plugs, appliances, and/or devices when a load control environment is occupied. The plug/appliance constant $C_{P/A}$ may be measured or learned and may be a baseline level of heat generated from plugs, appliances, and/or devices when a load control environment is empty. The plug/appliance constant $C_{P/A}$ may be variable with respect to time (e.g., dependent upon a time of day). For example, some plug-in loads (e.g., such as computers, monitors, printers, etc.) are less likely to be used at night. The plug/appliance constant $C_{P/A}$ may be stored at the system controller 110 for determining the plug and/or appliance heat.

Figure 8:
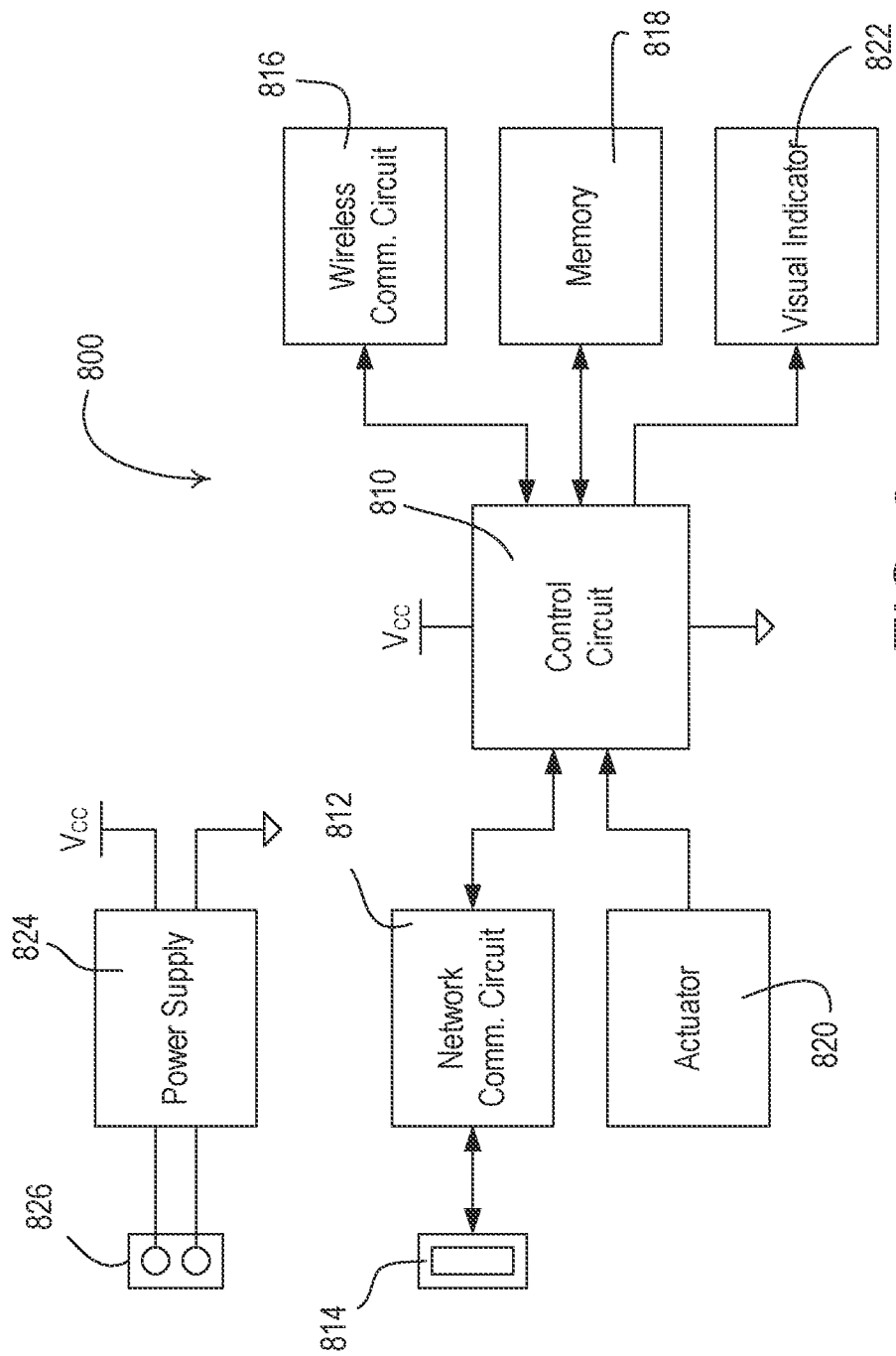
FIG. 8 is a block diagram of an example system controller.

FIG. 8 is a block diagram of an example system controller 800, which may be deployed as, for example, the system controller 110 of the load control environment 100 shown in FIG. 1 and/or the system controller 350 of the load control environment 300. The system controller 800 may include a control circuit 810, which may include one or more of a processor (e.g., a microprocessor), a microcontroller, a programmable logic device (PLD), a field programmable gate array (FPGA), an application specific integrated circuit (ASIC), or any suitable processing device. The control circuit 810 may perform signal coding, data processing, power control, input/output processing, and/or any other functionality that enables the system controller 800 to perform as described herein. The system controller 800 may include a network communication circuit 812 that may be coupled to a network connector 814 (e.g., an Ethernet jack), which may be adapted to be connected to a wired digital communication link (e.g., an Ethernet communication link) for allowing the control circuit 810 to communicate with network devices or the Internet on a network. The network communication circuit 812 may be configured to be wirelessly connected to the network using a first wireless communication protocol to transmit and/or receive RF signals.

The system controller 800 may include a wireless communication circuit 816, for example, including an RF transceiver coupled to an antenna for transmitting and/or receiving RF signals. The wireless communication circuit 816 may communicate using a second wireless communication protocol. The control circuit 810 may be coupled to the wireless communication circuit 816 for transmitting digital messages via the RF signals, for example, to control the load control devices in the load control environment in response to received digital messages. The control circuit 810 may be configured to receive digital messages, for example, from the load control devices and/or the input devices.

The control circuit 810 may be responsive to an actuator 820 for receiving a user input. For example, the control circuit 810 may be configured to associate the system controller 800 with one or more control devices in response to actuations of the actuator 820 during a configuration procedure of a load control system. The system controller 800 may include additional actuators to which the control circuit 810 may be responsive.

The control circuit 810 may store information in and/or retrieve information from the memory 818. The memory 818 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 810 may access the memory 818 for executable instructions and/or other information that may be used by the system controller 800. The control circuit 810 may store the thresholds for comfort metrics and/or power consumption ranges for power metrics in the memory 818. The control circuit 810 may access instructions in the memory 818 for controlling control devices based on the thresholds for comfort metrics and/or the power consumption ranges for power metrics as described herein.

The control circuit 810 may illuminate a visual indicator 822 to provide feedback to a user of a load control system. For example, the control circuit 810 may blink or strobe the visual indicator 822 to indicate a fault condition. The control circuit 810 may be configured to illuminate the visual indicator 822 different colors to indicator different conditions or states of the system controller 800. The visual indicator 822 may be illuminated by, for example, one or more light-emitting diodes (LEDs). The system controller 800 may include more than one visual indicator.

The system controller 800 may include a power supply 824 for generating a DC supply voltage $V_{CC}$ for powering the control circuit 810, the network communication circuit 812, the wireless communication circuit 816, the memory 818, the visual indicator 822, and/or other circuitry of the system controller 800. The power supply 824 may be coupled to a power supply connector 826 (e.g., a USB port) for receiving a supply voltage (e.g., a DC voltage) and/or for drawing current from an external power source.

Figure 9:
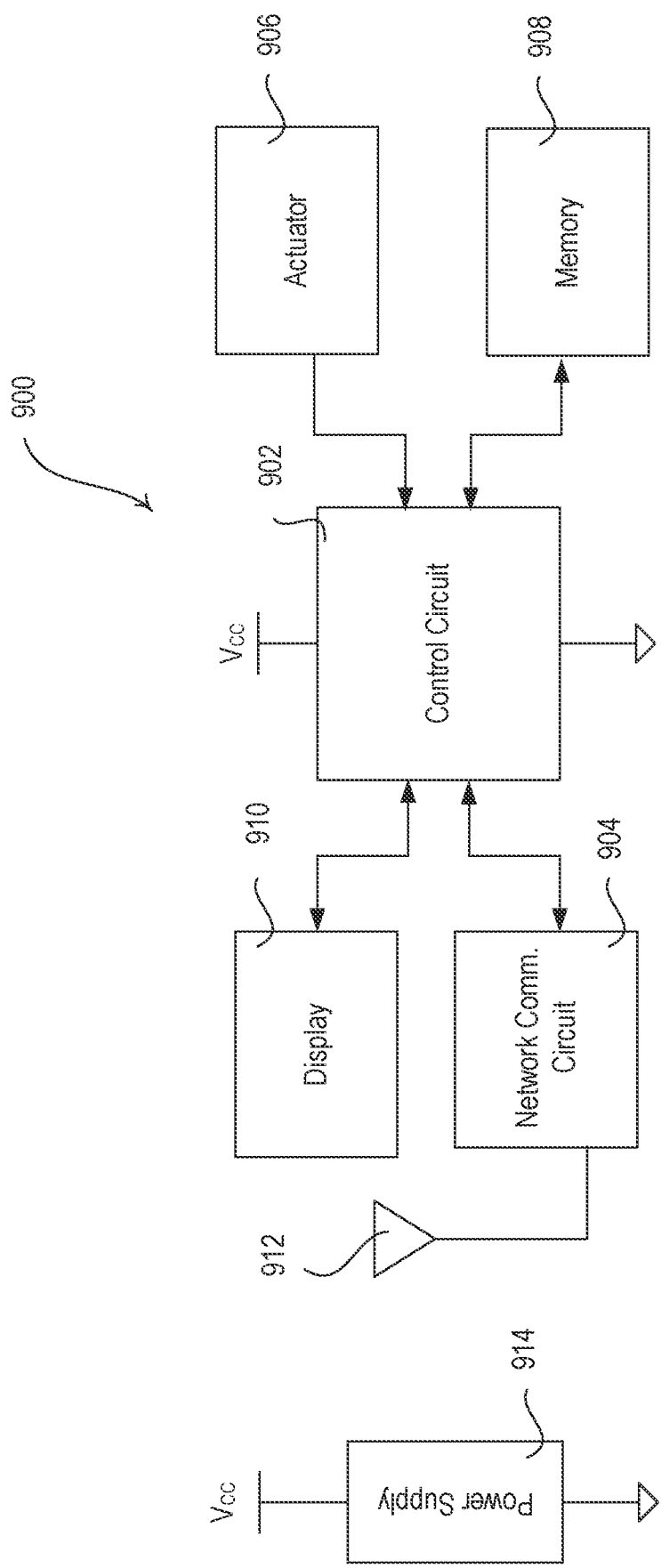
FIG. 9 is a block diagram of an example network device.

FIG. 9 is a block diagram illustrating an example network device 900. The network device 900 may be a personal computer (e.g., personal computer 164), a server, a laptop, a tablet, a smart phone, a control-source device (e.g., an input device), and/or other suitable network communication device (e.g., an Internet-Protocol-enabled device), for example. The network device 500 may perform the functions of personal computer 164 shown in FIG. 1, the network device 264 shown in FIG. 2, the network device 358 shown in FIGS. 3A-3I, and/or the functions of network devices described herein.

The network device 900 may include a control circuit 902, which may include one or more of a processor (e.g., a microprocessor), a microcontroller, a programmable logic device (PLD), a field programmable gate array (FPGA), an application specific integrated circuit (ASIC), or any suitable processing device. The control circuit 902 may perform signal coding, data processing, power control, image processing, input/output processing, and/or any other functionality that enables the network device 900 to perform as described herein.

The control circuit 902 may store information in and/or retrieve information from the memory 908. The memory 908 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 902 may access the memory 908 for executable instructions and/or other information that may be used by the network device 900. The control circuit 902 may access instructions in the memory 908 for receiving, storing, displaying and/or communicating information.

The network device 900 may include a network communication circuit 904, which may be adapted to perform wired and/or wireless communications on behalf of the network device 900. The network communication circuit 904 may be a wireless communication circuit, for example, including an RF transceiver coupled to an antenna 912 for transmitting and/or receiving RF signals. The control circuit 902 may be coupled to the network communication circuit 904 for transmitting and/or receiving digital messages via the RF signals, for example.

The network device may include an actuator 906. The control circuit 902 may be responsive to the actuator 906 for receiving a user input. For example, the control circuit 902 may be configured to receive a button press from a user on the network device 900 for making a selection or performing other functionality on the network device 900.

The network device may include a display 910. The control circuit 902 may be in communication with a display 910 for displaying information to a user. The communication between the display 910 and the control circuit 902 may be a two-way communication, as the display 910 may include a touch screen module capable of receiving information from a user and providing such information to the control circuit 902.

The network device 900 may include a power supply 914 for generating a DC supply voltage $V_{CC}$ for powering the control circuit 902, the network communication circuit 904, the memory 908, the display 910, and/or other circuitry of the network device 900. The power supply 914 may be a battery or another source of power for the network device 900.

Figure 10:
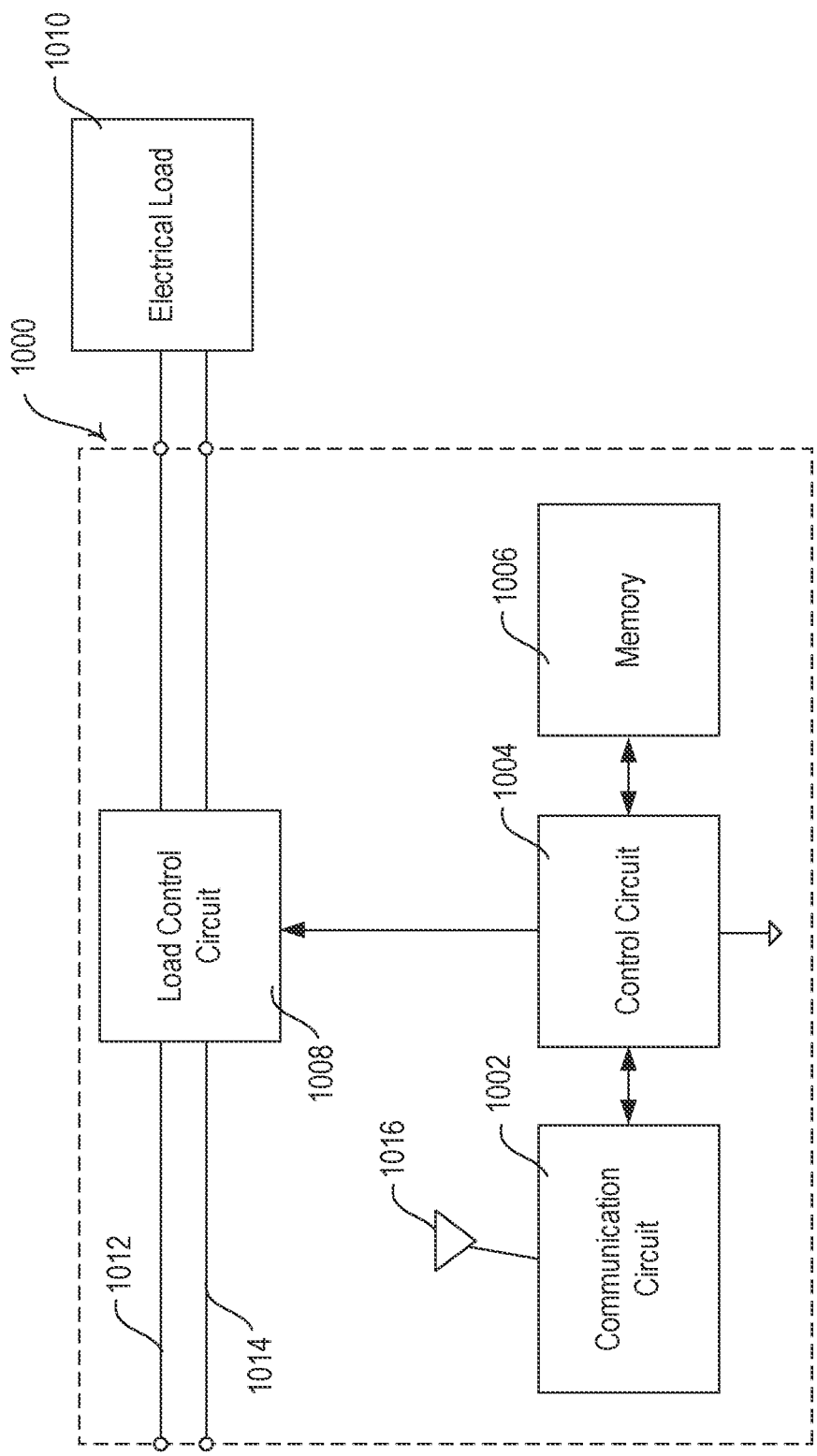
FIG. 10 is a block diagram illustrating an example load control device.

FIG. 10 is a block diagram illustrating an example load control device 1000. The load control device 1000 may be a control-target device for example. The load control device 1000 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1000 may include a communication circuit 1002. The communication circuit 1002 may include a receiver, an RF transceiver or other communication module capable of performing wired and/or wireless communications. The wireless communications may be performed via an antenna 1016.

The communication circuit 1002 may be in communication with a control circuit 1004. The control circuit 1004 may include one or more general purpose processors, special purpose processors, conventional processors, digital signal processors (DSPs), microprocessors, integrated circuits, a programmable logic device (PLD), application specific integrated circuits (ASICs), or the like. The control circuit 1004 may perform signal coding, data processing, power control, input/output processing, and/or any other functionality that enables the load control device 1000 to perform as described herein.

The control circuit 1004 may store information in and/or retrieve information from a memory 1006. For example, the memory 1006 may maintain executable instructions for controlling the load control device 1000 via the control circuit 1004. The memory 1006 may include a non-removable memory and/or a removable memory. The load control circuit 1008 may receive instructions from the control circuit 1004 and may control the electrical load 1010 based on the received instructions. The load control circuit 1008 may receive power via the hot connection 1012 and the neutral connection 1014 and may provide an amount of power to the electrical load 1010. The electrical load 1010 may include any type of electrical load.

Although features and elements are described herein in particular combinations, each feature or element can be used alone or in any combination with the other features and elements. Although particular embodiments are described herein, the embodiments described herein are non-limiting and many other variations, modifications, and other uses are apparent. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A system controller, the system controller comprising:
a control circuit configured to:
define a threshold for a comfort metric, wherein the comfort metric indicates a comfort level based on a plurality of comfort variables in a load control environment;
define a range for a power metric, wherein the power metric indicates a power level based on a plurality of power parameters in the load control environment;
receive, from each of one or more sensors disposed in the load control environment, a respective signal that includes data representative of at least one of the plurality of comfort variables;
receive, from each of one or more sensors, a respective signal that includes data indicative of at least one of the plurality of power parameters;
determine a value that corresponds to the comfort metric using the received data representative of the at least one of the plurality of comfort variables;
determine a value that corresponds to the power metric using the received data representative of the at least one of the plurality of power parameters; and
automatically control one or more load control devices in the load control environment to maintain the determined value that corresponds to the comfort metric above the defined threshold value for the comfort metric while maintaining the determined value that corresponds to the power metric within the defined range for the power metric.

2. The system controller of claim 1, wherein the comfort metric may comprise at least one of a lighting level, a daylight glare level, or a thermal comfort level, wherein the lighting level is based at least on illuminance of the load control environment, wherein the daylight glare level is based at least on direct sun to the load control environment, and wherein the thermal comfort level is based at least on direct sun to the load control environment, outdoor temperature, the load control environment temperature, or occupant temperature.

3. The system controller of claim 1, wherein the plurality of comfort variables comprise glare, temperature, light, or window treatment position.

4. The system controller of claim 1, wherein the power metric may comprise at least one of conductive heat gain that is based at least outdoor temperature and the load control environment temperature, conductive heat loss that is based on at least outdoor temperature and the load control environment temperature, radiative heat gain that is based at least on solar heat, radiative heat loss that is based at least on solar heat, occupant heat to a room that is based at least on occupant temperature, light heat to a room that is based at least on radiant electric heat, plug-in load heat to a room, appliance heat to a room, or light power that is based at least on electricity used in the load control environment.

5. The system controller of claim 1, wherein the one or more load control devices comprise at least one of a lighting controller, a motorized window treatment controller, or a temperature controller.

6. The system controller of claim 1, wherein the control circuit is configured to:
determine the value that corresponds to the plurality of comfort variables and determine the value that corresponds to the plurality of power parameters by receiving data from an occupancy sensor in the load control environment for detecting whether the load control environment is occupied or unoccupied; and
control the one or more load control devices in response to the occupancy sensor.

7. The system controller of claim 6, wherein, when the load control environment is occupied, the control circuit is configured to command the one or more load control devices to adjust a lighting intensity level to a predefined level to maintain the comfort metric above the defined threshold value.

8. The system controller of claim 6, wherein, when the load control environment is occupied, the control circuit is configured to command the one or more load control devices to adjust a window treatment position to a predefined position to maintain the comfort metric above the defined threshold value.

9. The system controller of claim 6, wherein, when the load control environment is occupied, the control circuit is configured to command the one or more load control devices to adjust a temperature level to a predefined level to maintain the comfort metric above the defined threshold value.

10. The system controller of claim 1, wherein the threshold for a comfort metric is a minimum comfort level based on the plurality of comfort variables in the load control environment or a target comfort level based on the plurality of comfort variables in the load control environment.

11. The system controller of claim 1, wherein the range for the power metric is a maximum level of power in a load control environment or a targeted level of power in a load control environment.

12. The system controller of claim 1, wherein the control circuit is further configured to:
receive user input to control the one or more load control devices; and
adjust the threshold value for the comfort metric based on the user input.

13. A system controller, the system controller comprising:
a control circuit configured to:
define a threshold for a comfort metric, wherein the comfort metric indicates a comfort level based on a plurality of comfort variables in a load control environment;
define a range for a power metric, wherein the power metric indicates a power level based on a plurality of power parameters in the load control environment;
monitor the plurality of comfort variables and the plurality of power parameters;
compute the comfort metric based on the monitored plurality of comfort variables;
compute the power metric based on the monitored plurality of power parameters;
automatically control one or more load control devices in the load control environment to prevent the comfort metric from falling below the defined threshold for the comfort metric while maintaining the power level within the defined range for the power metric;
receive user input to control the one or more load control devices;
adjust the threshold for the comfort metric based on the user input;
determine the load control device of the one or more load control devices that is controlled by the received user input; and
control at least one load control device of the one or more load control devices that is not controlled by the received user input.

14. The system controller of claim 13, wherein the power metric may comprise at least one of conductive heat gain that is based at least outdoor temperature and the load control environment temperature, conductive heat loss that is based on at least outdoor temperature and the load control environment temperature, radiative heat gain that is based at least on solar heat, radiative heat loss that is based at least on solar heat, occupant heat to a room that is based at least on occupant temperature, light heat to a room that is based at least on radiant electric heat, plug-in load heat to a room, appliance heat to a room, or light power that is based at least on electricity used in the load control environment.

15. The system controller of claim 13, wherein the one or more load control devices comprise at least one of a lighting controller, a motorized window treatment controller, or a temperature controller.

16. The system controller of claim 13, wherein the control circuit is configured to:
monitor the plurality of comfort variables and the plurality of power parameters by receiving data from an occupancy sensor in the load control environment for detecting whether the load control environment is occupied or unoccupied; and
control the one or more load control devices in response to the occupancy sensor.

17. The system controller of claim 16, wherein, when the load control environment is occupied, the control circuit is configured to command the one or more load control devices to adjust a lighting intensity level to a predefined level to prevent the comfort metric from falling below the defined threshold.

18. The system controller of claim 16, wherein, when the load control environment is occupied, the control circuit is configured to command the one or more load control devices to adjust a window treatment position to a predefined position to prevent the comfort metric from falling below the defined threshold.

19. The system controller of claim 16, wherein, when the load control environment is occupied, the control circuit is configured to command the one or more load control devices to adjust a temperature level to a predefined level to prevent the comfort metric from falling below the defined threshold.

20. The system controller of claim 13, wherein the threshold is a minimum comfort level based on the plurality of comfort variables in the load control environment or a target comfort level based on the plurality of comfort variables in the load control environment.

21. A system controller for controlling one or more load control devices in a load control environment, the system controller comprising:
a control circuit configured to:
determine a comfort variable of a plurality of comfort variables to adjust, wherein the plurality of comfort variables are associated with a comfort level in the load control environment and power consumption of the load control environment;
determine an adjustment amount for the comfort variable;
calculate an estimated change of a comfort cost based on the adjustment amount for the comfort variable, wherein the comfort cost indicates a monetary value for the comfort level in a load control environment;
calculate an estimated change of a power cost based the adjustment amount for the comfort variable, wherein the power cost indicates a monetary value for a power consumption of the load control environment;
compare the estimated change of the comfort cost to the estimated change of the power cost; and
automatically control the one or more load control devices in the load control environment base on the comfort cost and the power cost.

22. The system controller of claim 21, wherein automatically controlling the one or more load control devices in the load control environment comprises adjusting the comfort variable by the adjustment amount based on the comparison of the estimated change of the comfort cost to the estimated change of the power cost.

23. The system controller of claim 21, wherein the power cost is calculated based on a power rating, wherein the power rating is a total power metric of individual power metrics associated with the plurality of comfort variables.

24. The system controller of claim 23, wherein the individual power metrics associated with the plurality of comfort variables comprises a power metric for lighting level and a power metric for heating/cooling level.

25. The system controller of claim 24, wherein the power metric for heating/cooling level is calculated based on a heat load comprising contributions from one or more of conductive heat, radiative heat, light heat, occupant heat, plug-in load heat or appliance heat.

26. The system controller of claim 21, wherein the comfort cost is calculated based on a comfort rating, wherein the comfort rating is a combined comfort metric of individual comfort metrics associated with the plurality of comfort variables.

27. The system controller of claim 26, wherein the individual comfort metrics associated with the plurality of comfort variables comprises a comfort metric for lighting level, a comfort metric for the heating/cooling level, and a comfort metric for daylight glare probability.

28. The system controller of claim 27, wherein the comfort metric for the heating/cooling level is calculated based on a correlation between the comfort metric for the heating/cooling level and predicted mean vote index (PMV) associated with the load control environment, wherein the predicted mean vote index indicates a temperature in the load control environment.

29. The system controller of claim 28, wherein the correlation between the comfort metric for the heating/cooling level and predicted mean vote index (PMV) associated with the load control environment comprises a heating-cooling comfort curve.

30. The system controller of claim 29, wherein the heating-cooling comfort curve is adjusted based on actual comfort metric for the heating/cooling level corresponding to the predicted mean vote index associated with the load control environment.

31. The system controller of claim 27, wherein the comfort metric for lighting level is calculated based on a correlation between the comfort metric for lighting and lighting level in the load control environment, wherein the correlation comprises a lighting comfort curve that is adjusted based on actual comfort metric for the lighting corresponding to lighting level in the load control environment.

32. The system controller of claim 27, wherein the comfort metric for daylight glare is calculated based on a correlation between the comfort metric for daylight glare and the daylight glare probability (DGP) associated with an amount of daylight glare in the load control environment, wherein the correlation comprises a daylight glare comfort curve that is adjusted based on actual comfort metric for daylight glare corresponding to daylight glare probability in the load control environment.

33. The system controller of claim 21, wherein automatically controlling the one or more load control devices in the load control environment comprises adjusting the comfort variable by the adjustment amount and calculating the estimated change of the power cost is based on one or more coefficients that are associated with an operation of the one or more load control device in the load control environment, and the control circuit is further configured to:
   determine an actual change of the power cost based on sensed information, wherein the sensed information is obtained from occupancy sensors, daylight sensors, radio window sensors, temperature control devices, wearable wireless devices or photo sensing devices;
   determine whether the actual change of the power cost complies with the estimated change of the power cost; and
   adjust the one or more coefficients that are associated with the operation of the one or more load control devices in the load control environment in response to a determination that the actual change of the power cost does not comply with the estimated change of the power cost.

34. The system controller of claim 21, wherein automatically controlling the one or more load control devices in the load control environment comprises adjusting the comfort variable by the adjustment amount and calculating the estimated change of the comfort cost is based on one or more coefficients that are associated with an operation of the one or more load control device in the load control environment, and the control circuit is further configured to:
   determine an actual change of the comfort cost based on user inputs;
   determine whether the actual change of the comfort cost complies with the estimated change of the comfort cost; and
   adjust the one or more coefficients that are associated with the operation of the one or more load control device in the load control environment in response to a determination that the actual change of the comfort cost does not comply with the estimated change of the comfort cost.

35. The system controller of claim 21, wherein the estimated change of the comfort cost is associated with a comfort gain, and the estimated change of the power cost is associated with an increase of the power consumption, and automatically controlling the one or more load control devices in the load control environment comprises:
   determining that the comfort gain is greater than the increase of the power consumption; and
   adjusting the determined comfort variable by the adjustment amount.

36. The system controller of claim 21, wherein the estimated change of the comfort cost is associated with a comfort loss, and the estimated change of the power cost is associated with a reduction of the power consumption, and automatically controlling the one or more load control devices in the load control environment comprises:
   determining that the reduction of the power consumption is greater than the comfort loss; and
   adjusting the determined comfort variable by the adjustment amount.

37. The system controller of claim 36, wherein the one or more coefficients are predetermined based on specific attributes of a space.

38. The system controller of claim 21, wherein the one or more load control devices comprise at least one of a lighting controller, a motorized window treatment controller, or a temperature controller.

* * * * *